US00RE42740E

(19) United States
(12) Reissued Patent
Fujimori et al.

(10) Patent Number: US RE42,740 E
(45) Date of Reissued Patent: Sep. 27, 2011

(54) PROJECTOR

(75) Inventors: Motoyuki Fujimori, Suwa (JP); Toshiaki Hashizume, Okaya (JP); Kenji Iguchi, Okaya (JP); Kiichi Okumura, Kusatsu (JP)

(73) Assignee: Seiko Epson Corporation, Tokyo (JP)

(21) Appl. No.: 11/802,079

(22) Filed: May 18, 2007

Related U.S. Patent Documents

Reissue of:
(64) Patent No.: 5,651,599
Issued: Jul. 29, 1997
Appl. No.: 08/394,308
Filed: Feb. 24, 1995

U.S. Applications:
(60) Continuation of application No. 09/362,623, filed on Jul. 28, 1999, now Pat. No. Re. 40,296, which is a division of application No. 07/938,261, filed on Oct. 21, 1992, now Pat. No. 5,418,586.

(30) Foreign Application Priority Data

| | | |
|---|---|---|
| Feb. 22, 1991 | (JP) | 03-028430 |
| Mar. 22, 1991 | (JP) | 03-059137 |
| Jun. 10, 1991 | (JP) | 03-137633 |
| Jun. 27, 1991 | (JP) | 03-049295 |
| Jun. 27, 1991 | (JP) | 03-156408 |
| Jun. 27, 1991 | (JP) | 03-156422 |

(51) Int. Cl.
*G03B 21/14* (2006.01)

(52) U.S. Cl. ..... 353/61; 353/119; 353/31; 353/38; 353/58

(58) Field of Classification Search ..... 353/31, 353/33, 34, 37, 119, 57, 58, 60, 61; 349/5, 349/7, 8, 9; 362/264, 345
See application file for complete search history.

(56) References Cited

U.S. PATENT DOCUMENTS
4,787,737 A 11/1988 Ogawa
(Continued)

FOREIGN PATENT DOCUMENTS
JP 6312301 5/1918
(Continued)

OTHER PUBLICATIONS
Japanese Patent Office Notification of Reasons for Refusal for Application No. H11-040586 mailed Feb. 27, 2001 with English translation.
(Continued)

*Primary Examiner* — William C Dowling
(74) *Attorney, Agent, or Firm* — Oliff & Berridge, PLC

(57) ABSTRACT

A projector for separating white light into three primary colors, forming images with liquid crystal light valves, mixing these images, and projecting an enlarged picture of the mixed images with a projection lens. The projector includes an optical unit having a light source, a plurality of dichroic mirrors for separating the white light into blue, green, and red beams, respective liquid crystal light valves forming images of the blue, green, and red colors. The optical unit has a chassis with a rigid center portion at which one of the liquid crystal light valves is mounted, the other two light valves being mounted symmetrically with respect thereto. An adjustment mechanism is provided for matching pixels of the second and third color valves with those of the first color valve. The red color liquid crystal light valve is disposed midway between the blue and green color liquid crystal light valves and a cooling fan is disposed below the red color liquid crystal light valve.

40 Claims, 54 Drawing Sheets

U.S. PATENT DOCUMENTS

| | | | |
|---|---|---|---|
| 4,843,528 | A | 6/1989 | Pearce-Harvey |
| 5,092,671 | A | 3/1992 | Van Os |
| 5,200,857 | A | 4/1993 | Matsushita |
| 5,231,431 | A | 7/1993 | Yano |
| 5,237,399 | A | 8/1993 | Inada |
| 5,283,599 | A | 2/1994 | Tejima et al. |
| 5,287,132 | A | 2/1994 | Suzuki |
| 5,313,234 | A | 5/1994 | Edmonson et al. |
| 5,860,719 | A | 1/1999 | Suzuki et al. |

FOREIGN PATENT DOCUMENTS

| | | |
|---|---|---|
| JP | 5288337 | 7/1977 |
| JP | 61-14034 | 8/1986 |
| JP | 2314051 | 9/1988 |
| JP | 01-289912 | 11/1989 |
| JP | 01-302387 | 12/1989 |
| JP | 02-047642 | 2/1990 |
| JP | 2-73622 | 6/1990 |
| JP | 02-195384 | 8/1990 |
| JP | 02-196280 | 8/1990 |
| JP | 02-275984 | 11/1990 |
| JP | 2-287542 | 11/1990 |
| JP | 287452 | 11/1990 |
| JP | 3-207777 | 1/1991 |
| JP | 03-024532 | 2/1991 |
| JP | 4040509 | 2/1992 |
| JP | 4040605 | 2/1992 |
| JP | 4310913 | 11/1992 |
| JP | 63-123019 | 5/1998 |

OTHER PUBLICATIONS

Japanese Patent Office Notification of Reasons for Refusal for Application No. H11-040617 mailed Feb. 27, 2001 with English translation.

Japanese Patent Office Notification of Reasons for Refusal for Application No. H11-040661 mailed Feb. 27, 2001 with English translation.

PROJECTOR

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,651,599. The reissue applications are application Ser. Nos. 09/362,623 (reissue of U.S. Pat. No. 5,651,599, now issued as RE 40,296), 11/802,079 (the present application, which is a continuation reissue of Ser. No. 09/362,623 filed Jul. 28, 1999).*

This application is a divisional of U.S. Pat. No. 07/938,261, filed Oct. 21, 1992 and now U.S. Pat. No. 5,418,586.

TECHNICAL FIELD

The present invention relates to a projection type liquid crystal projector for separating white light obtained from for example a video tape into three primary colors, forming images with liquid crystal panels (liquid crystal light valves), mixing the images, and projecting an enlarged picture with a projection lens.

RELATED ARTS

In a conventional projection type liquid crystal projector as disclosed in Japanese Patent Laid-Open Publication Serial No. SHO 63-247720, white light is separated into three primary colors with dichroic mirrors. With liquid crystal light valves respective images of these colors are formed. Thereafter, with an image mixing mirror, these images are mixed. Next, with a projection lens, the mixed image is enlarged and then projected.

With the above-mentioned projection type liquid crystal projector, pixel positions of the liquid crystal light valves, which form blue, green, and red images, cannot be relatively adjusted. In addition, due to deviation of the mounting angles of reflection mirrors disposed in the respective optical paths to the projection lens, the optical axis is deviated. Moreover, due to deviation of the mounting angles of the liquid crystal light valves to their optical axes, when the three primary colors are mixed, the resultant image is deviated. The deviations of positions of the liquid crystal light valves for blue, green, and red colors to the projection lens result in an out-of-focus image. As a result, the quality of picture being projected is deteriorated.

To solve these problems, the mounting position and the mounting angle of the liquid crystal light valve for each color should be adjusted. Nevertheless, in the conventional apparatuses, only a means for moving the mounting positions with eccentric pins or adjustment screws is provided. However, in the apparatus where the positions of the liquid crystal light valves are adjusted with the eccentric pins, the rotating direction of the eccentric pin and the moving direction of each liquid crystal light valve are not uniformly determined. Thus, the adjustment of movement to a desired direction is very difficult to do. In addition, the eccentric pins are not easy to machine. Moreover, E rings, nuts, and so forth are required to secure the eccentric pins. Consequently, the number of parts increases and the assembling work takes a long time, resulting in raising the production cost of the apparatus.

On the other hand, so far, the conventional liquid crystal light valves are designed and produced for use in designated colors. In particular, the specifications of the liquid crystal light valves for forming a green image whose relative visibility is high are severe. In contrast, the specifications of the liquid crystal light valve for forming a blue image whose specific visibility is low are comparatively less severe. Thus, even if a liquid crystal light valve which can be satisfactorily used for blue color cannot be used for green color. Therefore, in this situation, this valve should be treated as an unacceptable item. Consequently, the yield of these liquid crystal light valves is low, thereby raising the production cost.

In addition, the conventional projection type liquid crystal projector is provided with two fans which are an air intake fan and an air exhaust fan as cooling means. With these fans, the interior of the apparatus is cooled. However, lacking sufficient analysis of the air flow paths and so forth, the spherical portion of a light source (metal halide lamp), an UV and IR filter portion, polarizing plate, a liquid crystal panel, electric parts for an exhaust opening, electric devices, and so forth are not satisfactorily cooled. Thus, these constructional parts are heated to temperatures close to their limit values. On the other hand, there are demands of brighter projectors of low-noise in the marketplace. However, the conventional cooling means cannot satisfy such demands. Unless the above-mentioned constructional parts are satisfactorily cooled, problems such as deteriorating image quality and decreasing service life would take place. An increase of the size and weight of the projector is not permitted and, the conventional techniques have not satisfied such requirements. In particular, the light source is not satisfactorily cooled.

SUMMARY OF THE INVENTION

An object of the present invention is to enable a projection type liquid crystal projector to clearly display images and to provide a projector which is small in size, easy to adjust, and high in reliability. Another object of the present invention is to provide a projection type liquid crystal projector having high cooling efficiency by an arrangement of relevant constructional parts, of small and thin construction, and excellent properties with respect to operability, durability, and maintainability. A further another object of the present invention is provide a projection type liquid crystal projector having a projection light source which is free of deteriorations of image quality such as deviations of intensity, colors, and picture elements (pixels) and a lighting unit having a long service life as the light source.

The projection type liquid crystal projector according to the present invention comprises optical means, comprising a light source, a plurality of dichroic mirrors for separating white light emitted by the light source into beams of blue, green, and red colors, respective liquid crystal light valves for forming images of the beams of blue, green, and red colors so as to form optical paths, and a projection lens, wherein the optical means is characterized in that at a center portion of a chassis made of rigid members a first color type valve of the liquid crystal light valves for forming the blue, green, and red colors, second and third color type valves of the liquid crystal light valves being disposed at positions symmetrical to the first color valve, and wherein the projection type liquid crystal projector further comprises an adjustment mechanism for mutually matching pixels of the second and third color valves with those of the first color valve.

Thus, the positions and angles of the liquid crystal light valves can be easily and securely adjusted. In addition, the deviations of color images and out-of-focus condition can be prevented. Consequently, the quality of the projected images can be improved.

The adjustment mechanism includes a plurality of members slidable relative to each other and provided with notches. Into these notches, a tool such as a screwdriver can be inserted so as to perform an adjustment operation.

The chassis on which the liquid crystal light valves, mirrors, and so forth are fixed is made of a metal plate. The periphery of the chassis is formed by bending or drawing operations.

In addition, the projection type liquid crystal projector according to the present invention comprises a white lamp, dichroic mirrors for separating light of the white lamp into beams of three colors of red, green, and blue, and liquid crystal light valves for transmitting the beams of three colors and for forming images, wherein a blue color type valves for forming a blue image of the liquid crystal light valves has the same construction as a green color type valve thereof so as to have compatibility with each other.

Further, the projection type liquid crystal projector according to the present invention comprises a case substantially of a rectangular parallelepiped shape, a base plate disposed in the case, a lamp housing unit having a projection light source, an optical unit, comprising image forming liquid crystal light valves, light mixing and separating mirrors, dichroic mirrors, prepolarizers, and a projection lens, the lamp housing unit and the optical unit being disposed on the base plate so that a main optical path and the outer shape is of a plane L shape, the projection lens facing a window of the front of the case, one end of the lamp housing unit facing a window of a lamp housing cover on a side of the case and the other an air exhaust opening in the rear of the case, a power unit and a lamp stabilizer disposed in a space surrounded by the plane L shape portion, the front and the side of the case, an air intake regulating plate disposed below the liquid crystal light valves, an air intake fan disposed below the air intake regulating plate, a video board disposed between a side of the case and the light guide unit, a liquid crystal drive board unit disposed midway between the top of the case and the top of the light guide unit, an air exhaust fan disposed midway between the air exhaust opening in the rear of the case and the lamp housing unit, and a lamp fan disposed in front of a light emitting surface of the lamp housing unit.

Furthermore, as cooling means of the light source, the air exhaust fan disposed adjacent to the lamp housing and a small blowing lamp fan disposed adjacent to a reflector opening portion of the lamp reflector are provided.

DETAILED DESCRIPTION OF EMBODIMENTS OF THE INVENTION

Figure 1:
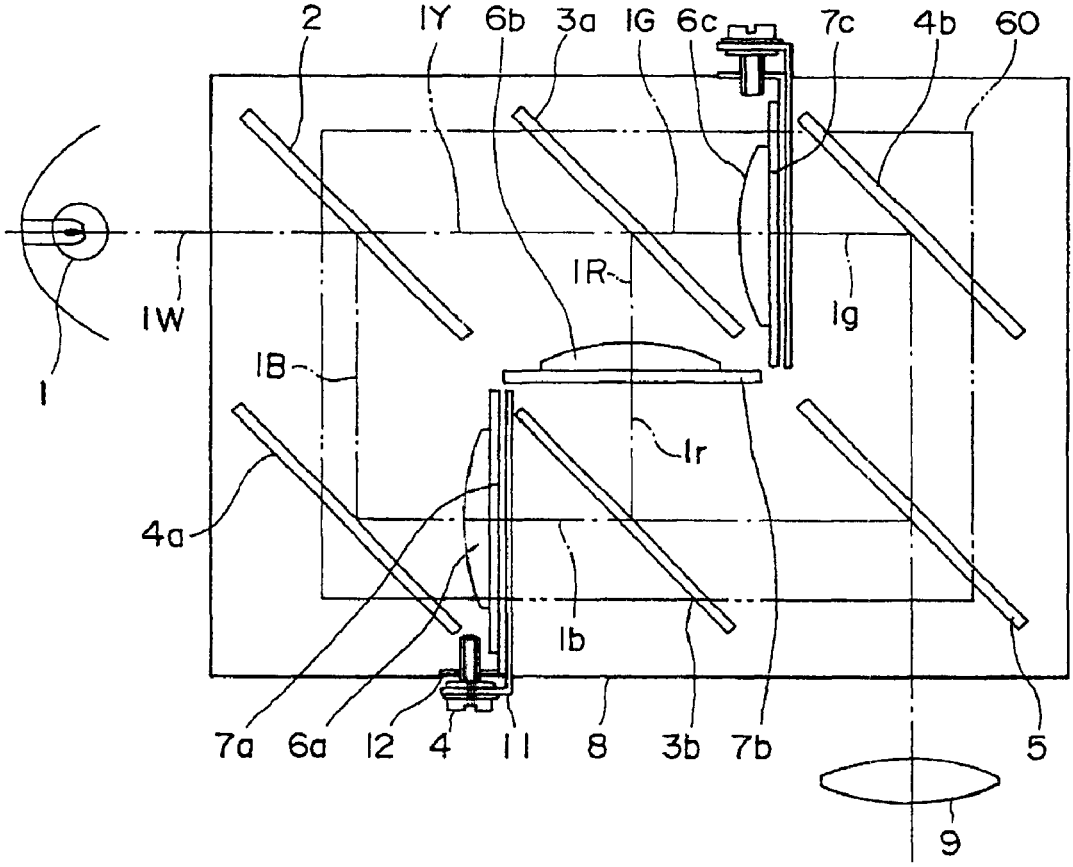
FIG. 1 is a schematic plan view showing optical paths and principal parts of an optical system in accordance with the present invention.

FIG. 1 is a schematic plan view showing an optical system of an embodiment according to the present invention. Reference numeral 1 is a light source. Reference numeral 2 is a blue dichroic mirror which reflects blue light and allows other colors of light to pass through (hereinafter, this mirror is referred to as B.D.M.). Reference numerals 3a and 3b are red dichroic mirrors which reflect red light and allows other colors of light to pass through (hereinafter these mirrors are referred to as R.D.M.). Reference numerals 4a and 4b are reflection mirrors. Reference numeral 5 is a dichroic mirror which allows green light to pass through, reflects other colors of light, and mixes red, green, and blue colors of light (hereinafter, this mirror is referred to as a mixing mirror). Reference numerals 6a, 6b, and 6c are condenser lenses. Reference numeral 7a is a liquid crystal light valve for forming an image of blue light. Likewise, reference numerals 7b and 7c are liquid crystal light valve for forming images of red and green colors of light, respectively. Reference numeral 8 is a chassis for holding and fixing the above-mentioned parts. Reference numeral 9 is a projection lens. The above-mentioned parts 2, 3a, 3b, 4a, 4b, 5, 6a, 6b, 6c, 7a, 7b, 7c, which are fixed and held with the chassis 8, form an optical means.

Now, the path of light in the optical means will be described. The light source 1 generates white light 1w. The B.D.M. 2 reflects only the rays in the wavelength range of blue, namely blue color 1b of light 1w and the other rays of light in other wavelength ranges (yellow light) to pass through. The R.D.M. 3a only reflects rays having a wavelength range of red 1R of the light 1Y and allows the remaining green rays 1G to pass through. The beam of rays 1G is condensed by the condenser lens 6c and then an image is formed thereby as a beam 1g. The beam 1g is reflected beam the reflection mirror 4b. Thereafter, the beam 1g passes through the mixing mirror 5. Then, the beam 1g is projected onto a screen by the projection lens 9. The blue beam 1B is reflected by the reflection mirror 4a. Then, the blue ray 1B passes through the condenser lens 6a. Thereafter, the liquid crystal light valve 7a forms an image as a ray 1b. Then, the ray 1b passes through the R.D.M. 3b and comes to the mixing mirror 5. Likewise, the red ray 1R passes through the condenser lens 6b and comes to the liquid crystal light valve 7b. Then, the liquid crystal light bulb 7b forms an image as a ray 1r. The ray 1r is reflected with the R.D.M. 3b and then comes to the mixing mirror S. The mixing mirror 5 reflects the rays 1b and 1r mixes the rays of three primary colors 1g, 1b, and 1r as a displayable picture. The projection lens 9 projects the picture on the screen.

It should be appreciated that the liquid crystal light valve 7b disposed in the middle position of the optical means can be used for the red ray of light, the liquid crystal light valve 7a for green ray of light, and the liquid crystal light valve 7c for blue ray of light. Since each dichroic mirror disposed in the optical path has an inclination to the optical axis, different optical paths take place. Thus, in this construction, singe green ray having high relative visibility is not used, astigmatism and thereby unsharpness can be prevented.

Figure 4:
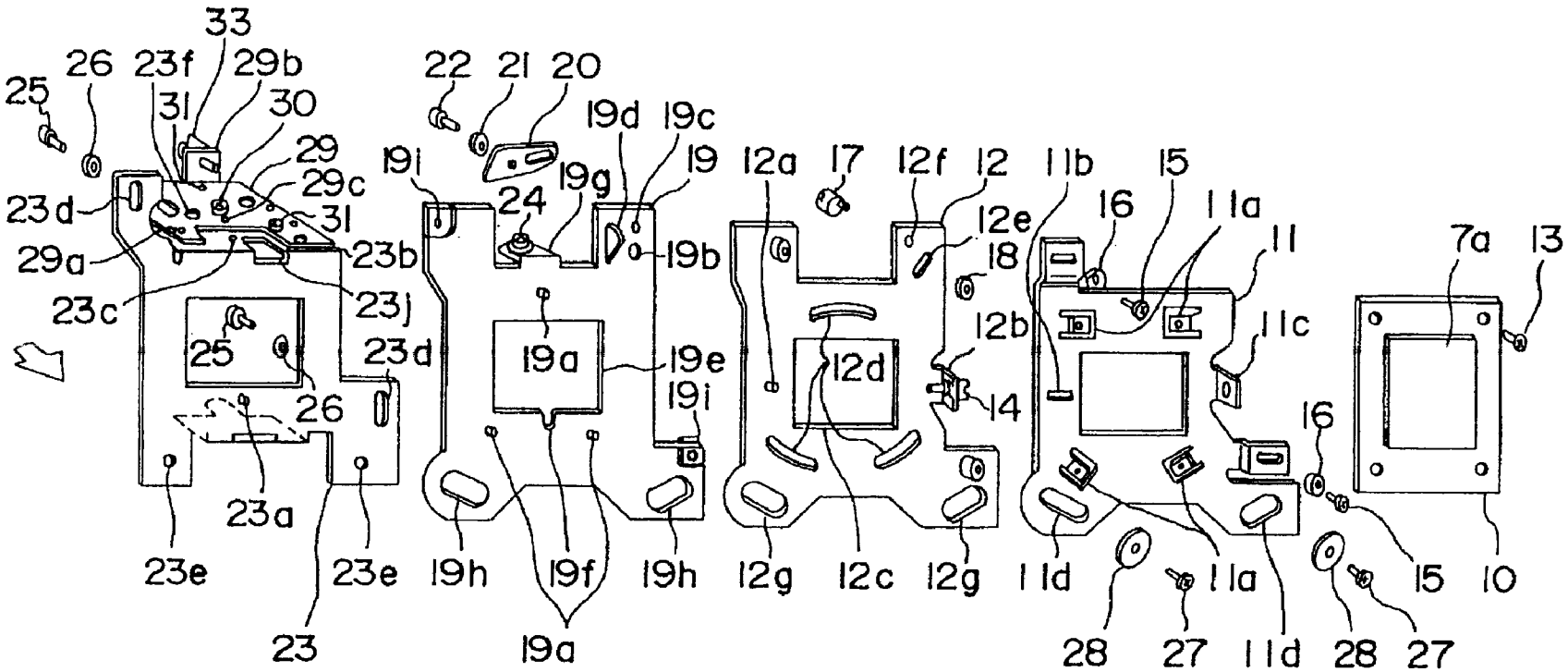
FIG. 4 is an assembly exploded view showing an adjustment mechanism for matching pixels of the liquid crystal light bulbs.

To clearly display a picture, it is necessary to mix the rays 1g, 1b, and 1r in such a way that their mutual positions do not deviate. Thus, the mutual pixel positions of the liquid crystal light valves 7a, 7b, and 7c should be accurately matched each other. In addition, these pixel positions should be precisely matched with the back-focus position of the projection lens 9. FIG. 4 is a perspective view showing an example of a fixing and adjusting mechanism of the liquid crystal light valve 7a. As shown in the figure, the liquid crystal light valve 7a is mounted on a circuit board 10. The board 10 is fixed to Z shaped bend portions (four positions) disposed on a fixing plate 11 with screws 13. One side of the fixing plate 11 is positioned with an oval hole 11b and a dowel 12a formed on a fixing plate 12. In addition, a screw 14 pivoted with a bend portion 12b on the fixing plate 12 is connected to a bend portion 11c of the fixing plate 11. Thus, the fixing plate 11 is laterally slidably supported with the fixing plate 12. The fixing plate 11 and the fixing plate 12 are fixed with screws 15 (two positions) through spring washers 16. In the center of the fixing plate 12, an opening portion 12a is formed. About the center of the opening portion 12c, arc shape holes 12d (three positions) are formed as outer concentric circles. Dowels 19a (three positions) formed on the fixing plate 19 are positioned and guided in the holes 12d. In addition, an eccentric pin 17 connected to an oval hole 12e formed on the fixing plate 12 and rotatably secured with a washer 18 is pivotally supported in a hole 19b formed on the fixing plate 19. Thus, the rotation of the fixing plate 12 can be adjusted by the amount of eccentricity for which the eccentric pin 17 is rotated. In addition, a washer 20 connected to (the rear of) a dowel on the fixing plate 19 is fixed to a screw hole 12f formed on the fixing plate 12 with a screw 22 which pierces a deformed hole 19d formed on the fixing plate 19 through a spring washer 21. Thus, the fixing plate 12 and the fixing plate 19 can be fixed. A notch 19f at a lower portion of an opening portion 19e formed in the center of the fixing plate 19 is connected to a dowel 23a formed on a fixing plate 23. Thus, one side of the fixing plate 19 is positioned and guided to the fixing plate 23. On the other hand, a screw 24 pivotally supported with a bend portion 19g of the fixing plate 19 is connected to a screw hole 23c formed on a bend portion 23b over the fixing plate 23. Thus, the fixing plate 19 is positioned and guided relative to the fixing plate 23 so that the longitudinal position of the liquid crystal light valve 7a can be adjusted. The fixing plate 19 is fixed in such a way that screws 25 (two positions) which pierce respective oval holes 23d (two positions) formed on the fixing plate 23 are connected to screw holes 19i (two positions) formed on the fixing plate 19 through respective spring washers 26 (two positions).

In the above-mentioned construction, by moving pixels of the liquid crystal light valve 7a in the horizontal, vertical, and rotational directions, these pixels can be matched with those of the liquid crystal light valves 7b. In addition, to more securely fix the liquid crystal light valve 7a, screws 27 (two positions) which pierce respective oval holes 11d (two positions) formed on the fixing plate 11, respective oval holes 12g (two positions) formed on the fixing plate 12, respective oval holes 19h formed on the fixing plate 19 (two positions) are connected to respective screw holes 23e (two positions) formed on the fixing plate 23 through respective spring washers 28 (two positions). By controlling the tightening torque of the screws 21, they allow the fixing plate 11, the fixing plate 12, and the fixing plate 19 to be resiliently fixed to the fixing plate 23 by the use of a resilient force of the spring washers 28. Thus, since the fixing plates 11, 12, 19, and 23 can be temporarily fixed to each other by frictional forces, mutual displacements thereof can be prevented during an adjustment operation. After the adjustment mechanism has been mounted, the screws 27 are present at unaccessible positions (see FIG. 2). Thus, the permanent tightening operation can be omitted. Likewise, since the spring washers 16, 21, and 26 allow the position of the liquid crystal light valve 7a to be adjusted, when the above-mentioned screws and so forth are tightened, the resilient forces of these spring washers 16, 21, and 26 prevent the mechanism from being displaced.

In the above-mentioned adjustment mechanism, the fixing plate 11, the fixing plate 12, the fixing plate 19, and the fixing plate 23 have the same center dimensions in their outer shapes (in left and right directions). Thus, by assembling these fixing plates 11, 12, 19, and 23 in such a way that these outer shapes are matched, a position accuracy without a significant deviation to the desired center can be obtained. In addition, by providing a means for forming a gap between each connecting surface of the fixing plates 11, 12, 19, and 23, the gap prevents warping, distortion and so forth of parts from badly affecting the liquid crystal light valve 7a.

Figure 2:
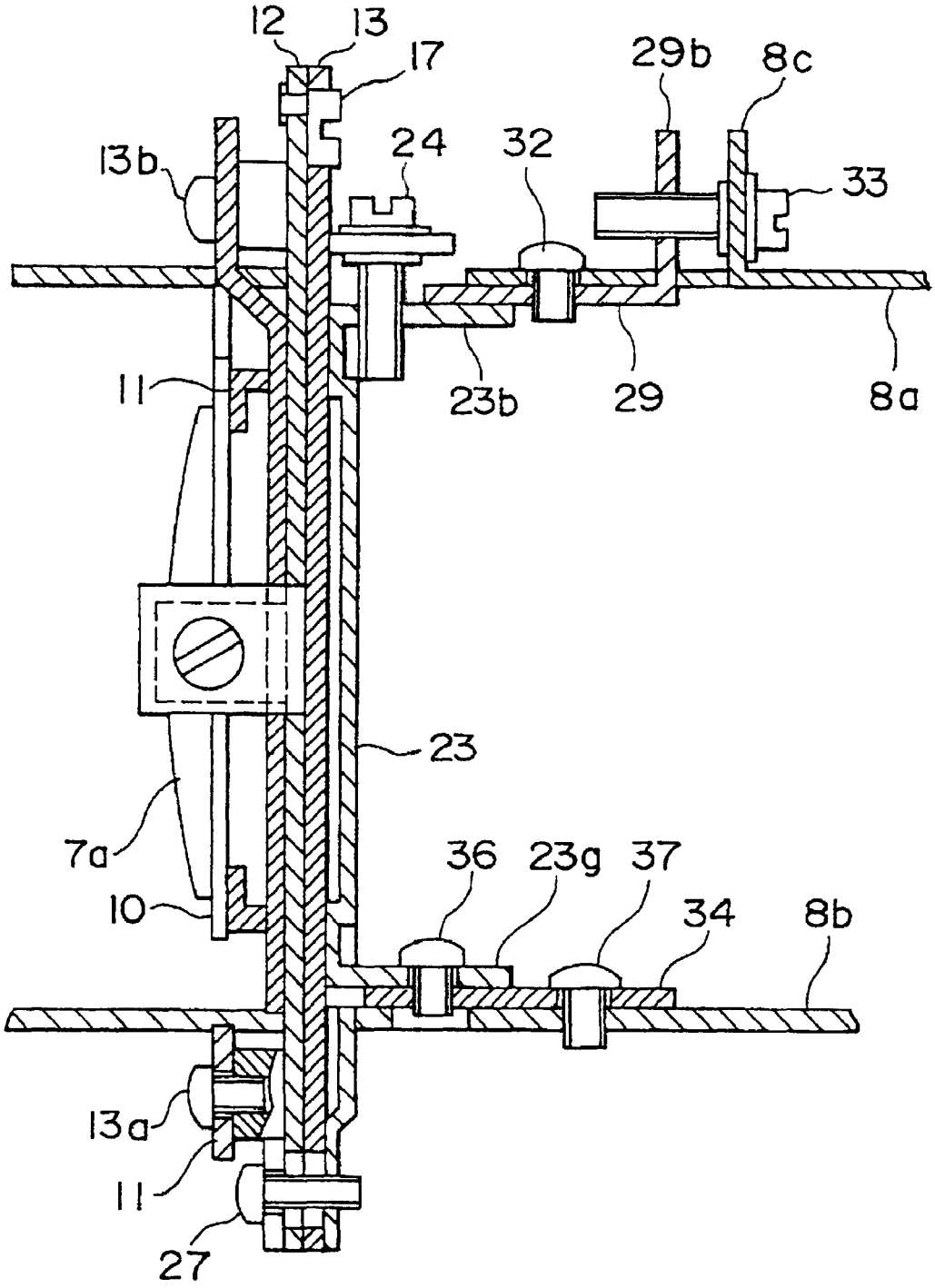
FIG. 2 is a partial assembly sectional view showing a part of an adjustment mechanism for fixing and moving in the focus direction a liquid crystal light bulb in accordance with the present invention.
Figure 3:
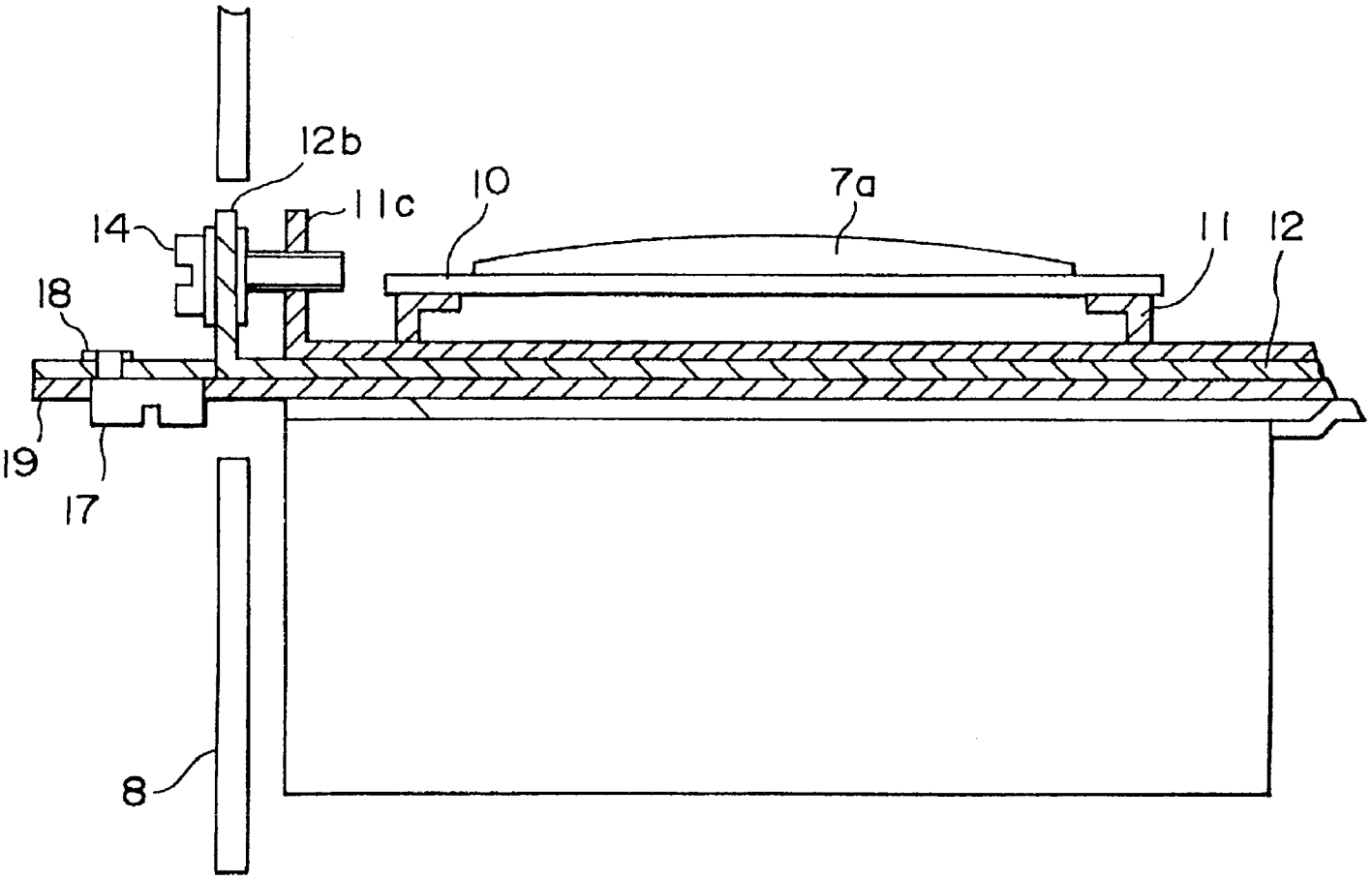
FIG. 3 is a partial assembly plan view of FIG. 2.

Next, a mechanism for fixing and adjusting the position of the liquid crystal light bulb 7a on the chassis 8 will be described in detail. FIG. 2 is a schematic assembly sectional view showing a part of the adjustment mechanism in the above-mentioned construction. FIG. 3 is a schematic assembly plan view of FIG. 2. As shown in FIGS. 1, 2, and 4, an upper fixing auxiliary plate 29 is pivotally guided on a bend portion 23b over the fixing plate 23 in such a way that a dowel 23f formed on the bend portion 23b can be rotated. In addition, the upper fixing auxiliary plate 29 is connected to an eccentric pin 30 which is rotatably secured to the bend portion 23b. Thereafter, the upper fixing auxiliary plate 29 is temporarily fixed to the bend portion 23b with screws 31 (two positions). The upper fixing auxiliary plate 29 is temporarily fixed to an upper chassis 8a with screws 32 through screw holes 29a (two positions) formed on the upper fixing auxiliary plate 29. A dowel 29c formed on the upper fixing auxiliary plate 29 is connected in an oval hole (not shown in the figure) on the upper chassis plate 8a. In addition, a screw 33 pivotally held with a bend portion 8c formed on the upper chassis plate 8a is connected to a bend portion formed on the upper fixing auxiliary plate 29 with a screw. Thus, the mechanism can adjust the focus direction of the liquid crystal light valve 7a. Since the eccentric pin 30 can be adjusted from an opening portion (not shown in the figure) formed on the upper chassis plate 8a. Thus, the amount of angular deviation in the direction perpendicular to the optical axis of the liquid crystal light valve 7a can be adjusted. After the above-mentioned two adjustment operations are completed, by permanently tightening the screws 31 and 32, the upper direction of the adjustment mechanism is fixed.

Figure 5:
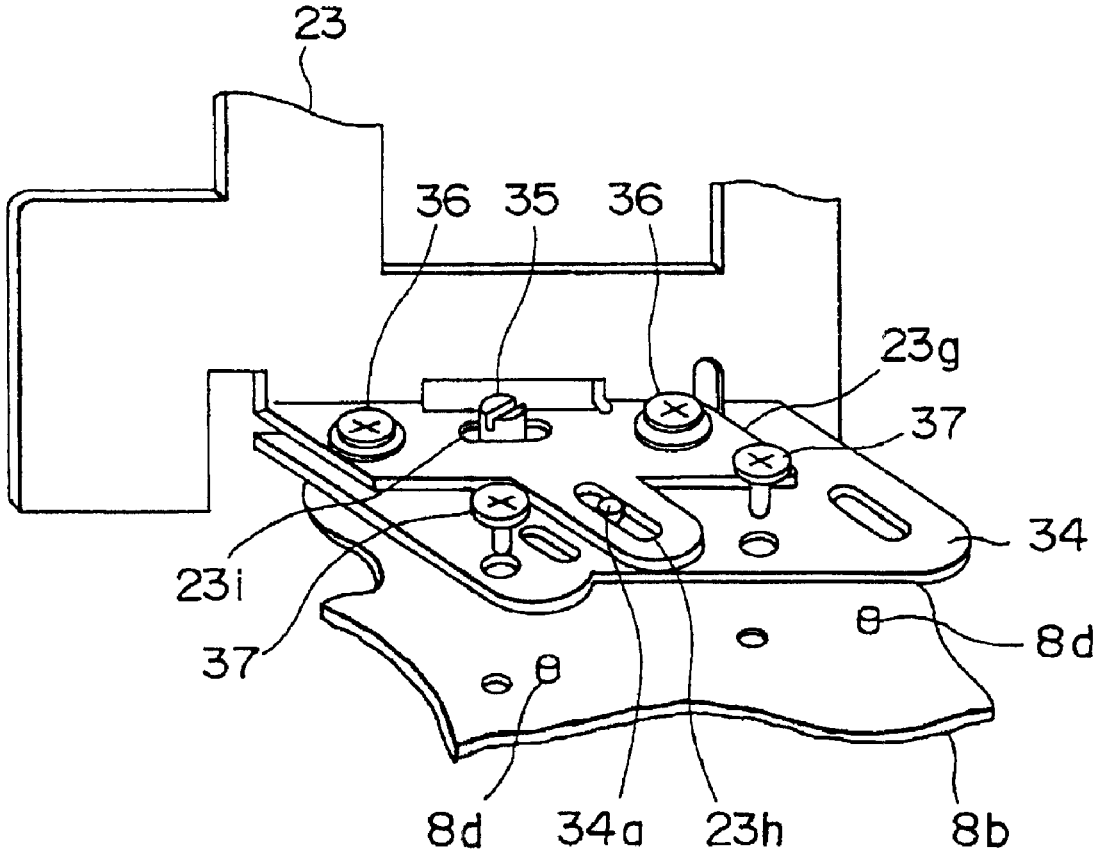
FIG. 5 is a partial assembly exploded view showing a part of FIG. 4.

Next, with reference to FIGS. 2, 4, and 5 (FIG. 5 is a perspective view seen in the direction of the arrow in FIG. 4), the adjustment and fixing of the adjustment mechanism in the lower direction will be described. Dowels 8d (two positions) and an eccentric pin 35 are rotatably secured to a lower chassis plate 8b. The dowels 8d and the eccentric pin 35 allow the lower fixing auxiliary plate 34 to be positioned. A bend portion 23g formed on the fixing plate 23 is guided with a dowel 34a and mounted to the auxiliary plate 34. With screws 36 (two positions), the lower fixing auxiliary plate 34 and the bend portion 23g are temporarily fixed. In addition, with screws 37 (two positions), the lower fixing auxiliary plate 34 and the lower chassis plate 8b are temporarily fixed. The focus adjustment in the lower direction is performed in accordance with the mount of eccentricity of the eccentric pin 35. Thereafter, the screws 37 (two positions) are permanently tightened. After the angle adjustment in the plane direction to the upper optical axis is completed, the screws 36 are permanently tightened along with the screws 31. Obviously, the plane positions of the dowels 23f and 34a have been matched to each other in the reference dimensions. In addition, screwdriver access holes for tightening the screws 36 and 37 and rotating the eccentric pin 35 are formed on the bend portion 23b of the fixing plate 23 and the upper fixing auxiliary plate 29 (this part will be described later in detail).

Next, as shown in FIG. 3, pixels in the horizontal direction can be adjusted from a side direction of the chassis with a screwdriver because the screw 14 is disposed at the opening portion formed on a side of the chassis 8. As described above, the adjustment of deviation of pixels in the vertical, horizontal, and rotational directions is performed in the adjustment mechanism. The deviation of plane angle between the focus direction (including the vertical direction) and the direction of the optical axis is adjusted with fixing portions for fixing the adjustment mechanism and the chassis.

The liquid crystal light valve 7c is disposed such that light valves 7c and 7a are symmetrical with respect to the liquid crystal light valve 7b.

Figure 6:
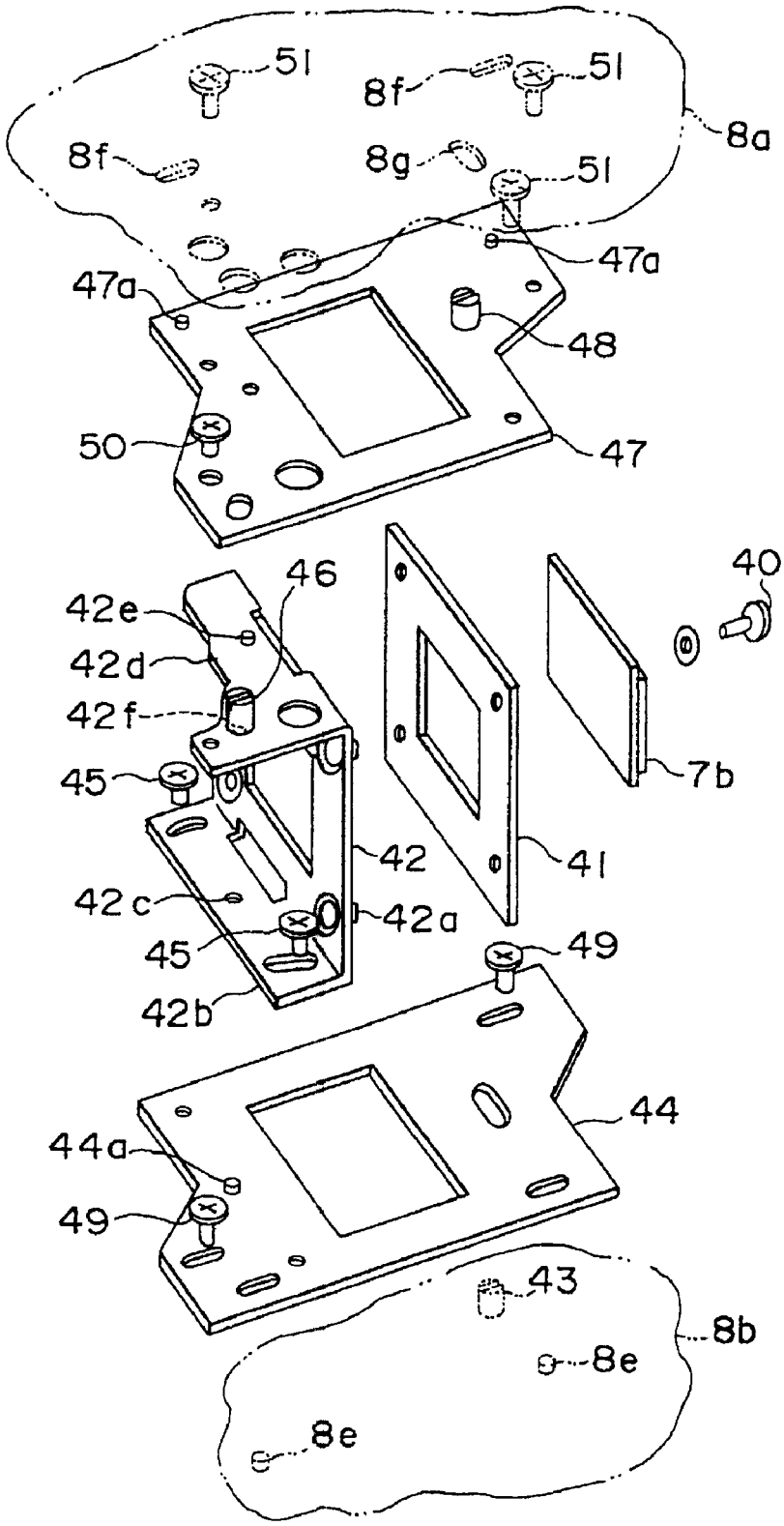
FIG. 6 is a partial assembly exploded view showing the adjustment mechanism for fixing and moving in the focus direction the liquid crystal light bulbs, the mechanism being used for reference of matching the pixels.

Next, a supporting and fixing mechanism of the liquid crystal light valve 7b disposed at a center portion of the chassis 8 will be described. When the liquid crystal light valve 7b can be disposed within the depth of focus of the projection lens 9, the lack of sharpness of pixels projected on the screen does not affect the visibility by human eyes. However, in the cases of the mounting of the liquid crystal light valve 7b and the construction of this embodiment, where the chassis 8 is made of metal plates and so forth, due to the overall effects of the tolerances involved in the constructional elements and the machining tolerances, the position of the liquid crystal light valve 7b is not always placed in the range of the above-mentioned allowable depth of focus. Thus, the adjustment mechanism for allowing the focus direction to be adjusted is required. An example of this mechanism will be described with reference to FIG. 6. As shown in FIG. 6, in an adjustment mechanism for adjusting the upper direction of the liquid crystal light valve 7b, the bulb 7b is mounted on a circuit board 41 which is fixed to convex portions (four positions) formed on a fixing plate 42 with screws 40 (four positions). In addition, a lower fixing auxiliary plate 44 is positioned and guided to the lower chassis plate 8b with dowels 8e (two positions) formed on the lower chassis plate 8b and an eccentric pin 43 rotatably secured to the lower chassis plate 8b. The lower fixing auxiliary plate 44 is temporarily fixed with screws 49 (two positions). A dowel 44a provided on the lower fixing auxiliary plate 44 is rotatably connected in a hole 42c formed in the center of a bend portion 42b formed on the fixing plate 42. Thereafter, the fixing plate 42 and the fixing auxiliary plate 44 are temporarily fixed with screws 45 (two positions). The fixing auxiliary plate 47 which is pivoted with a dowel 42e at a center portion of a bend portion 42d formed over the fixing plate 42 and which is positioned and guided with an eccentric pin 46 rotatably secured to a hole 42f is temporarily fixed with a screw 50. Dowels 47a (two positions) disposed on the upper fixing auxiliary plate 47 and an eccentric pin 48 rotatably secured are positioned and guided in oval holes 8f (two positions) and 8g (one position) formed on the upper chassis plate 8a. Then, the upper fixing auxiliary plate 47 is temporarily fixed to the upper chassis plate 8a with screws 51 (three positions). Of course, the upper chassis plate 8a has screwdriver access holes (see FIG. 7) so that screws and so forth mounted below the upper chassis plate 8a can be mounted and removed. In the focus adjustment operation, the upper direction of the focus is adjusted by the mount of eccentricity of the eccentric pin 48. Likewise, the lower direction of the focus is adjusted by the amount of eccentricity of the eccentric pin 43. In addition, the angular deviation in the plane direction to the optical axis is adjusted by the amount of eccentricity of the eccentric pin 46. After the above-mentioned adjustment operations are complete the screws 49, 45, 50, and 51 are permanently tightened so as to securely fix the adjustment mechanism. Thus, all the adjustment operations of this mechanism can be performed. If the position of the liquid crystal light valve 7b were in the allowable range of depth of focus of the backfocus of the projection lens by means of simplified mount construction of the liquid crystal light valve 7b or improved machining accuracy thereof, the above-mentioned adjustment mechanism could be omitted.

As described above, since the angular deviation in the plane direction to the optical axis is adjusted only in the direction of the chassis plate 8a, the adjustment operation and the mechanism thereof are simplified. In addition, by horizontally forming a 90° bend portion (not shown in the figure) at an end of each of the fixing plate 23 and the fixing plate 42, along with the reinforcement of their fixing plates and the improvement of the surface accuracy thereof, disturbing light can be effectively prevented. In addition, when the bend portions 23b, 23g, 42b, and 42d formed on the fixing plate 23 and the fixing plate 42 fixed between the chassis plates 8a and 8b are fixed with screws, errors of the bend angles of the bend portions become bending moments. These bending moments are applied to these chassis plates. To suppress this bad influence applied to the liquid crystal light valves 7a and 7b and the deviation of the adjustment mechanism, at the base of each bend portion, an opening portion is formed so as to reduce the amount of bending.

In particular, since the chassis plates 8a and 8b, the fixing plates 11, 12, 19, 23, and 42, the upper fixing auxiliary plates 29 and 47, the lower fixing auxiliary plates 34, and 44, and so forth are made of the same material such as steel parts, they have the same coefficient of linear expansion. Thus, the parts of the adjustment mechanism uniquely expand and shrink.

In addition, the position accuracy of the positioning holes and dowels on the chassis 8 for use with the fixing mechanisms of the mirrors and, the liquid crystal light valves is of the order of approximately 10 microns. Moreover, a simple construction is used in such a way that the liquid crystal light valves are directly fixed to the fixing plate 23. Further, the allowable depth of focus of the backfocus of the projection lens 9 can be reduced to approximately 200 microns or less. Furthermore, when the size of the liquid crystal light valves is of approximately 3 inches and the number of pixels thereof is of the order of approximately 100,000, a construction which does not require the adjustment in the focus direction can be satisfactorily accomplished. In addition, when the amount of deviation of pixels in the horizontal and vertical directions is approximately ½ to ⅔ times the amount of the related art, a construction which does not require the matching of pixels can be also accomplished.

As described above, according to the above-mentioned construction, with reference to pixels of a first liquid crystal light valve disposed in the center of the chassis, pixels of a second liquid crystal light valve disposed point-symmetrically to the first liquid crystal light valve are adjusted. Thus, the mechanism for fixing the liquid crystal light valve disposed in the center of the chassis can be constructed simply and in a small size. Therefore, an optical system with a short optical path can be designed. Consequently, this construction can contribute to reducing the size of the optical system, namely, the size of the final product.

In addition, since the position adjustment operation of the liquid crystal light valve disposed in the center of the chassis can be performed from the top thereof, the disability of adjustment from the side thereof due to the constructional restriction can be compensated. Moreover, since the adjustment operation of the liquid crystal light valves disposed point-symmetrically to another valve is available from the top and the side, the number of operation steps can be reduced. Furthermore, since the adjustment operation from the side can be performed by using a simple adjustment jig in the final product state where the optical apparatus is mounted in a real machine, the adjustment quality is improved.

Since the shapes of the parts of the fixing and adjustment mechanism of the liquid crystal light valves disposed point-symmetrically can be formed symmetrically to those of the valve disposed in the center of the chassis, the number of design and machining steps can be reduced.

In addition, since the constructional parts of the adjustment mechanism can be assembled in accordance with their outer shapes, the assembled adjustment mechanism can have the nearly designed accuracy. Thus, the adjustment operation can be easily estimated and the number of working steps can be reduced. Moreover, by the accomplishment of the construction in a small size, the projection lens and the mirrors can have high cost performance. In addition, the construction in the small size contributes to decreasing the size of the final product and reducing the costs of the apparatus and the final product.

Since the liquid crystal light valves and polarizing plates (not shown in the figure) are exposed to strong light, they become hot. To maintain the performance of these parts, a forced cooling mechanism is required. To accomplish this mechanism, a fan 60 for drawing outside air is disposed below the chassis 8b (see FIG. 1). To equally cool the liquid crystal light valves and the polarizing plates, the center portion of the fan 60 should be disposed in the vicinity of the liquid crystal light valve 7b disposed at the center portion of the chassis 8b. However, since a motor is disposed at the center portion of the fan, the amount of air blown is low. To improve the air blown capacity, the amount of air blow is adjusted by using a regulating plate. However, in the present invention, since the fixing mechanism of the liquid crystal light valve 7b disposed at the center portion of the chassis is simplified, the fluid resistance is decreased. Thus, without a particular regulating means, the fixing mechanism of the liquid crystal light valve 7b contributes to the improvement of the cooling efficiency.

Since the constructional parts of the optical apparatus are made of the same material, they equally expand and shrink for temperature changes. Thus, the deviation of positions in the adjustment mechanism can be suppressed. In other words, since the deviation of pixels between the liquid crystal light valves are suppressed, the quality and accuracy of the pictures can be improved.

As described in the last part of the above-mentioned embodiment, when light incident on the projection lens 9 causes red and green rays to be reflected by a mixing mirror, the adjustment accuracy of matching pixels of the liquid crystal light valve 7b for red with those of the liquid crystal light valve 7a for green can be improved in a relatively small number of adjustment steps. When light enters the projection lens, since red and green rays are reflected on the same surface of the mixing mirror 5, the amount of deviation of the optical axis due to the deviation of position of the mixing mirror 5 for the red rays is the same as that of the green rays. Thus, the amount of deviation of the red and green rays is equal to the amount of deviation due to the deviation of position of the R.D.M. 3b and the amount of deviation between the mutual positions of the liquid crystal light valves 7a and 7b. Consequently, the amount of deviation becomes small. In addition, since the pixels of the liquid crystal light valve 7a can be stably matched with those of the liquid crystal light valve 7b, they can be adjusted in a small number of adjustment steps. On the other hand, with respect to the blue rays, in addition to the amount of deviation of the optical axis due to the deviation of position of the mixing mirror 5, the deviation of the optical axis due to the deviation of position of the reflection mirror 4b and the amount of deviation between the mutual positions of the liquid crystal light valve 7b and 7c are added. Thus, the number of adjustment steps increases in accordance with the amount of deviation. However, since the relative visibility of the blue rays is low, even if there is still a minor error to adjust, the error does not affect the picture quality.

In addition to setting the sizes of the liquid crystal light valves, the number of pixels, and the allowable depth of focus of the projection lens, when the improvement of the machining accuracy of parts and the simplification of the fixing mechanisms of the liquid crystal light valves are accomplished, the construction which does not require the adjustment of the focus direction with respect to the position of the liquid crystal light valve disposed at the center portion of the chassis can be accomplished. Alternatively, the construction which requires only the adjustment for placing the liquid crystal light valve to a position perpendicular to the optical axis can be accomplished. Thus, the mechanism can be further simplified. In addition, the construction which does not require the adjustment of matching pixels can be accomplished. Consequently, such a construction allows the cost reduction including the reduction of the number of production steps and parts. Thus, the present invention contributes to reducing the cost of products which were expensive.

Figure 7:
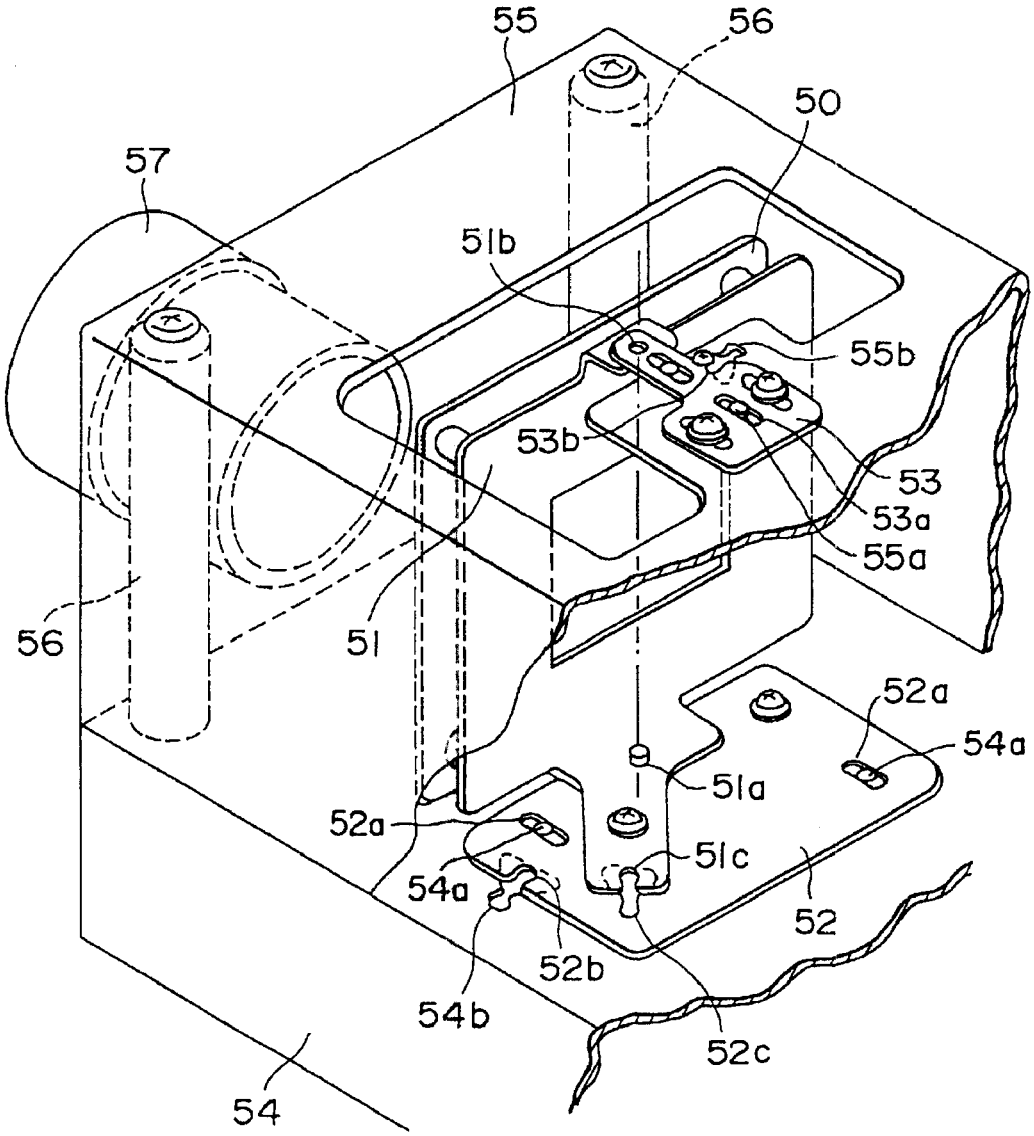
FIG. 7 is a perspective view showing a modified embodiment of an adjustment and operation mechanism portion.
Figure 9:
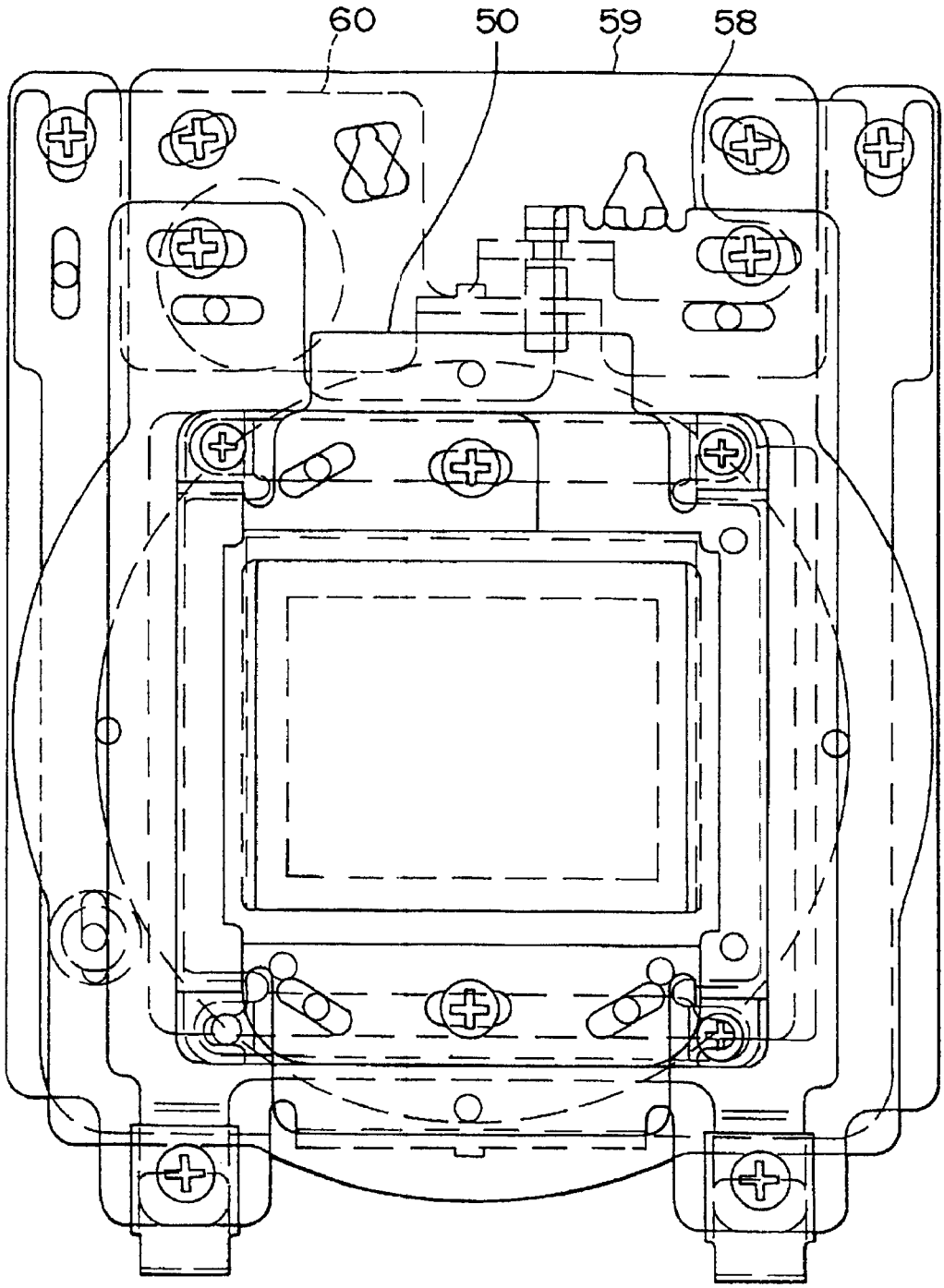
FIG. 9 is a plan view showing an application of the adjustment and operation mechanism portion.

FIGS. 7 and 9 show a practical example of an adjustment adjustment and operation mechanism which can be adjusted with a screwdriver. These figures present a light valve mounting surface where the liquid crystal light valve is mounted and adjustment positions of the light valve are obtained.

As shown in FIG. 7 which presents an embodiment of the adjustment and operation mechanism, a liquid crystal light valve is mounted on a light valve board 50. The light bulb board 50 is fixed to a light valve fixing plate 51 with screws. A dowel 51a of the light valve fixing plate 51 is rotatably guided by a lower adjustment plate 52. A dowel 51b of the light valve fixing plate 51 is rotatably guided by an upper adjustment plate 53. The light valve fixing plate 51 is fixed to the lower adjustment plate 52 with screws. The lower adjustment plate 52 is slidably connected to the lower light guide 54 with oval holes 52a and dowels 54a formed thereon. The lower adjustment plate 52 is fixed to the lower light guide 54 with screws. The upper adjustment plate 53 is slidably connected to an upper light guide 55 with an oval hole 53a and a dowel 55a. The upper adjustment plate 53 is connected to the upper light guide 55 with screws. The lower light guide 54 and the upper light guide 55 are spaced apart by columns 56. The lower light guide 54 and the upper light guide 55 are fixed to the column 56 with screws.

Figure 8:
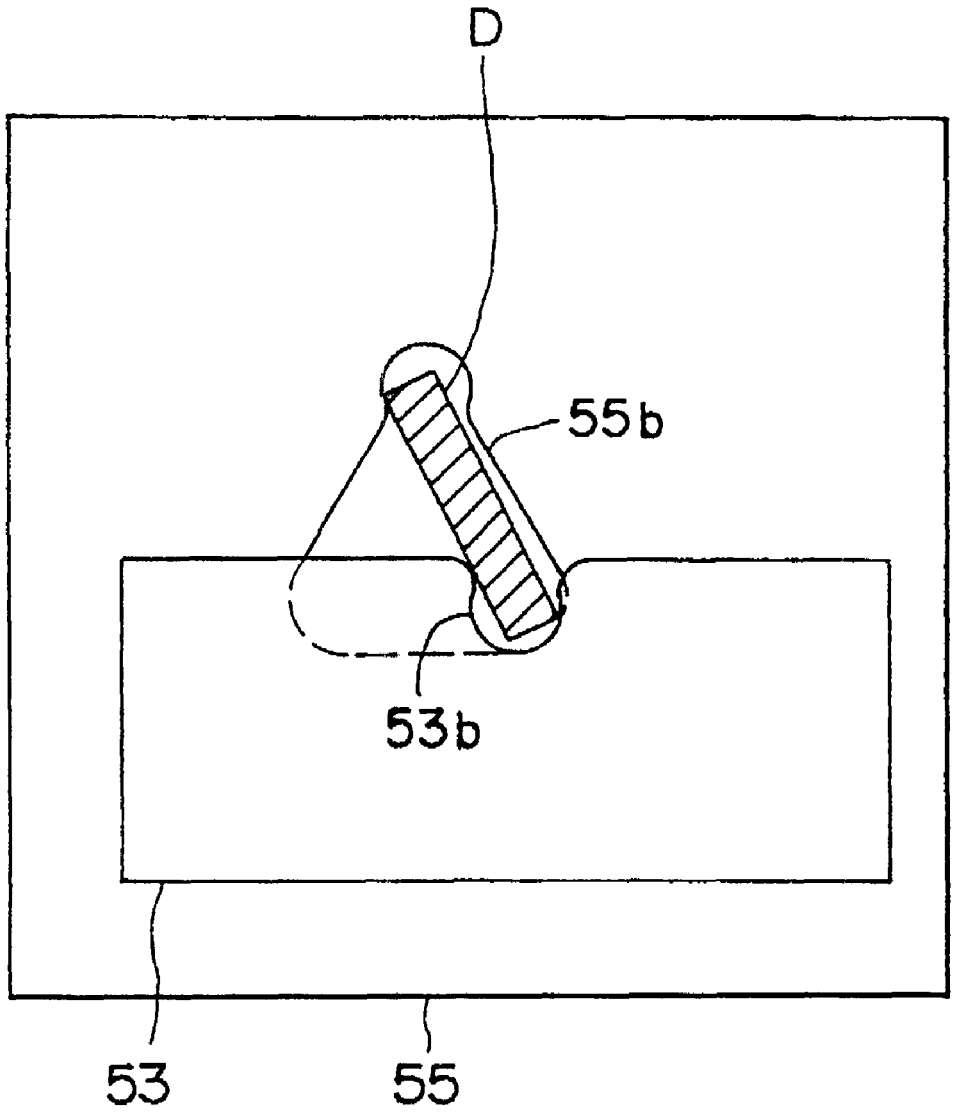
FIG. 8 is a detail view of FIG. 7.

The upper adjustment plate 53 has a notch 53b. The upper light guide 55 opposed to the notch 53b has a hole 55b which the same shape as the notch 53b. A space formed with the notch 53b and the hole 55b has a shape where the tip of the screwdriver D can be inserted regardless of the position of the upper adjustment plate 53 in its allowable slidable range. FIG. 8 shows a detail of the shapes of the notch and hole. By loosening a screw which fixes the upper adjustment plate 53 and the upper light guide 55 and rotating the tip of screwdriver D inserted into the space between the notch 53b and the hole 55b, the upper adjustment plate 53 is guided and slid with the oval hole 53a and the dowel 55a. Thus, an upper portion of the light valve fixing plate 51 rotatably guided with the upper adjustment plate 53 approach or goes away from the projection lens 57. The direction in which the light valve fixing plate 51 moves corresponds with the direction that the screwdriver D rotates.

Likewise, by loosening a screw which fixes the lower light guide 54 and the lower adjustment plate 52 and rotating the tip of the screwdriver inserted into the space between a notch 52b and a hole 54b, the lower adjustment plate 52 is guided and slid with the oval hole 52a and the dowel 54a. Thus, a lower portion of the light valve fixing plate 51 rotatably guided with the lower adjustment plate 52 approaches and goes away from the projection lens 57.

The light valve fixing place 51 has a notch 51c. The lower adjustment plate 52 opposed to the notch 51c has a hole 52c which has the same shape as the notch 51c. By loosening a screw which fixes the light bulb fixing plate 51 and the lower adjustment plate 52 and rotating the tip of the screwdriver inserted into the space between the notch 51 and the hole 52c, the light valve fixing plate 51 rotates about a line which passes through the dowel 51a and the dowel 51b. At this point, the direction in which the driver rotates corresponds with the direction that the light valve fixing plate 51 rotates.

In the above-mentioned construction, only by removing the screws which fix the upper adjustment plate 53 and the light valve fixing plate 51, the adjustment mechanism can be dismounted from the light guide. Thus, the workability in the assembling process and after-service is very high.

FIG. 9 shows an example where the combination of the above-mentioned notch and hole is used for an alignment adjustment mechanism of a three-plate projection type liquid crystal projector. In the three-plate liquid crystal projection apparatus, to match the apparent positions of the three R, G, and B liquid crystal panels, the apparent positions of at least two liquid crystal panels should be adjusted in the horizontal, rotational, and vertical directions. In an example shown in FIG. 9, a horizontal adjustment plate 58 has a plurality of notches so as to widen the adjustment range. By forming holes with the same shape as the notches on the rotation adjustment plate 59, adjustment portion can be disposed at any positions of the rotation adjustment plate 59 rather than the notches disposed on the periphery thereof. Thus, the degree of freedom can be improved in designing the rotation adjustment plate 59. In FIG. 9, reference numeral 60 is a vertical adjustment plate.

Consequently, in the above-mentioned construction, the position of the light valve can be adjusted with a minimum number of parts. In addition, since the tip of screwdriver fits in the space between the notch and the hole, the screwdriver does not fall during the adjustment work. Moreover, since the direction in which the screwdriver rotates corresponds to the direction in which the light valve moves, the adjustment can be easily performed.

By applying the above-mentioned adjustment and operation mechanism to the matching of pixels of the liquid crystal light valves 7a, 7b, and 7c, the mechanism can be simplified.

As described above, in the projection type liquid crystal projector, light of a white light source is separated into rays of three colors of red, green, and blue with dichroic mirrors. Thereafter, the rays of these colors enter liquid crystal panels. Next, these rays are mixed by dichroic mirrors. Then, the mixed rays are projected onto a screen by a projection lens.

Thus, if the accuracies of the positions and angles of the dichroic mirrors (B.D.M.) and the reflection mirrors 4a and 4b are low, the optical axis of each color deviates from positions of a accurate color and irregular coloration takes place in the composed picture (hereinafter, this situation is referred to as unevenness of colors). Moreover, in this situation, images projected from the panels also deviate from matched or aligned positions (hereinafter, this situation is referred to as deviation of pixels).

In this embodiment, since the lower chassis plate 8b, which mounts the dichroic mirrors, reflection mirrors, and so forth, is made of a metal plate, the production cost of the lower chassis plate 8b is low. In addition, the accuracy of the metal mold is very high. Thus, the lower chassis plate 8b can be quantitatively produced with high accuracies of positions and angles of part mounting holes. In other words, since there is no deviation of each color, the optical system units free of unevenness of colors and deviation of pixels can be quantitatively produced. The design of the units can be easily changed by slightly modifying the design of the metal mold.

If a liquid crystal projector were constructed in such a way that the optical system unit, which mounts the dichroic mirrors, reflection mirrors, and so forth, is fixed to an outer case with screws, the lower chassis plate would be exposed to an excessive force. Thus, the positions and angles of the dichroic mirrors, reflection mirrors, and so forth, which are mounted on the lower chassis plate, would deviate. Thereby, the optical axes in the optical system unit would deviate, resulting in occurrences of unevenness of colors and deviation of pixels. However, in this embodiment, the periphery of the lower chassis plate is processed by a bending operation, the adjacent portion being processed by spot welds 8i, the resultant plate being formed in a box shape by drawing or the like. Thus, the strength of the lower chassis plate can be maintained, thereby preventing the positions and angles of the dichroic mirrors, reflection mirrors, and so forth from deviating. Consequently, the strength of the optical system unit can be maintained, so that unevenness of colors and deviation of pixels can be prevented. When the lower chassis plate is fixed to the outer case and other board at three points in the vicinity of the beam mixing portion or in the vicinity of the separating portion, the forge applied to the lower chassis plate can be decreased. This is because there are many vent openings on the cooling upper and lower chassis plates in the vicinity of the liquid crystal light valve. Thus, the strength of these portions is high. When the lower chassis plate is fixed to a portion with a high strength in the region between the lamp to the liquid crystal light valve or the region between the liquid crystal light valve and the reflection lens, of the lower chassis plate can be made flat. On the other hand, the mounting portion of the projection lens is not in a box shape. Thus, the strength of this portion is low. However, by placing the upper chassis plate 8a on the lower chassis plate in the same box shape as the upper chassis plate, the relevant strength can be kept. As described above, this embodiment is suitable for quantitatively producing liquid crystal video projectors which can project beautiful pictures.

Figure 10:
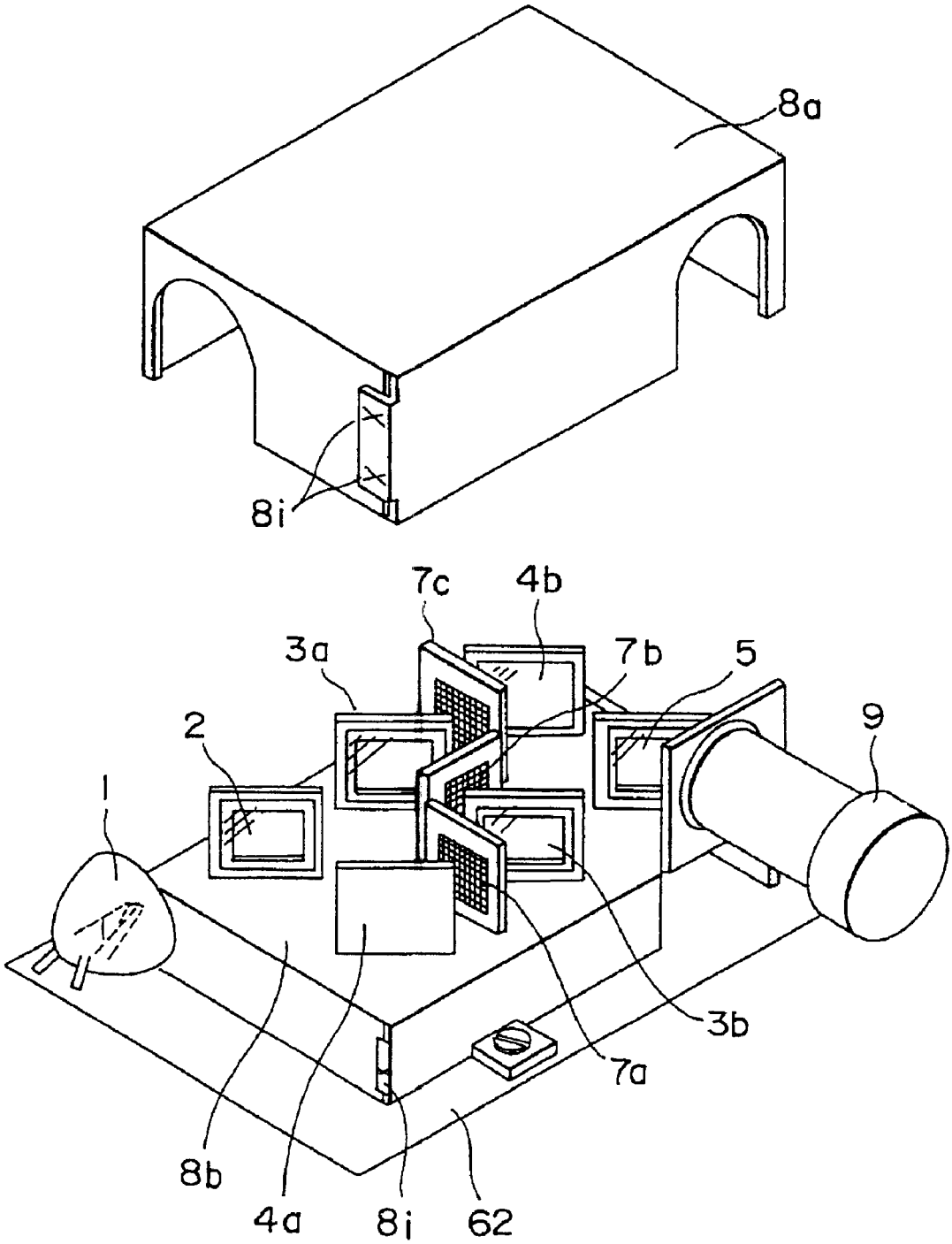
FIG. 10 is an exploded perspective view of a chassis and a cover.
Figure 11:
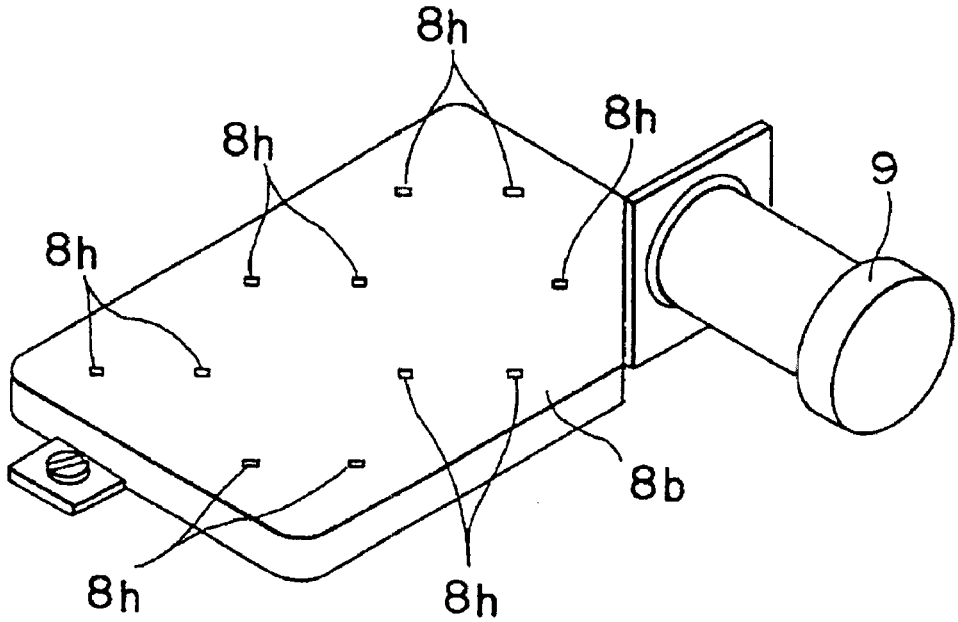
FIG. 11 is a perspective view showing the chassis.

Next, with reference to FIGS. 10 and 11, an embodiment of the liquid crystal video projector will be described. FIG. 10 is a perspective view showing a lower chassis of the optical system unit of the liquid crystal projector according to the present invention. The lower chassis plate 8b is made of metal. The periphery of the lower chassis plate 8b is bent or drawn so that the lower chassis plate 8b is formed in a box shape. The lower chassis plate 8b has mounting holes 8h. Fixing frames which fix the dichroic mirrors, reflection mirrors, and so forth are mounted and fixed to these holes. Since the lower chassis plate 8b is made of metal, its production cost is low. In addition, by slightly modifying the shape of the metal mold of the lower chassis plate 8b, the design of the lower chassis plate 8b can be changed wholly or partially. Moreover, since the lower chassis plate 8b is constructed in the box shape by bending or drawing the strength thereof is maintained. Thus, when the lower chassis plate 8b is fixed to an outer case of a liquid crystal video projector with screws, even if an excessive force is applied to the lower chassis plate 8b, the positions and angles of the part mounting holes thereof would not deviate.

Thus, deviations of positions and angles of the reflection mirrors, which have been known as a cause of unevenness of colors and deviation of pixels, can be solved and thereby more beautiful pictures can be projected.

Figure 12:
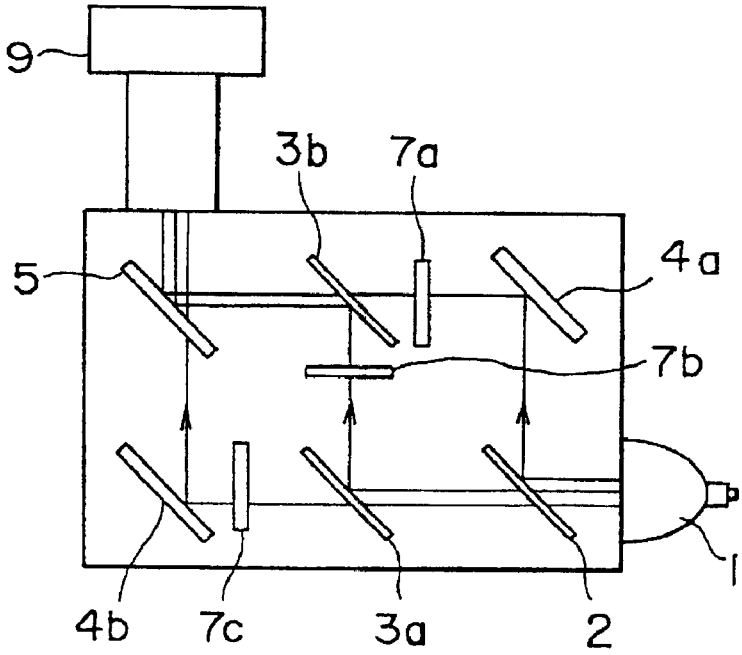
FIGS. 12 and 13 are plan views showing the compatibility of liquid crystal light bulbs.

In a liquid crystal video projector shown in FIG. 12, light from a white light source is separated into rays of three colors of red, green, and blue with separating dichroic mirrors 2 and 3a. The rays of separated colors enter liquid crystal light valves 7b, 7a, and 7c. Thereafter, the rays of separated colors are mixed by mixing dichroic mirrors 3b and 5. Next, the mixed rays are projected onto a screen by a projection lens 9.

In this case, if any liquid crystal light valve has a point defect, a portion of the relevant color of red, green, and blue may not always be lit. Thus, the color of this portion changes. This point detect is not significant at the periphery of the screen, but it is in the center. In addition, the point defect of blue color whose relative visibility is low is not significant, while that of green color whose relative visibility is high is significant. Thus, the liquid crystal light valve for green requires higher precision than that for blue. In other words, if the high specifications were maintained, the yield of the liquid crystal light valve for green would be lower than that of the liquid crystal light valve for blue.

To prevent this disadvantage, when the liquid crystal light valve for green is of the same construction as that for blue, that is, both the liquid crystal light valves have compatibility to each other, the better one can be used for green so as to decrease significant green point defects. In a quantitative production stage, liquid crystal light valve which are not suitable for green can be sometimes used for those for blue. Thus, when the liquid crystal light valves for green are used for those for blue, the yield thereof can be improved. In addition, since the number of types of liquid crystal light valves to be designed and produced is reduced from three to two, the cost thereof can be decreased.

Figure 13:
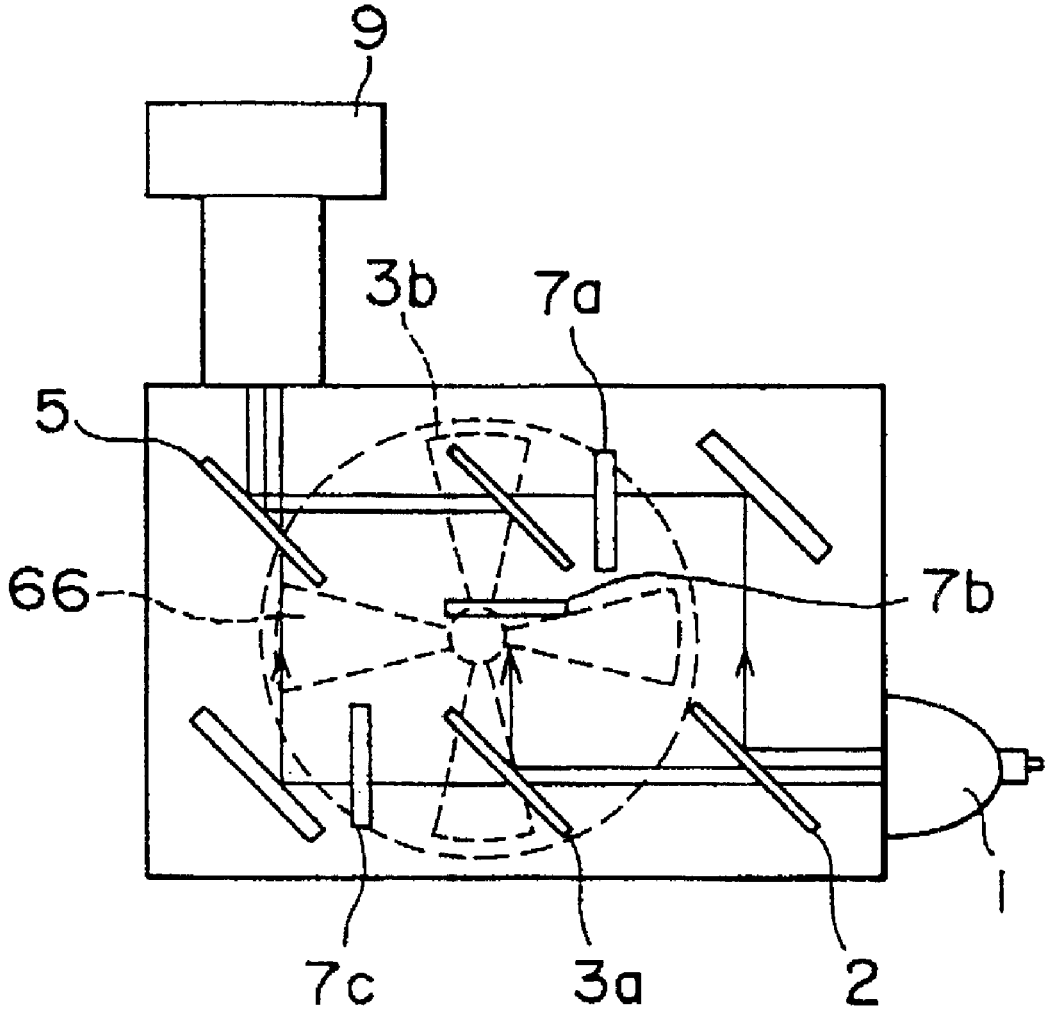

In a liquid crystal video projector shown in FIG. 13, light from a white light source is separated into rays of three colors of red, green, and blue with separating dichroic mirrors 2 and 2a. The rays of separated colors enter liquid crystal light valves 7b, 7a, and 7c. Thereafter, the rays of separated colors are mixed by mixing dichroic mirrors 3b and 5. The mixed rays are projected onto a screen by a projection lens 9. However, the liquid crystal light valves are susceptible to heat. When these liquid crystal light valves are exposed to strong light, the temperature thereof rises and thereby accelerating the deterioration thereof. To solve this problem, a cooling fan 66 mounted in the vicinity of the liquid crystal light valves is rotated so as to generate wind. This wind cools the liquid crystal light valves so as to prevent them from deteriorating.

In this embodiment, the red color type liquid crystal light valve 7b is disposed midway between the green color type liquid crystal light valve 7a and the red color type liquid crystal light valve 7c. Below the red color type liquid crystal light valve 7c, the cooling fan 66 is disposed. The wind produced by the cooling fan 66 cools the three liquid crystal light valves. When the cooling fan 66 is rotated, it allows wind to satisfactorily blow the blue and green color type liquid crystal light valves 7c and 7a disposed outside of the red color type liquid crystal light valve 7b.

The cooling fan 66 according to this embodiment is of a blade type. When the cooling fan 66 is rotated, the wind force in the periphery thereof is stronger than that in the center thereof. The wavelength of rays of light which enter each liquid crystal light valve differs from each other. The energy of rays of blue region which enters the blue color type liquid crystal light valve is higher than that of the green and red regions. Thus, singe the temperature of the blue color type liquid crystal light valve rises most, the necessity of cooling this valve is highest. In contrast, since the energy of rays which enter the red color type liquid crystal light valve is least and the temperature of this valve does not greatly rise, the necessity of cooling this valve is comparatively low. In addition, singe rays which enter each liquid crystal light valve have been passed through an infrared ray cutting filter after being emitted from the light source, infrared rays do not enter each liquid crystal light valve.

Thus, as described in the above-mentioned embodiment, the cooling fan 66 is disposed below the red color type liquid crystal light valve 7b so that wind produced by the cooling fan 66 satisfactorily blows against the blue and red color type liquid crystal light bulbs. In other words, the blue color type liquid crystal light valve which is highly heated by the rays with high energy is disposed at the peripheral portion of the cooling fan where the wind force is strong and the red color type liquid crystal light valve which is less heated by the rays with low energy is disposed at the center portion of the cooling fan where the wind force is weak. Consequently, each liquid crystal light valve can be effectively cooled without cooling loss. In addition, with one fan, the plurality of liquid crystal light valves can be cooled. In addition to reducing the cost of the product, the weight and size thereof can be decreased.

In this embodiment, an image produced by entering rays of red region separated by the separating dichroic mirrors 2 and 3a into the liquid crystal light valve 7a (hereinafter this image is referred to as a red image) and an image produced by entering rays of greed region separated likewise (hereinafter this image is referred to as a green image) are mixed by the dichroic mirror 3b. Thereafter, the mixed image and an image produce by entering rays of blue region into the liquid crystal light valve 7c (hereinafter this image is referred to as a blue image) are mixed by the dichroic mirror 5. Thus, a mixed image with three colors of red, green, and blue can be obtained.

In the above-mentioned embodiment, by decreasing the thickness of the red color mixing dichroic mirror 3b, the astigmatism of the green image which passes through this mirror 3b is decreased. However, when the thickness of the dichroic mirror is decreased, the surface accuracy of the red mixing dichroic mirror 3b deteriorates and thereby lowering the accuracy of the reflection. Thus, it is assumed that the resolution of the red image being reflected degrades. However, since the distance between the red mixing dichroic mirror 3b and the red color type liquid crystal light valve 7b is small, the degradation of the surface accuracy of the red mixing dichroic mirror does not significantly affect the image quality. Moreover, in this embodiment, by increasing the thickness of the mixing dichroic mirror 5, the surface accuracy is maintained and thereby the resolution of the image mixed by the red mixing dichroic mirror 3b is maintained. However, when the thickness of the mixing dichroic mirror 5 is increased, the astigmatism of the blue image transmitted in the mixing dichroic mirror 5 becomes large. Nevertheless, since the relative visibility of the blue image is lower than that of the green and red images, it is not significant.

Thus, in the embodiment shown in FIG. 12, since the green color type liquid crystal light valve 7a and the blue color type liquid crystal light valve 7c are interchangeably used, point defects of the green image with high relative visibility can be decreased. A liquid crystal light valve which is not suitable for the green color liquid crystal light valve 7a can be sometimes used as one for blue. Thus, the yield can be improved. Conventionally, three types of liquid crystal light valves have been designed and produced. However, according to this embodiment, the number of types of liquid crystal light valves can be reduced from three to two. Thus, cost reduction can be accomplished.

In the embodiment shown in FIG. 13, the red color type liquid crystal light valve 7b is disposed midway between the green color type liquid crystal light valve 7a and the blue color type liquid crystal light valve 7c. The cooling fan 66 which allows wind to satisfactorily blow against the green and blue type color liquid crystal light valves 7a and 7b is disposed below the red color type liquid crystal light valve 7b. Thus, the blue color type liquid crystal light valve which is heated most can be effectively cooled down. Consequently, without cooling losses, the single fan can cool down the plurality of liquid crystal light valves. Therefore, in addition to reducing the production cost, the weight and size thereof can be decreased.

Moreover, in the embodiment shown in FIG. 12, by decreasing the thickness of the red color mixing dichroic mirror 3b, the astigmatism of a green image whose relative visibility is high can be decreased. By increasing the thickness of the mixing dichroic mirror, the surface accuracy thereof can be improved. Thus, the image mixed by the red color mixing dichroic mirror 5 can be precisely reflected.

Figure 14:
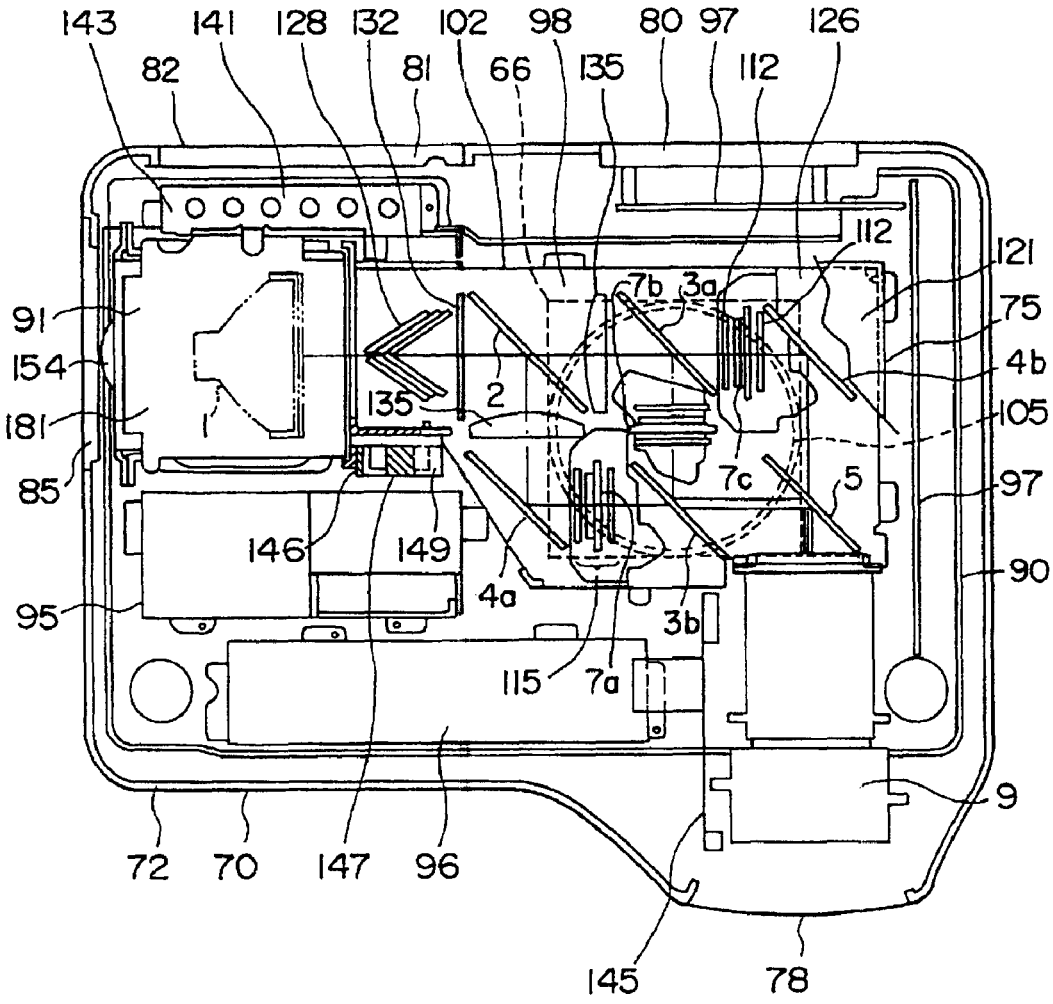
FIG. 14 is a schematic assembly plan view showing the entire construction of the present invention.
Figure 15:
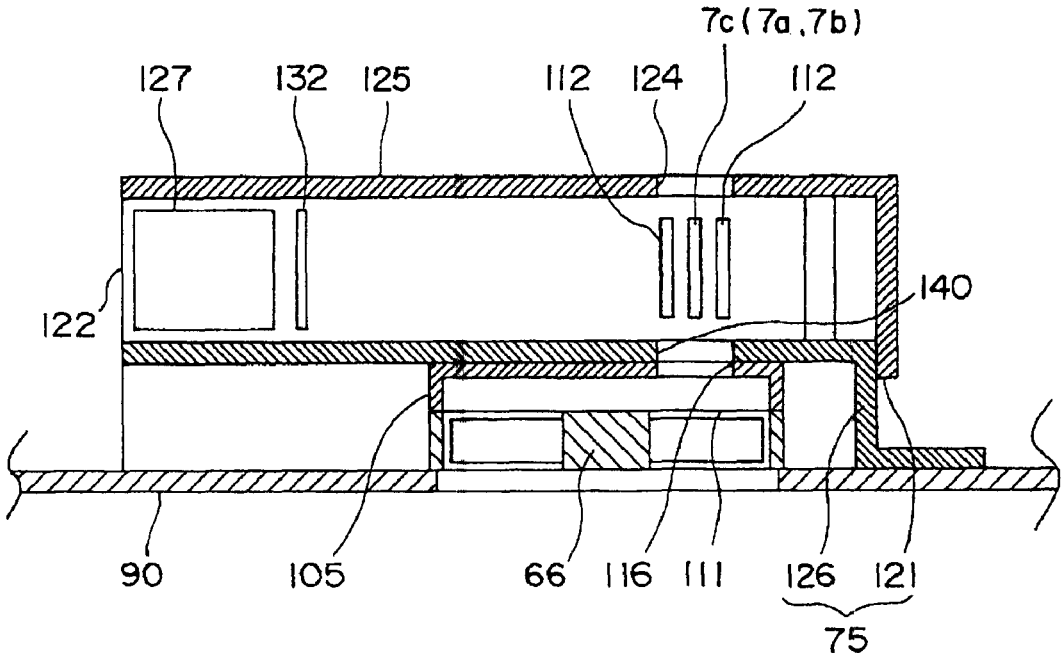
FIG. 15 is a sectional view showing an optical.
Figure 16:
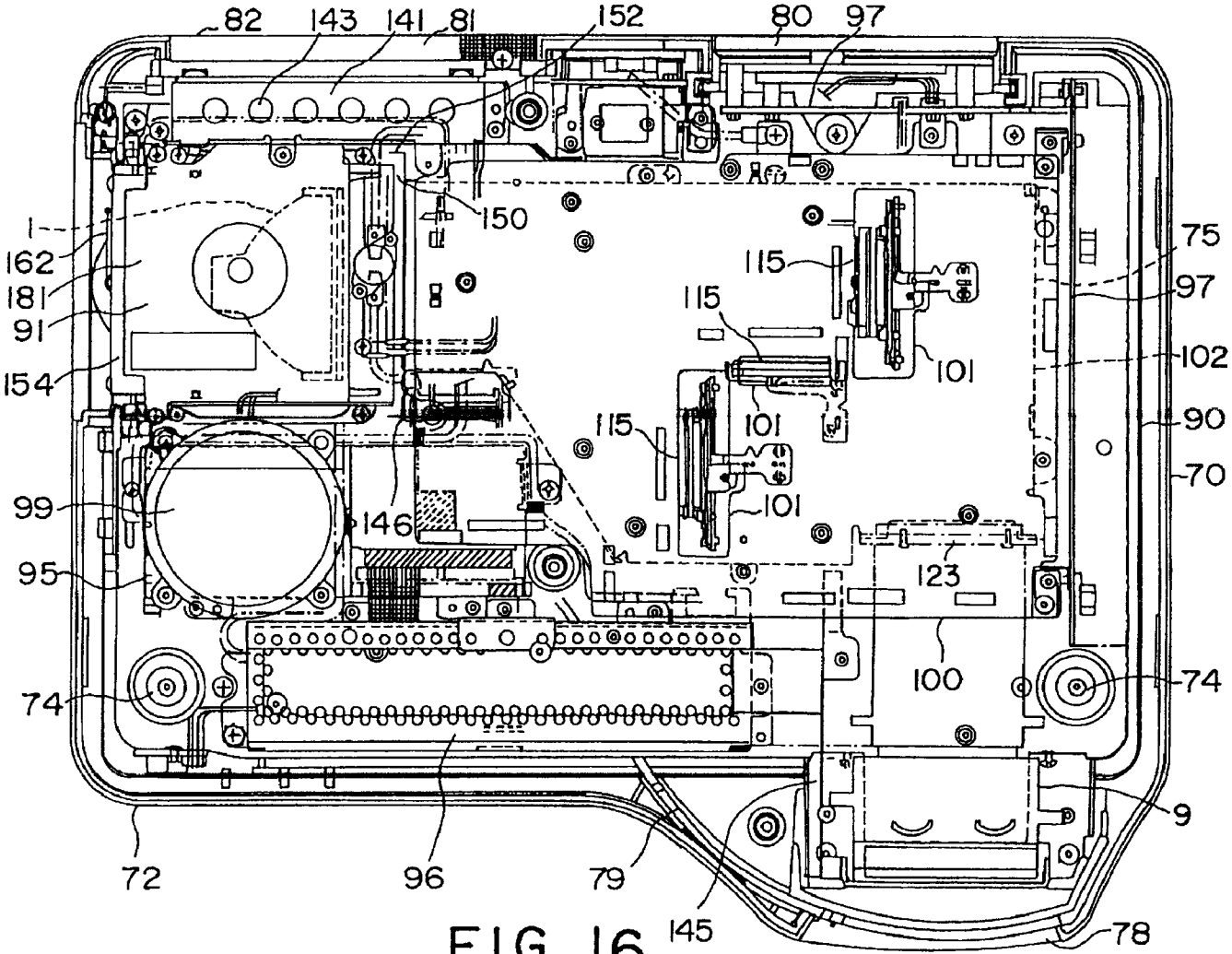
FIG. 16 is a detail assembly plan view showing the optical unit.

FIGS. 14 to 56 show practical examples of the overall construction including a cooling unit of the liquid crystal projector of the present invention. FIG. 14 is a schematic assembly plan view seen from the top of the liquid crystal projector.

Figure 17:
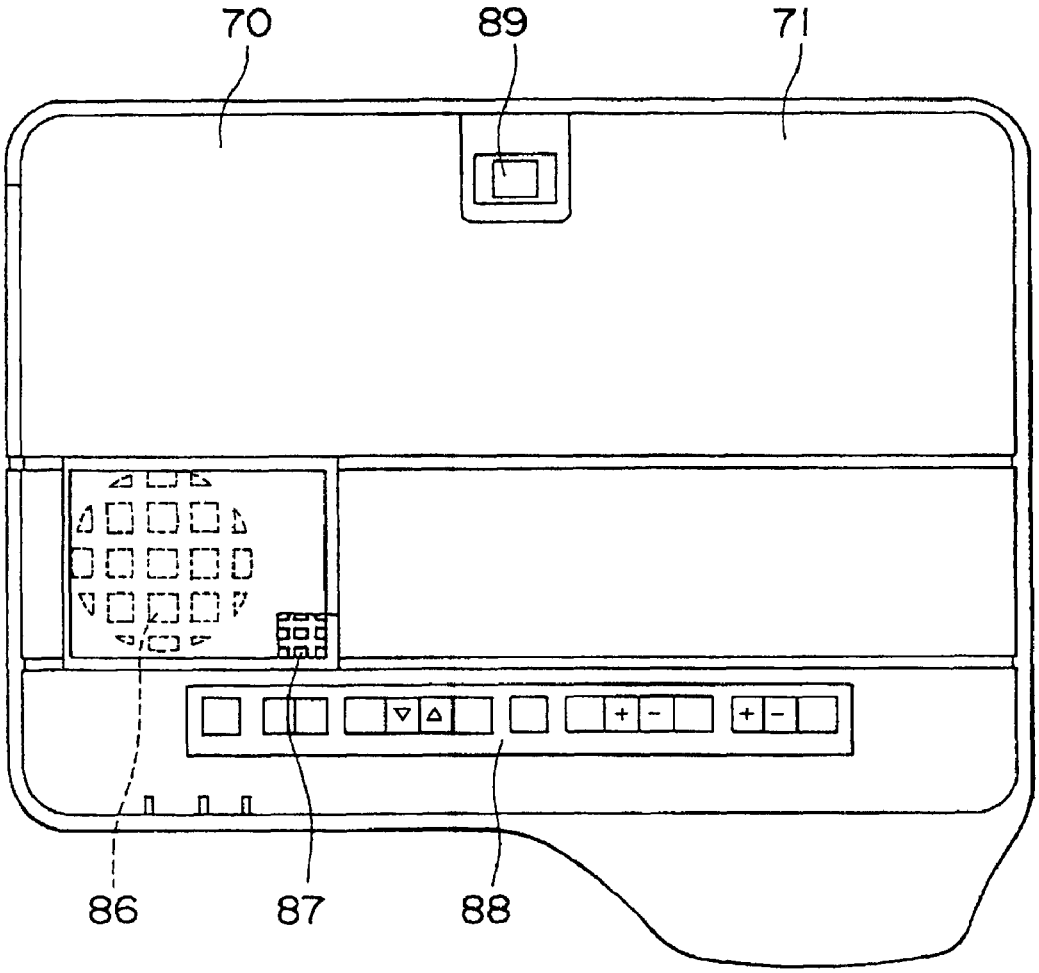
FIG. 17 is a plan view showing the case.
Figure 18:
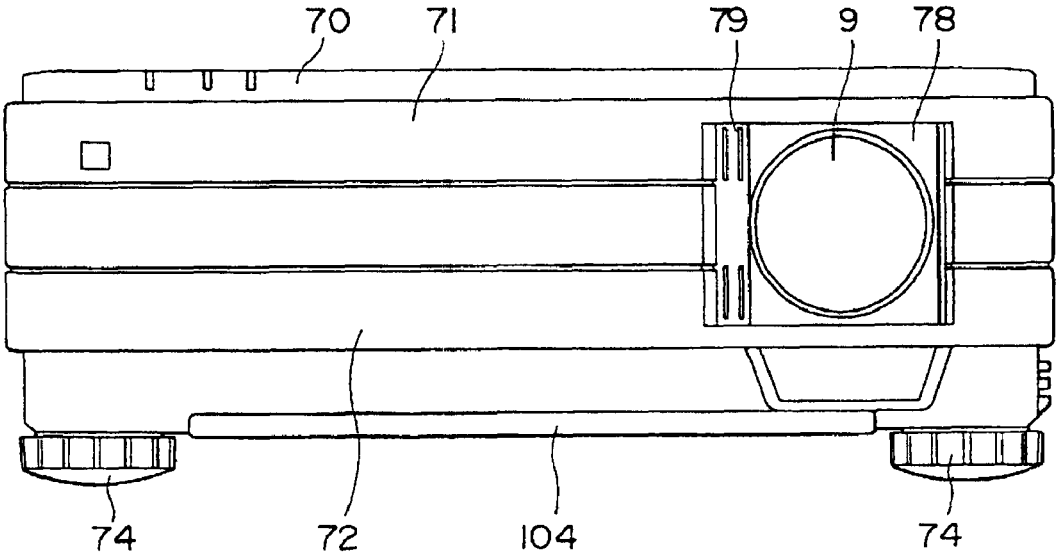
FIG. 18 is a front view of the case.
Figure 19:
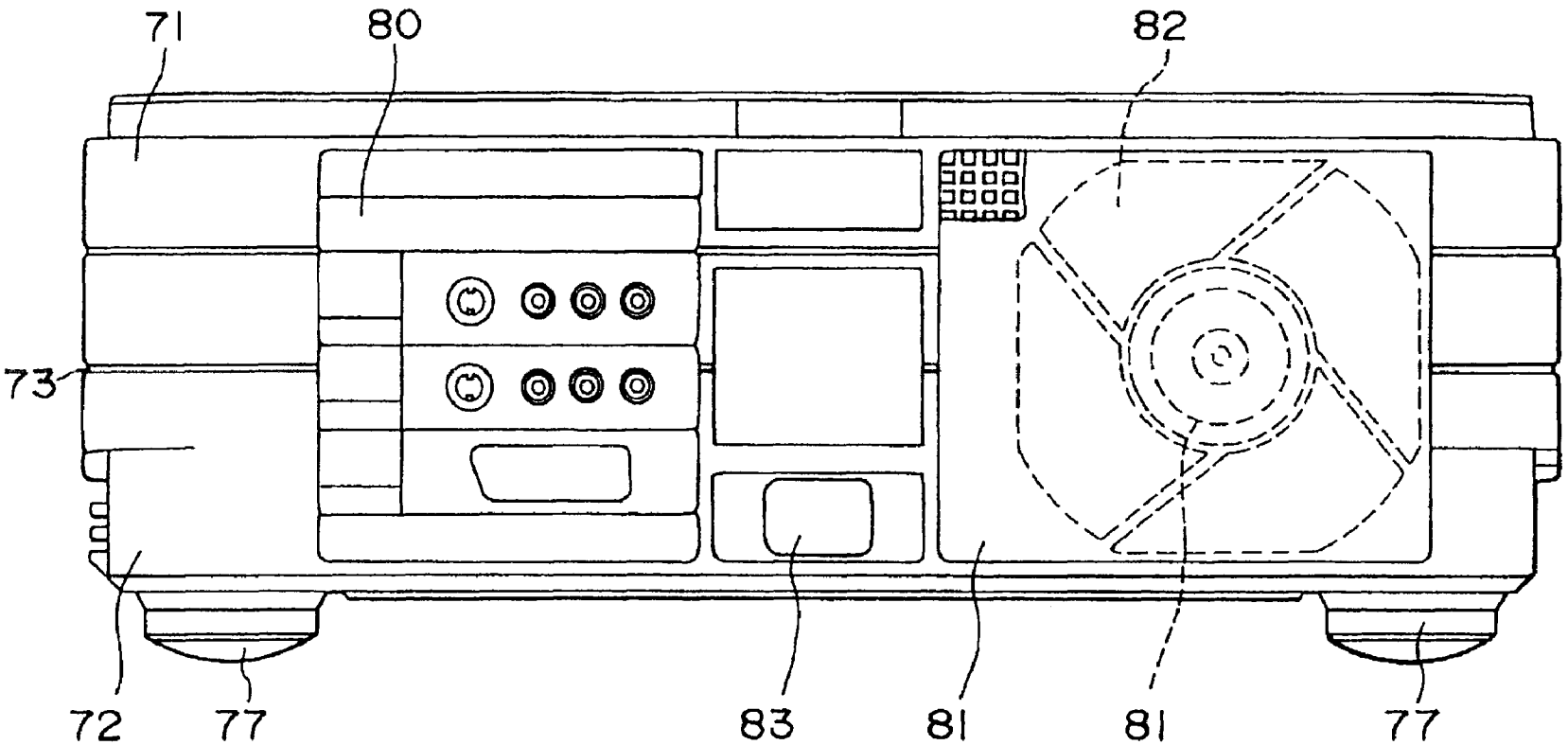
FIG. 19 is a rear view of the case.
Figure 20:
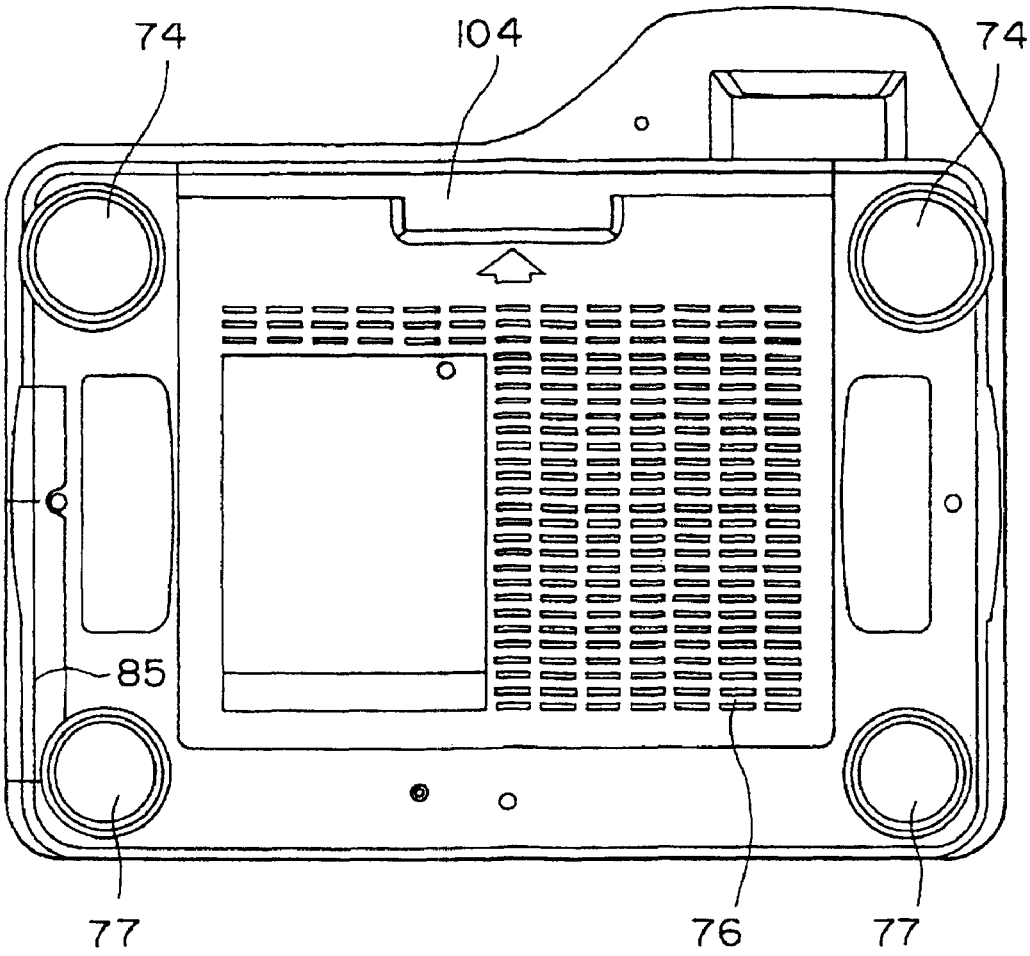
FIG. 20 is a bottom view of the case.
Figure 21:
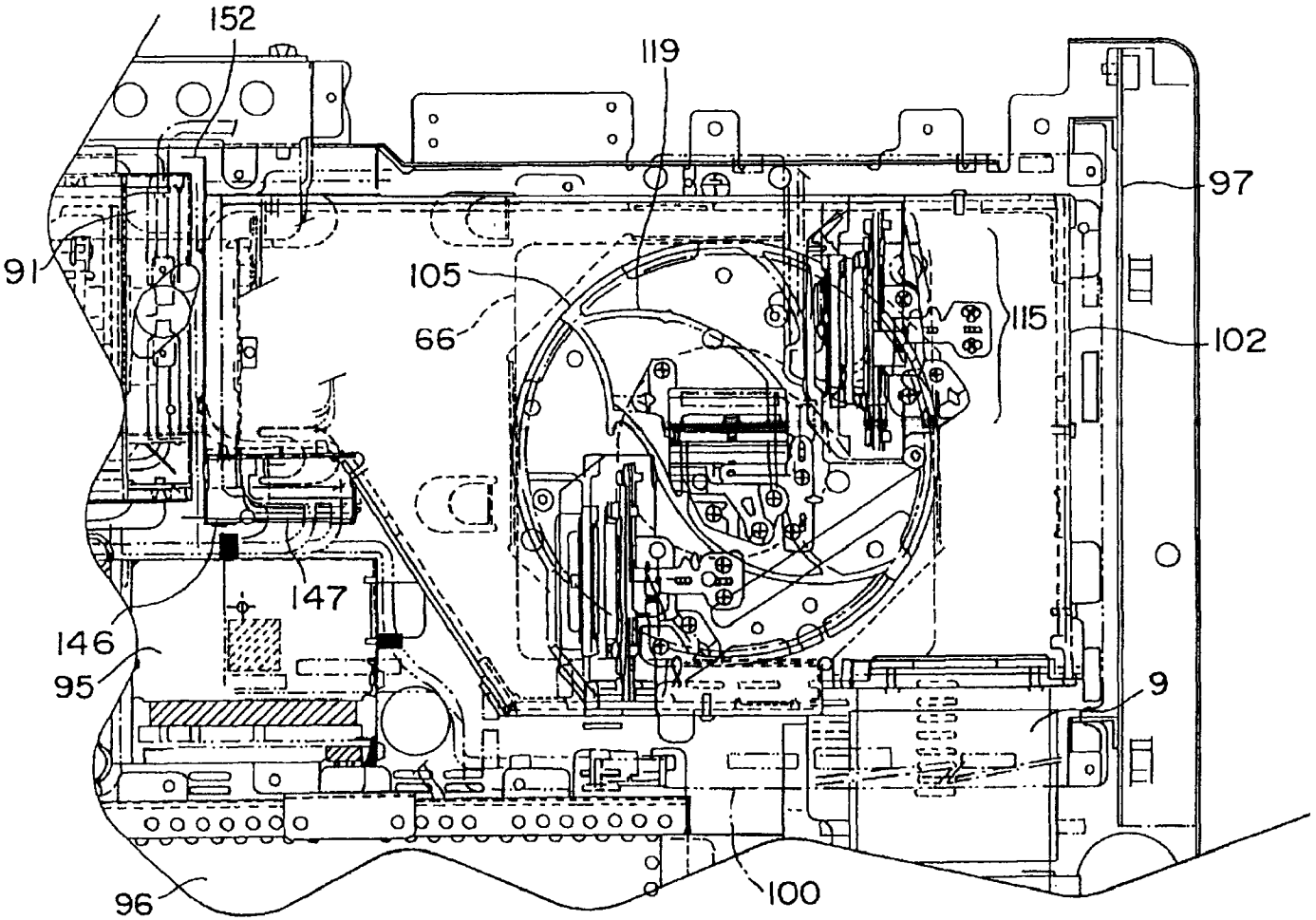
FIG. 21 is a partial assembly plan view.

The liquid crystal projector of the present invention has a case 70 which is substantially of a rectangular parallelepiped shape. The case 70 accommodates all parts, functionally separated as units. As shown in FIGS. 17 to 19, the case 70 comprises a lower case 72 and an upper case 71 which can be separated at a separation line 73.

At front symmetrical positions of the bottom of the lower case 72, a pair of threaded adjusters 74 for adjusting the vertical position of a projected picture are provided. At a position below an optical unit 75 (which will be described later), an air intake slit portion 76 is formed. At rear symmetrical positions of the lower case 72, a pair of fixing members 71 are disposed.

A window 78 of the projection lens is formed at a position slightly left of the center of the case 70. By sliding a cover plate 78 sidewardly, the window 79 is open. Since the cover plate 79 is bent in an arc shape. it slides along an arcuate path.

At a right position of the rear of the case 70, an inter-face board frame unit 80 for connecting each interface is attached from the top. At a left position of the rear of the case 70, an air exhaust fan cover 81 is attached from the top. In the center of the air exhaust fan cover 81, an air exhaust opening 82 is formed. As shown in FIG. 19, at a lower center position of the rear of the case 70, a power receptacle 83 is disposed.

At a left position of the rear of the case 70, a lamp housing cover 85 for accessing an inner housing 154 is disposed.

At a position left of the center of the top of the upper case 71, a speaker hole portion 86 for conveying sound generated by a speaker is formed. On the speaker hole portion 86, a speaker cover 87 made of a punched plate having small holes is disposed. At a front position of the top of the upper case 71, an operation panel 88 on which the user effects for example image, sound, and autofocus adjustment operations is disposed. At a rear position at the center of the top of the upper case 71, a power switch button 89 is disposed.

A base plate 90 is detachably mounted on the lower case 72 with screws.

On the base plate 90, an optical unit 98 (see FIG. 28) where a lamp housing unit 91 and a projection lens unit 92 are assembled in a light guide unit 102 is disposed in such a way that the main optical path is in an L shape when viewed from the top thereof (see FIG. 14). In addition, the projection lens unit 9 faces the window 78 in the from of the case 70. Moreover, the access direction of an inner housing 154 of the lamp housing unit 91 faces the lamp housing cover 85 on the left of the case 70.

A power unit 95 is disposed in the front of the lamp housing unit 91 and on the air intake side. A lamp stabilizing unit 96 is disposed on the left of the projection lens unit 9. A video board unit 97 is disposed outside the optical unit 75. The lamp housing unit 91, the power unit 95, the stabilizing unit 96, the video board unit 97, and the optical unit 96 are separately and detachably mounted on the base plate 90.

The power unit 95 and the lamp stabilizing unit 96 are accommodated in a shield case having a plurality of holes for drawing and exhausting air. The speaker 99 is fixed to the power unit 95 through the shield case.

A drive board unit 100 has a liquid crystal drive circuit, a microcomputer built-in system control circuit, and so forth. The drive board unit 100 is disposed at the top of the optical unit 75. The drive unit 100 has board holes 101 for routing cables for the liquid crystal light panels and air flow paths thereof. These holes 101 are formed over the respective liquid crystal light valves. These holes 101 allow air to flow to the top of the drive board unit 100.

The air intake fan 66, which is an axial flow fan, is mounted on the base plate 90 below the light guide unit 102. An integrally formed inlet air regulating plate 105 disposed midway between the air intake fan 66 and the light guide unit 102 allows fresh air drawn through the air intake slit portion 76 and a dust protecting filter 104 disposed on the bottom to branch into at least three flow routes toward the liquid crystal light valves and into a plurality of flow paths in the direction perpendicular to the air blow opening.

The optical unit 98 is the above-mentioned optical means. Hereinafter, the above-mentioned upper chassis plate 8a is referred to as an upper light guide 121 and the lower chassis plate 8b as a lower light guide 126. Then, these light guides 121 and 126 will be described in detail.

Figure 22:
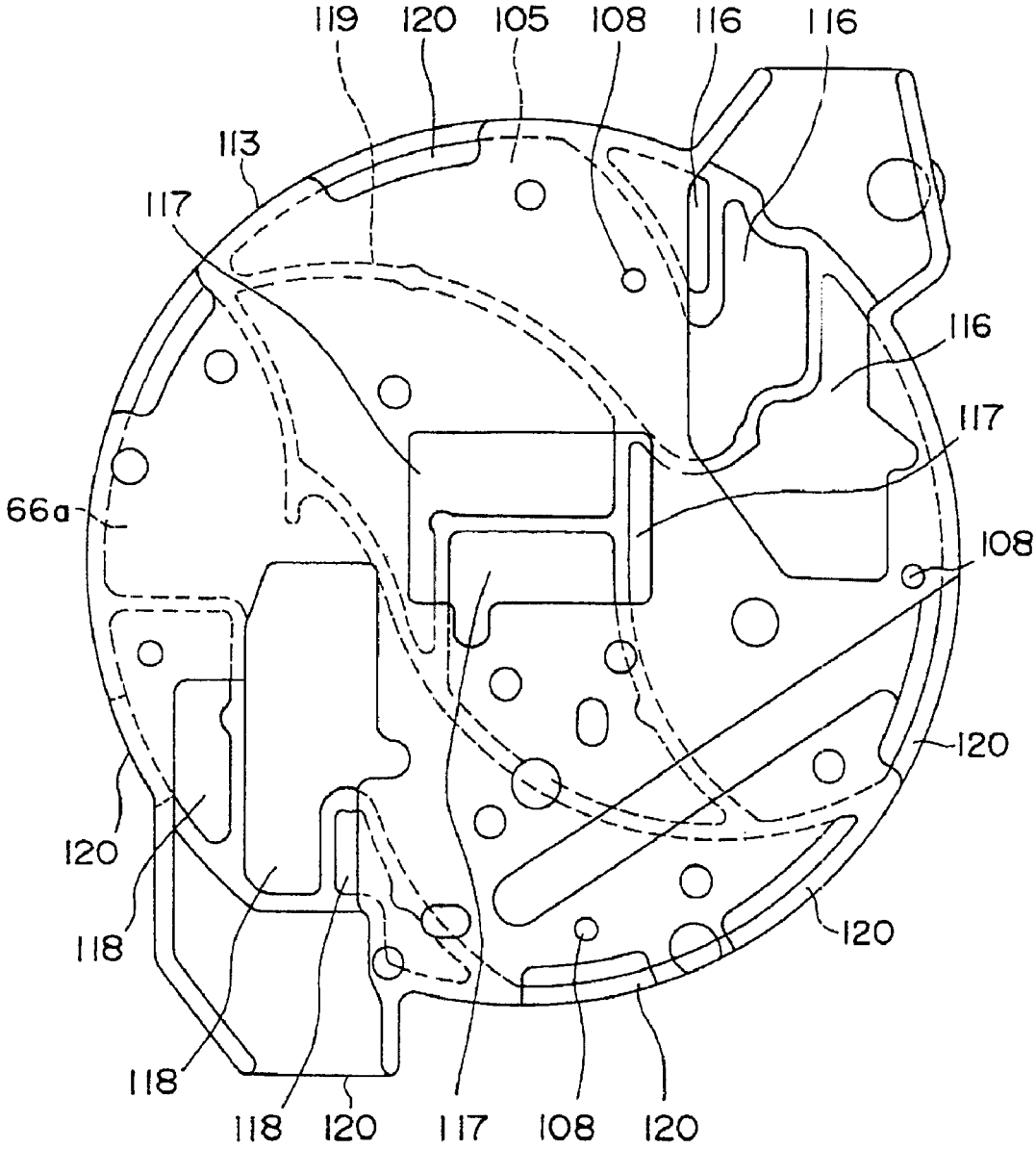
FIG. 22 is a plan view showing parts of an air intake regulating plate of FIG. 14.

As shown in FIG. 22, the air intake regulating plate 105 is connected to a guide hole 107 of the lower light guide 126. Thereafter, by inserting screws in the fixing holes 108f the air intake regulating plate 105 is fixed to the lower light guide. The air intake fan 66 is disposed at a position perpendicular to the three liquid crystal light valves 7c (7a, and 7b), which are disposed in a crank shape. In addition, these three liquid crystal light valves 7a, 7b, and 7c are disposed in a projection area with the air blow diameter of the air intake fan 66. As a result, the distance between the air blow opening 111 and each of liquid crystal light valves 7a, 7b, and 7c becomes short. In addition, the temperatures of the liquid crystal light valves 7a, 7b, and 7c and the polarizing plates 112 can be decreased.

Figure 50:
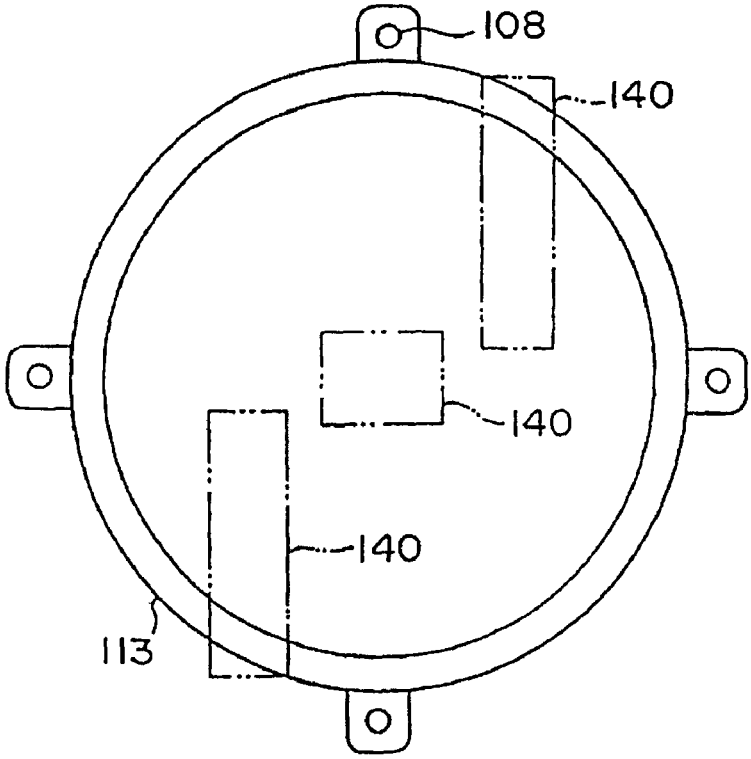
FIG. 50 is a plan view of an air intake regulating plate.
Figure 51:
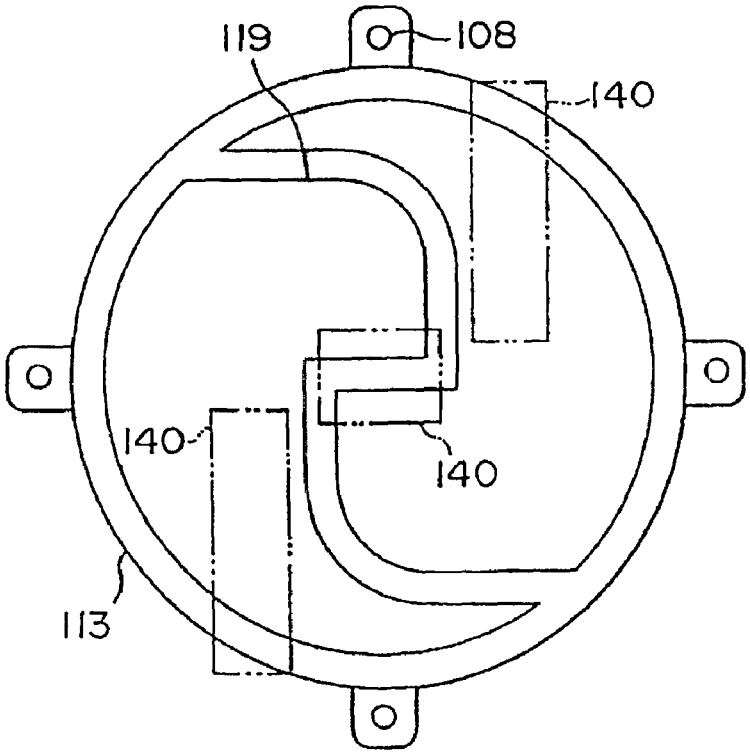
FIG. 51 is a plan view of an air intake regulating plate.
Figure 56A:
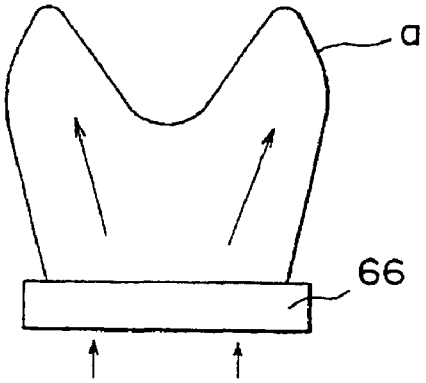
FIG. 56(a) to (d) are schematic diagrams showing test results of iso-speed distribution of an air intake fan.
Figure 56B:
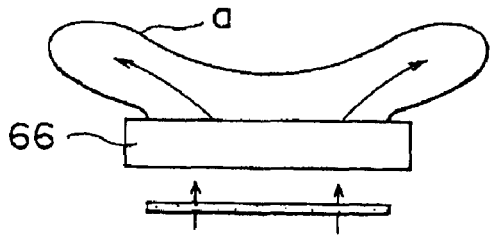
Figure 56C:
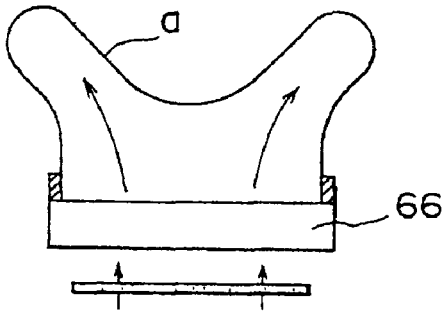
Figure 56D:
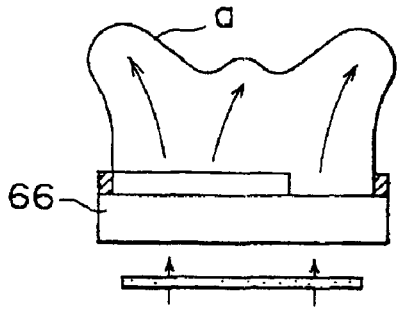

A second embodiment of the air intake regulating plate 105 has basically a cylindrical shape as shown in FIG. 50. A third embodiment of the air intake regulating plate has a construction where two curved branching walls and a straight wall are added to the construction of the first embodiment, the branching walls being connected inwardly from the periphery of the air intake regulating plate to the straight wall which is disposed in parallel with the surface of the liquid crystal light valve. The axial flow fan causes wind to blow in an inclined direction which is the same as the rotating direction of the fan blades. FIG. 56(a) shows a result of air speed data of the axial flow fan. From this figure, it is known that when no obstacles (such as net and filter) are present in the air intake side of the axial flow fan, although the center portion of iso-speed curve a is low, the curve is extended toward the front of the blades. When there are obstacles, as shown in FIG. 56(b), the overall speed of the axial flow fan decreases and the curve a is extended in the vicinity of the air blow opening. Thus, the wind blows outward. In the second embodiment, the iso-speed curve shown in FIG. 56(c) is obtained. The speed and direction of wind of the second embodiment as shown in FIG. 56(c) are superior to those of the related art as shown in FIG. 56(b). The iso-speed curve of the third embodiment is shown in FIG. 56(d). In the third embodiment, wind also blows from the center portion of the axial flow fan to the air blow side. As shown in FIG. 22, the first embodiment of the air intake regulating plate 105 is an improvement of the third embodiment. In the first embodiment, so as to easily inject and mold plastics, air blow openings 116, 117, and 118 facing three liquid crystal panel blocks 115 are formed below these blocks 115 on an upper surface 66a of a cylindrical member. A plurality of branch walls 119 made of curved and straight portions are disposed so that air flows through the liquid crystal light valve 7c (7a, and 7b) equally upwardly along the space of the polarizing plates 112. In addition, to activate the air flow of the entire flow paths in the case, a plurality of air blow openings 120 are formed on the side of the cylindrical member.

In FIG. 14, the optical unit 75 is a block for separating and mixing light of a light source. Reference numeral 121 an upper light guide which is made as a metal plate and is in a box shape. A light entrance opening 122 at which light enters and a light emit opening 123 from which light is emitted are open. Reference numeral 124 is an air blow opening of three air paths formed on the top 125 of the upper light guide 121. Reference numeral 126 is a lower light guide which is substantially of box shape. The upper light guide 121 accommodates optical parts in such a way that the upper light guide 121 covers the lower light guide 126. Column members are disposed midway between the upper light guide 121 and the lower light guide 126. In addition, the upper light guide 121 and the lower light guide 126 are secured by screws. As a result, the strength of the optical unit 75 becomes high. Reference numeral 127 is a prepolarizer block where a prepolarizer 128 made of a plurality of glass plates arranged in a V shape is clamped with a glass fixing plate 129, a support rubber 130, and a glass support plate 131. A UV and IR filter portion 132 is adhered to the glass support plate 131 with a double-sided adhesive tape. The prepolarizer block 127 is mounted at the position of the light entrance opening 122 of the optical unit 75. In this blocked construction, the length of the optical paths in the optical unit 75 is shortened and the shock resistance thereof is improved.

Next, optical pants accommodated in the optical unit will be described. The optical unit has three blocks, each of which contains the prepolarizer 128, the UV and IR filter portion 132, and the liquid crystal light valve 110. The polarizing plates 112 are disposed before and after each liquid crystal light halve. Thus, a total of six polarizing plates 112 are disposed in the three blocks. Reference numerals 4a and 4b are mirrors. Reference numerals 2, 3a, 3b, and 5 are dichroic mirrors. Reference numeral 135 is a condenser lens. These optical parts are fixed to plate shape fixing members. These fixing members are fixed to the inside of the optical unit 75. As described above, the liquid crystal light valves 7a, 7b, and 7c, and the polarizing plates 112 are grouped into three liquid crystal light valve blocks 115, each of which has an adjustment mechanism.

The projection lens unit 9 is fixed in accordance with the light emitting opening 136 of the lower light guide 126.

Figure 23:
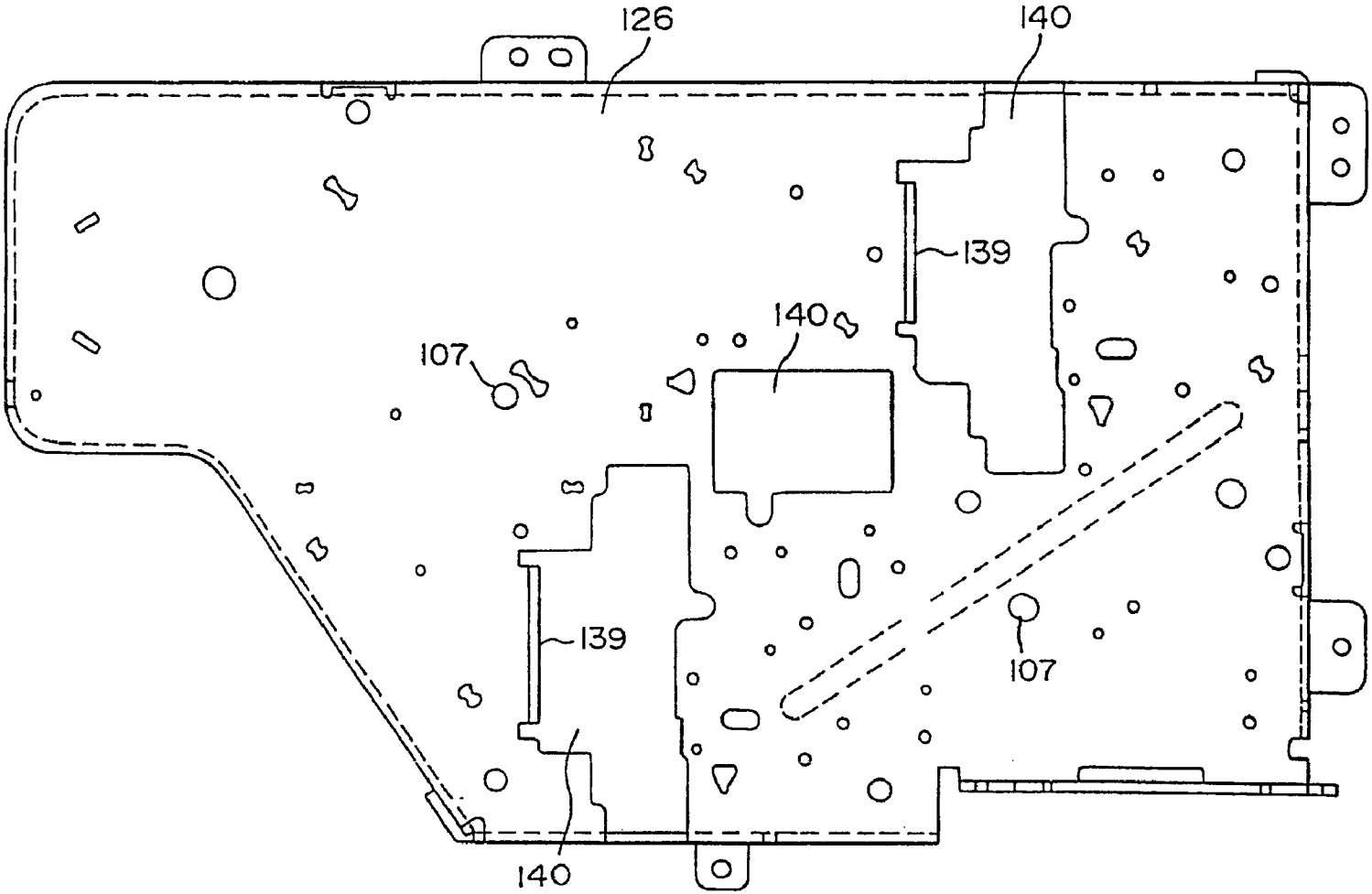
FIG. 23 is a plan view showing parts of a lower light guide of FIG. 22.
Figure 24:
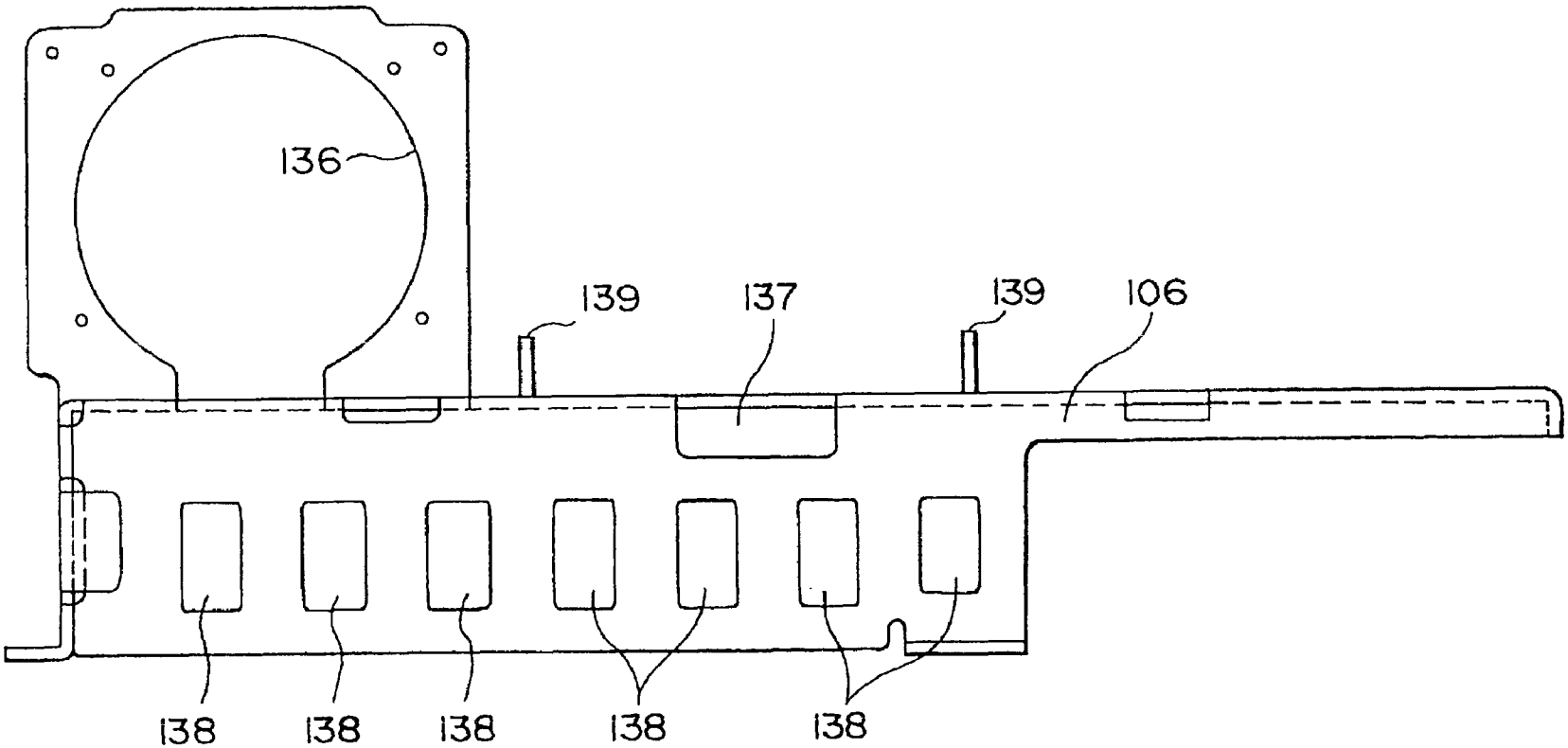
FIG. 24 is a rear view showing parts of the lower light guide.
Figure 25:
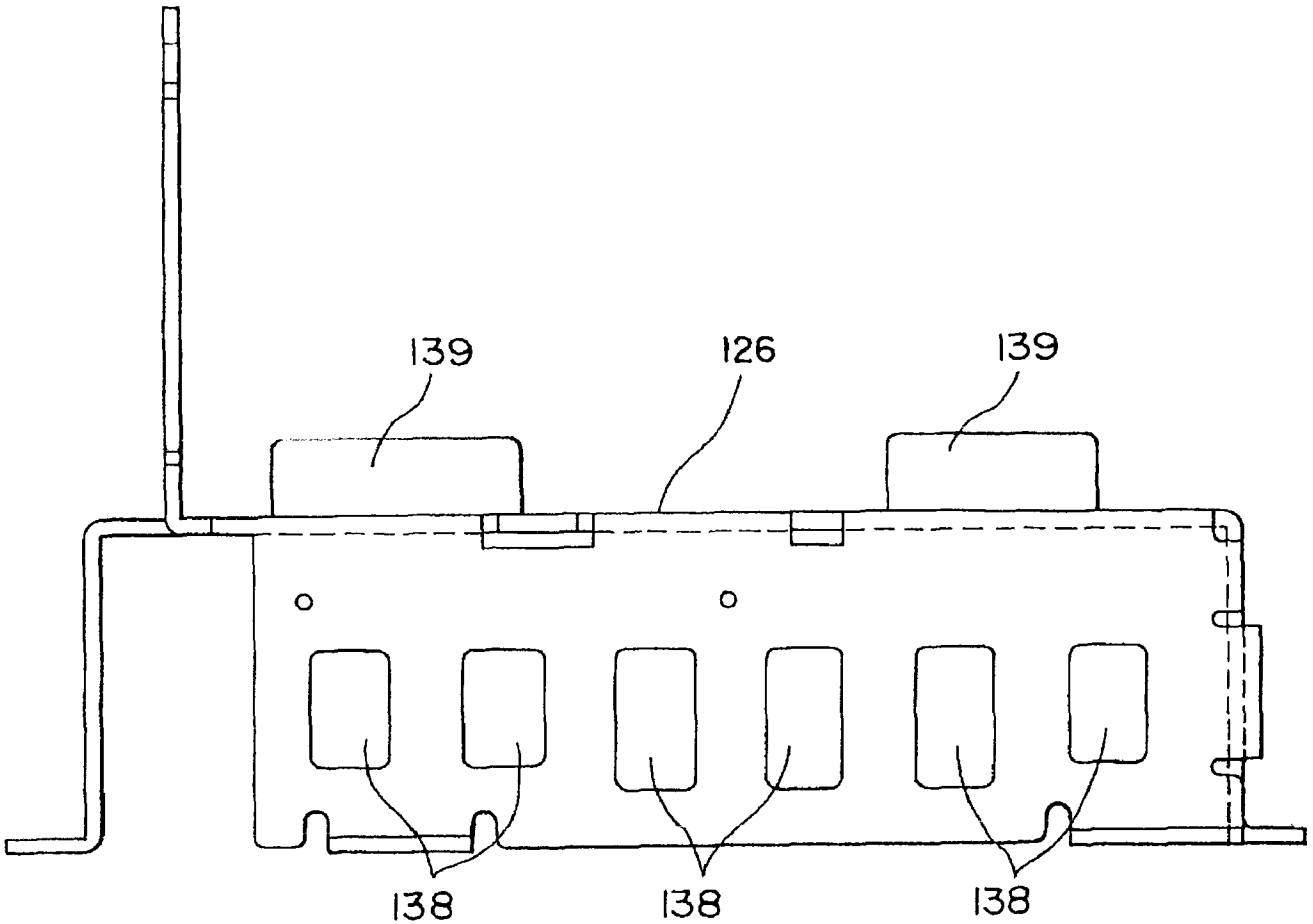
FIG. 25 is a side view showing parts of the lower light guide.
Figure 26:
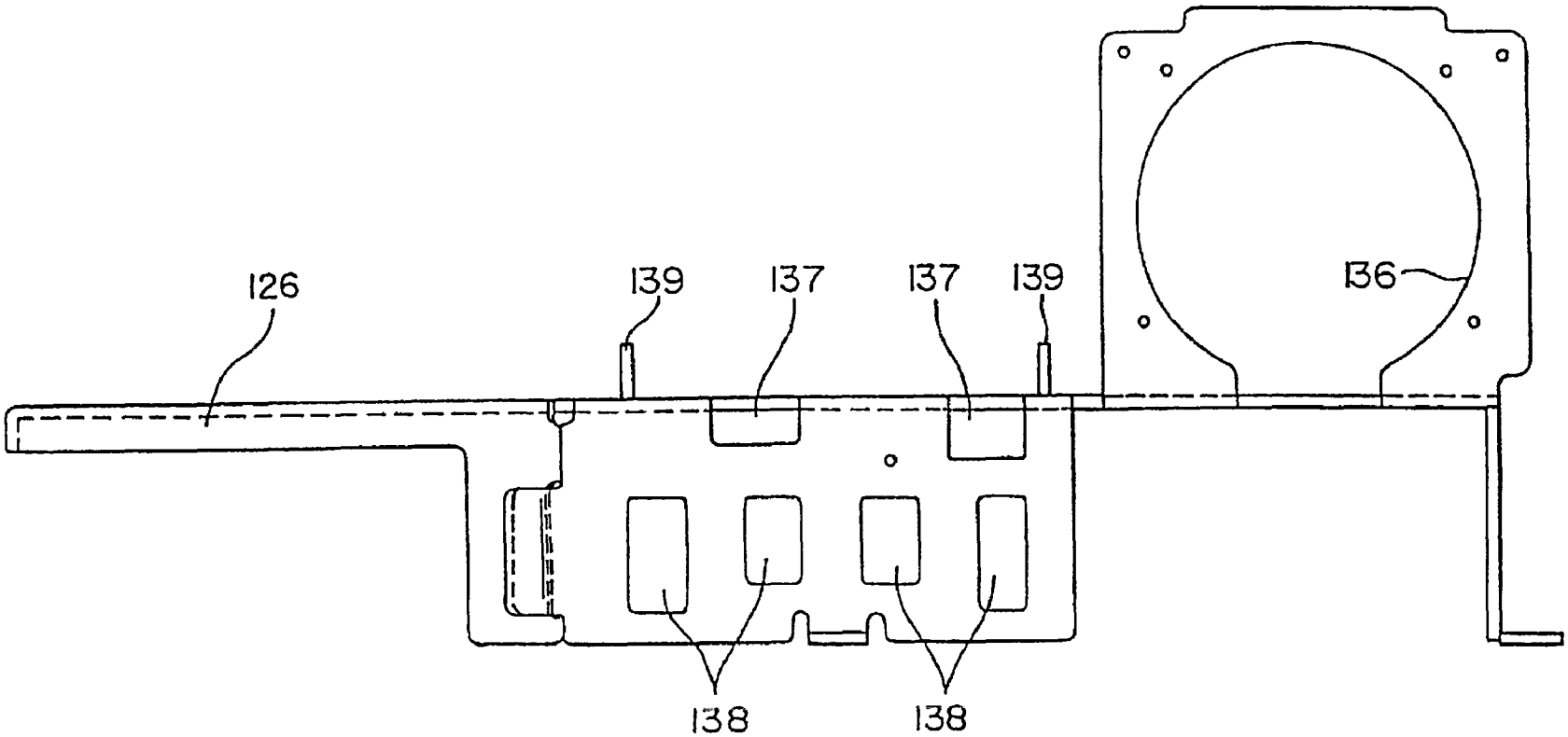
FIG. 26 is a front view showing parts of the lower light guide.
Figure 27:
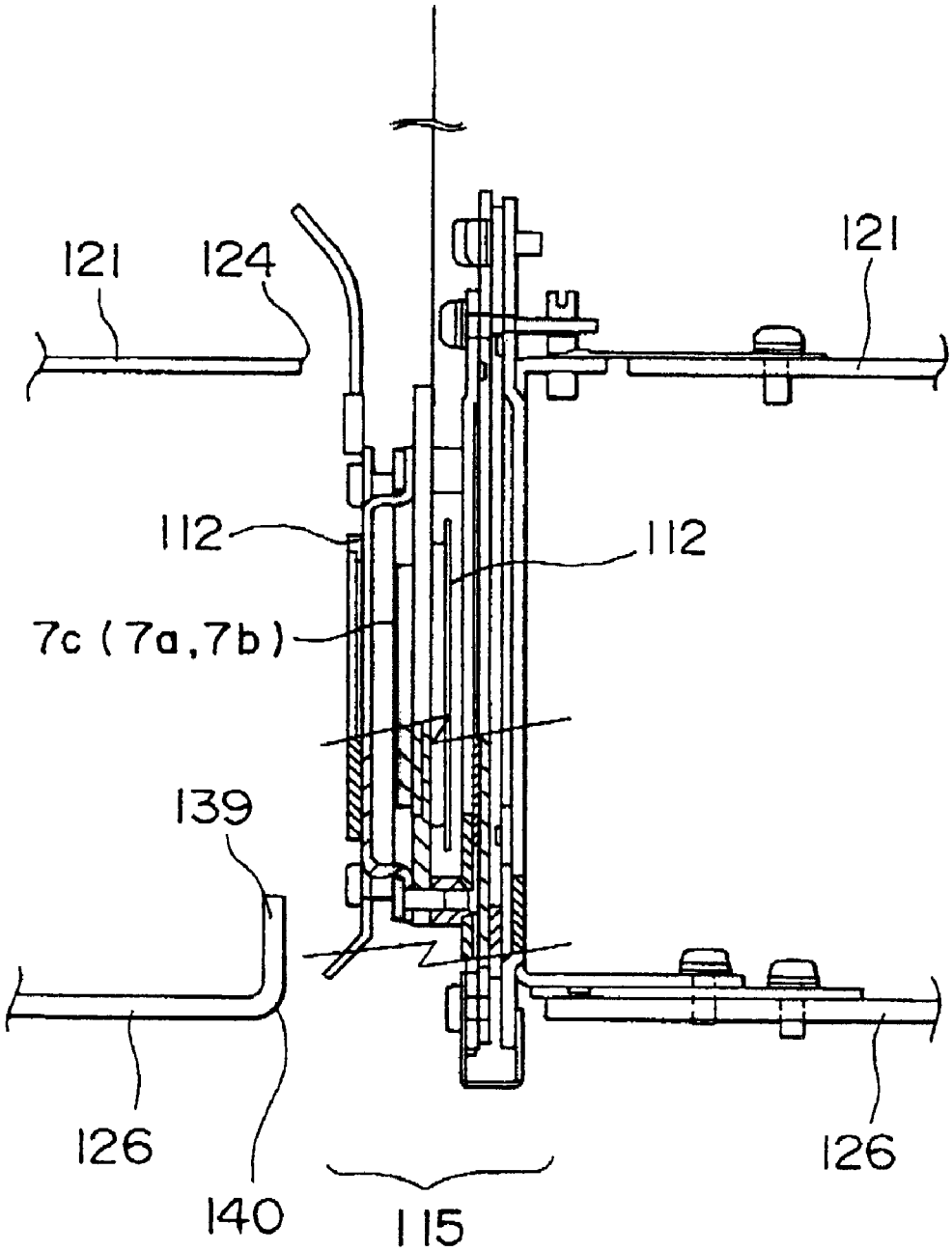
FIG. 27 is a sectional view showing parts of the lower light guide.

FIGS. 23 to 26 show the construction of the lower light guide 126. FIG. 23 is a plan view of the lower light guide 126. FIG. 24 is a rear view of the lower light guide 126. FIG. 25 is a side view of the lower light guide 126. FIG. 26 is a front view of the lower light guide 126. Reference numeral 137 is an upper air blow opening according to the air flow path of the air blow opening of the inlet air regulating plate 105. Reference numeral 138 is an air blow opening. This air blow opening 138 contributes to reducing the weight of the lower light guide 126. Reference numeral 139 is an air flow path guide. As shown in FIG. 27, the air flow path guide 139 is a wall which is bent at 90° so as to guide cooling air to the liquid crystal light valve 7c, (7a, and 7b) and the polarizing plates 112 through the air intake opening 140.

Reference numeral 141 is an exhaust fan fixing plate. As shown in FIGS. 28, 29, 30, and 36, the exhaust fan fixing plate 141 has skirt-shaped air inlet guides 142 on the top, the right, and the left thereof so as to suppress drawing air from the side of the air intake opening of the exhaust fan 143 and to preferentially cool heated members on the entire surface of the air intake opening in front of the air blow opening of the exhaust fan 143.

Figure 28:
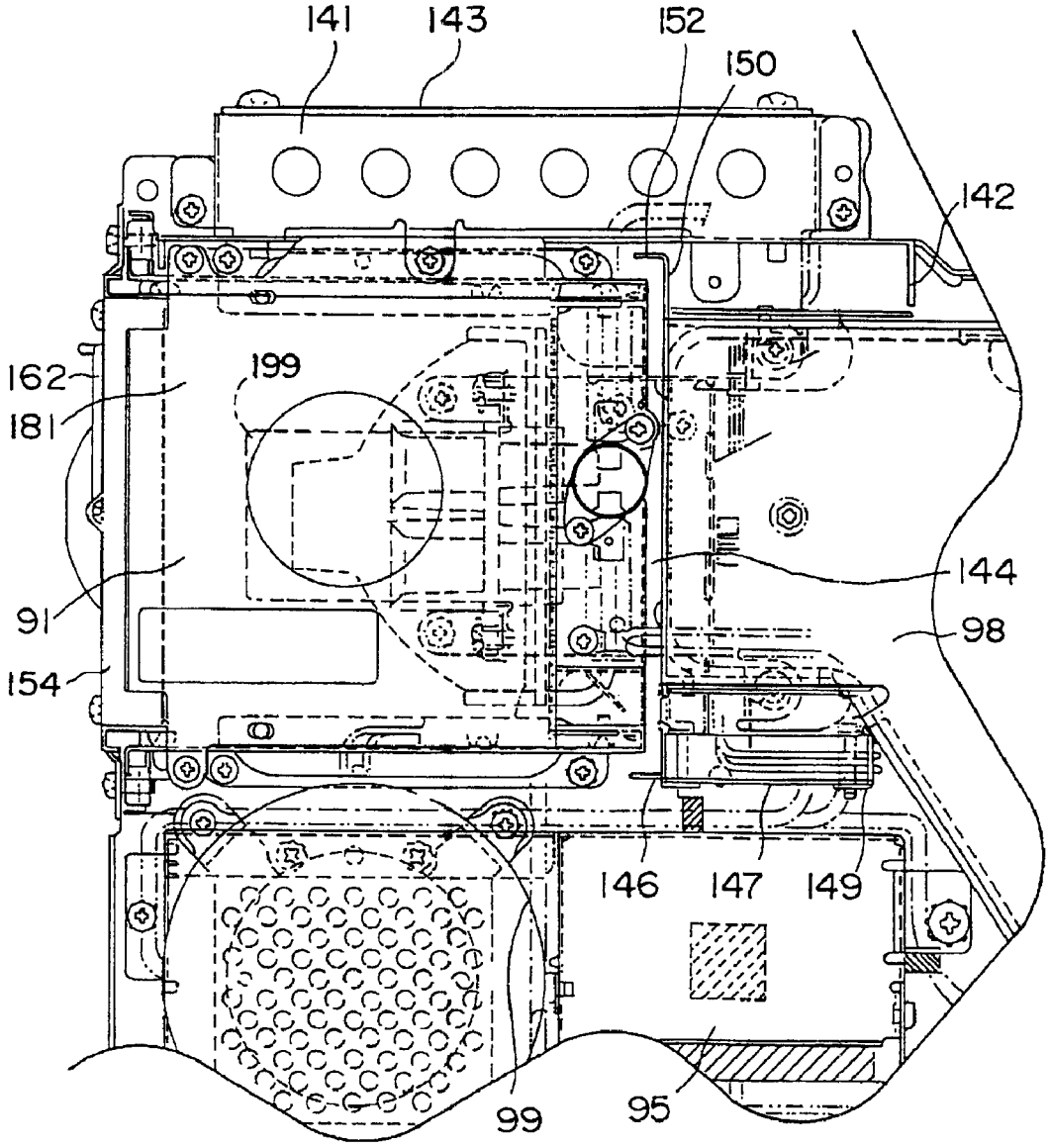
FIG. 28 is an assembly plan view showing a lamp housing unit and portions adjacent thereto.
Figure 29:
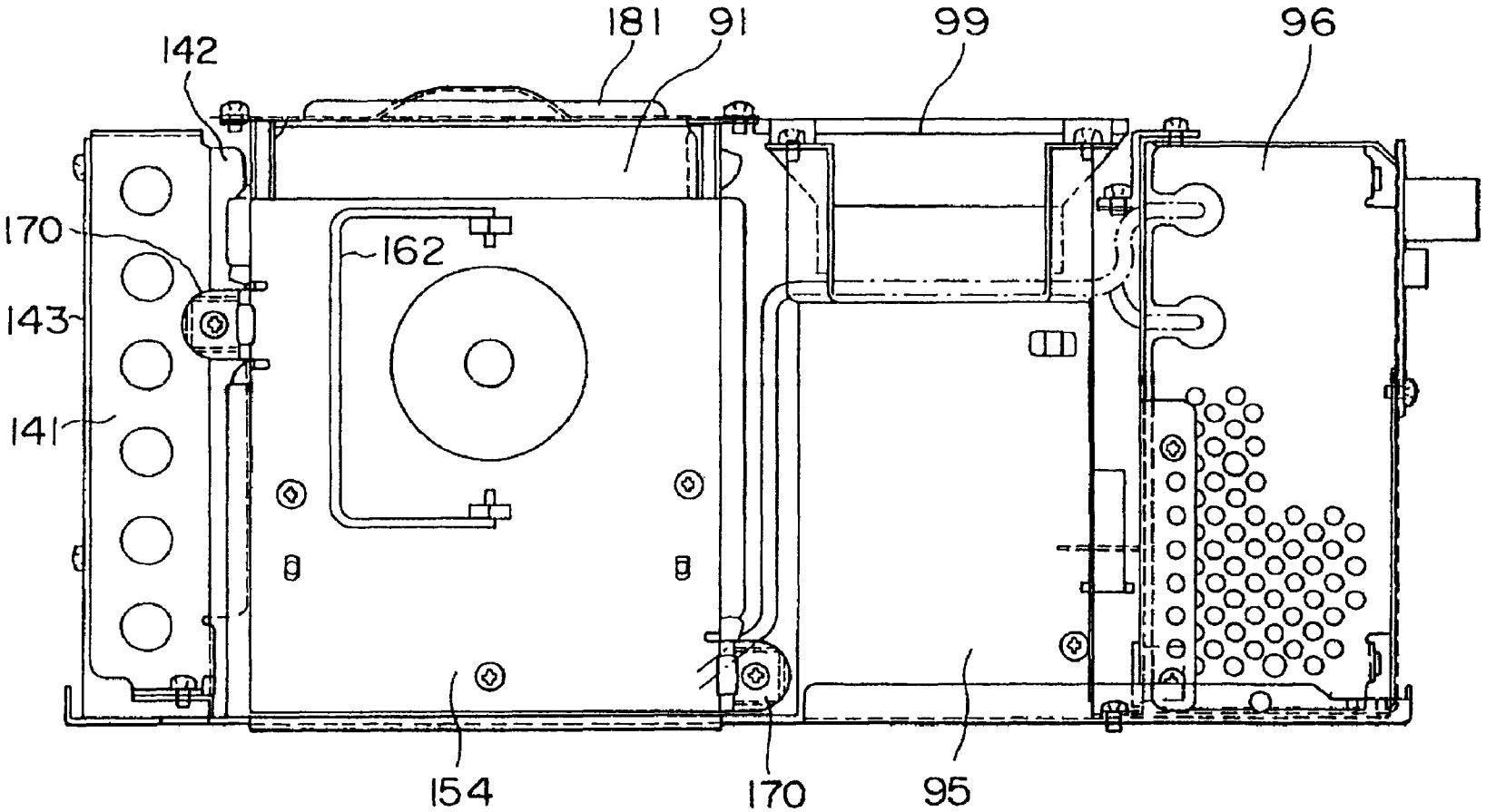
FIG. 29 is an assembly left side view excluding the case.
Figure 30:
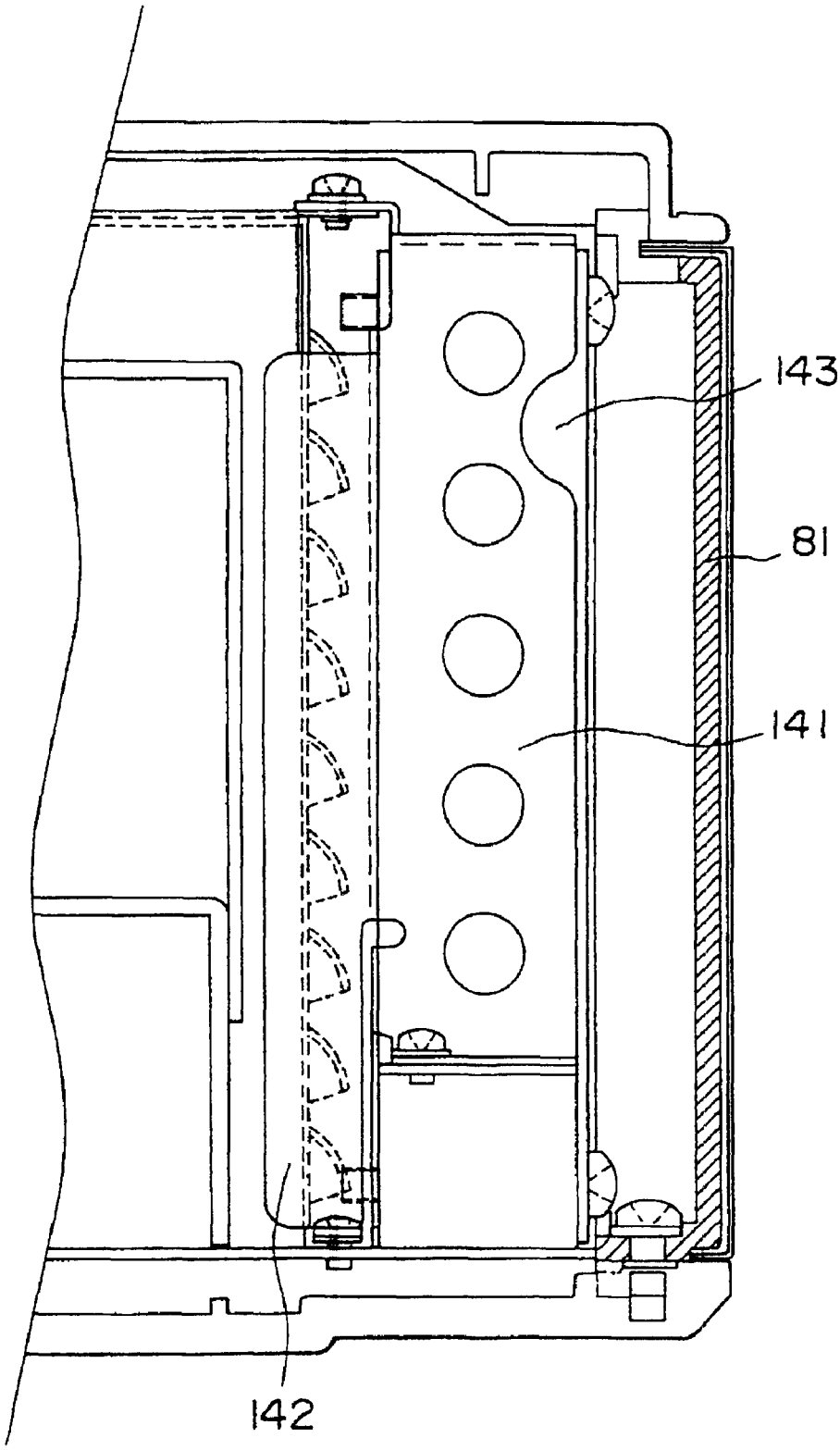
FIG. 30 is an assembly sectional view showing a lamp cover and portions adjacent thereto.
Figure 31:
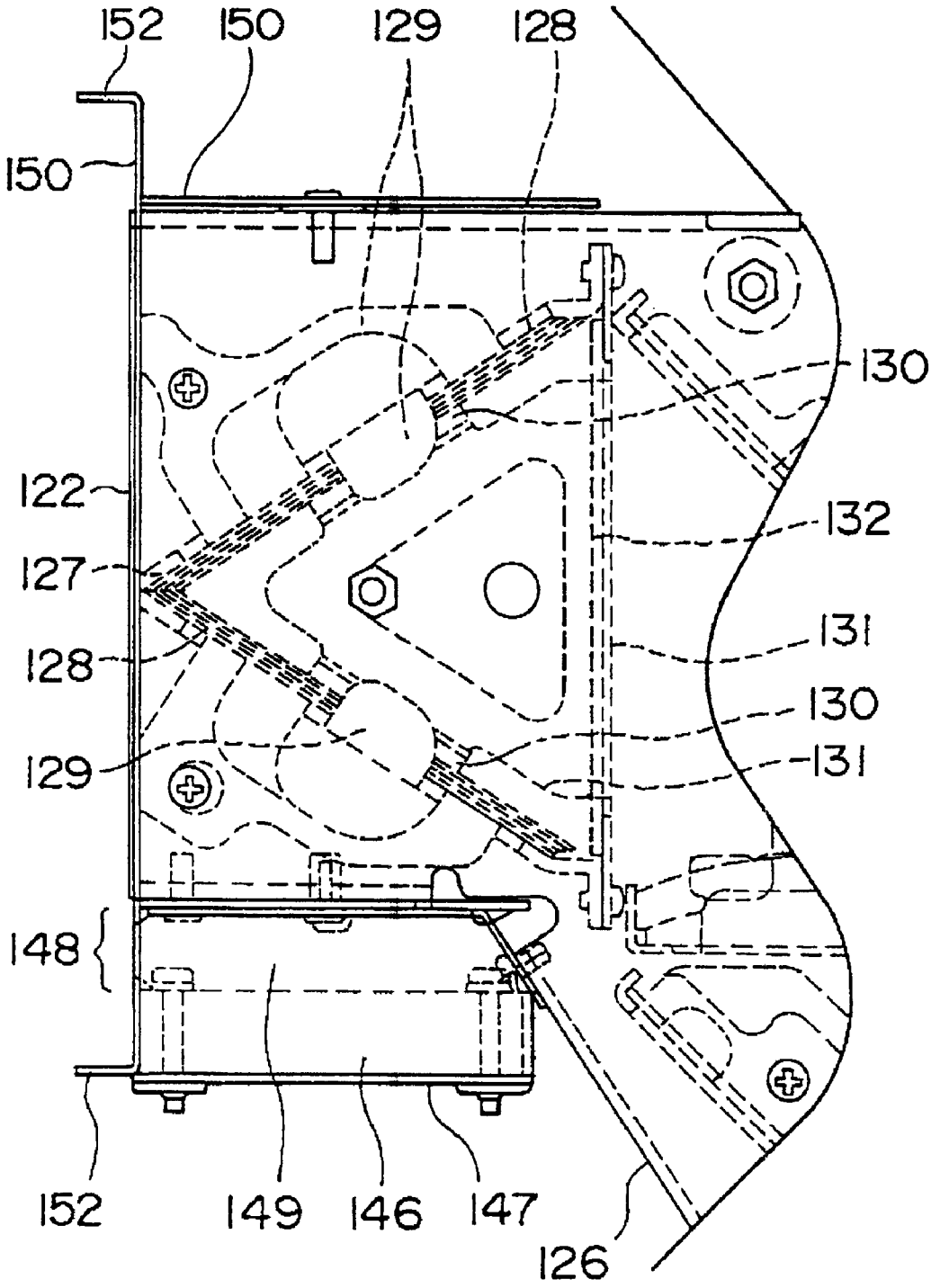
FIG. 31 is an assembly plan view showing a lamp fan block.
Figure 32:
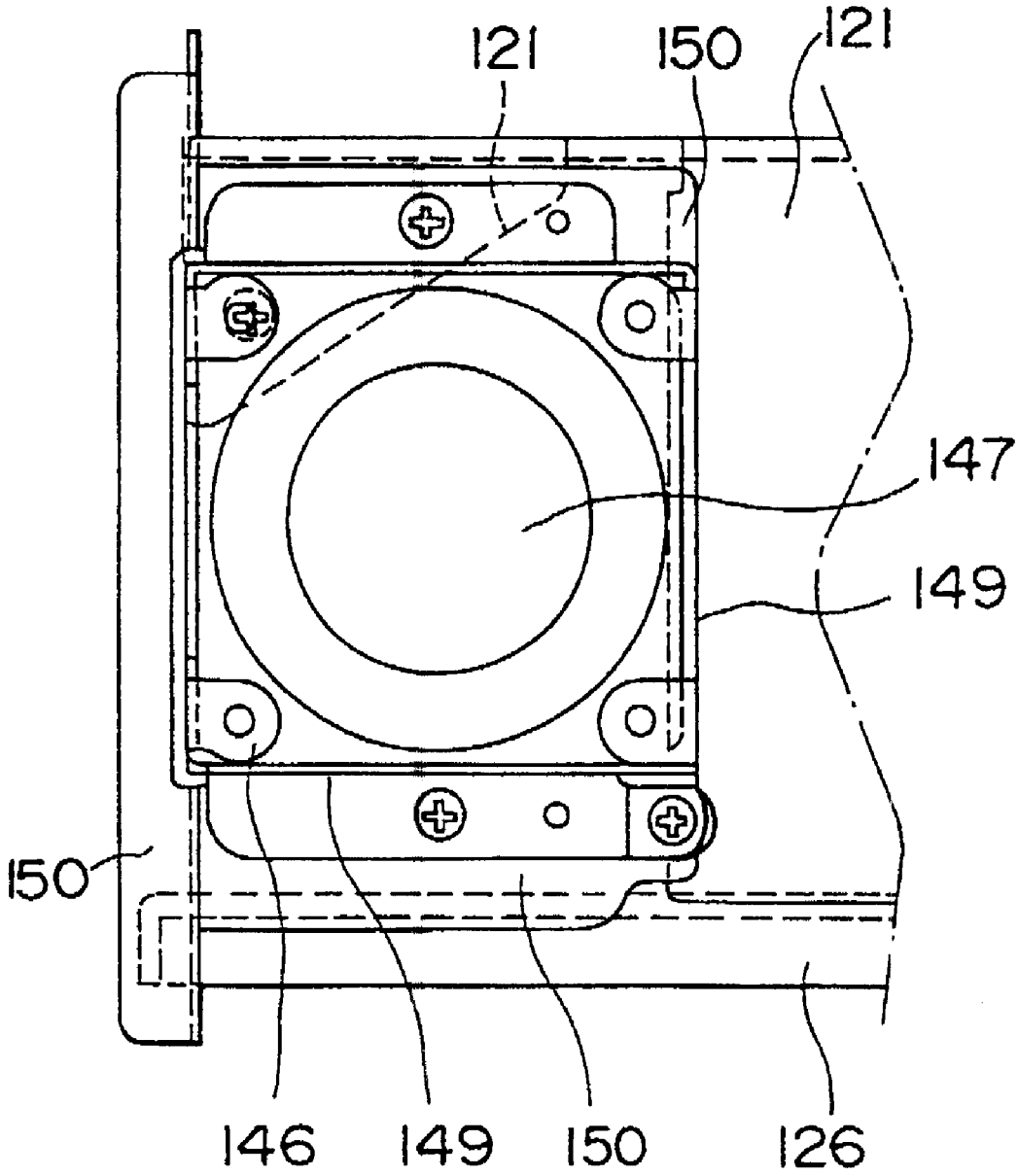
FIG. 32 is an assembly plan view showing the lamp fan block.
Figure 34:
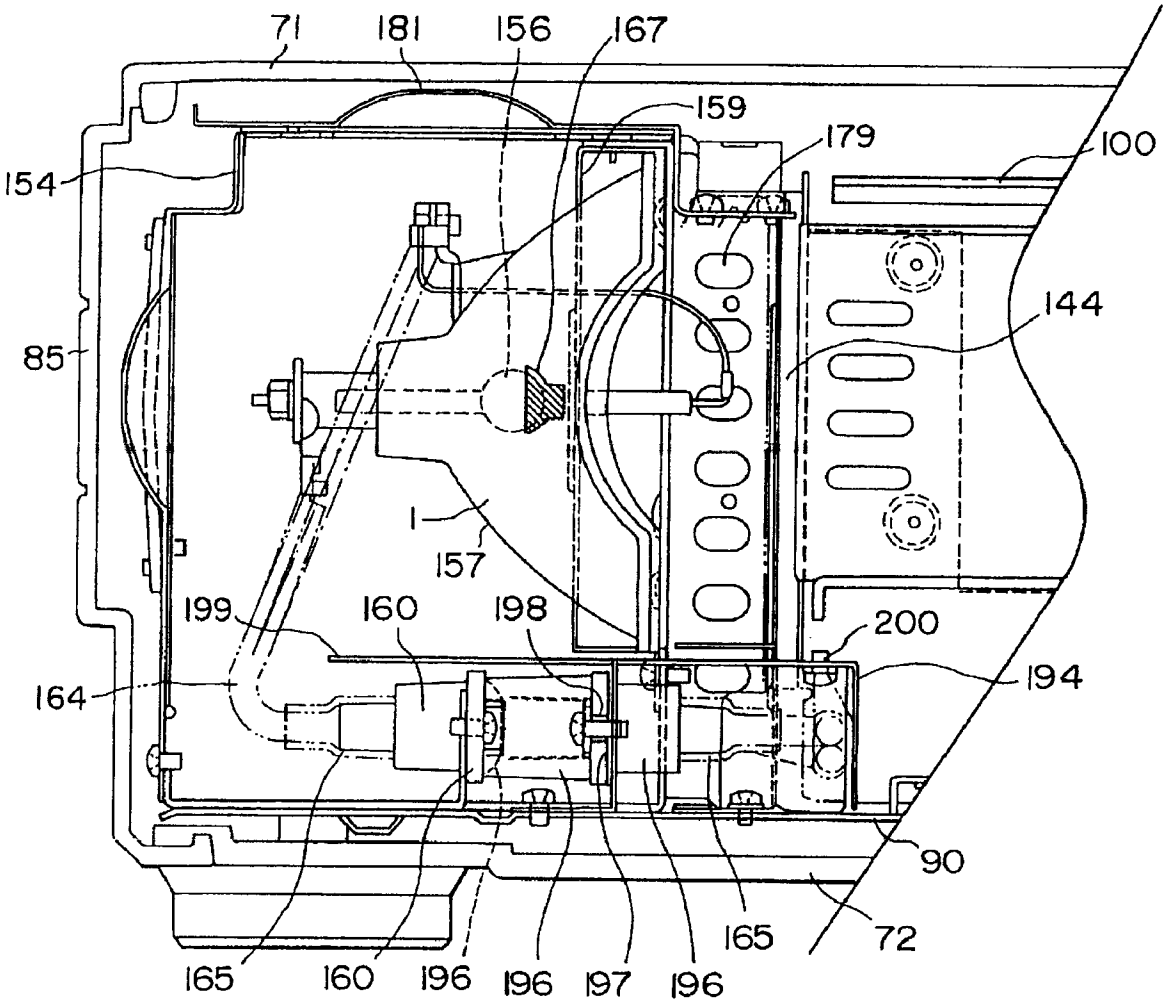
FIG. 34 is an assembly sectional view showing the lamp housing unit and portions adjacent thereto.
Figure 35:
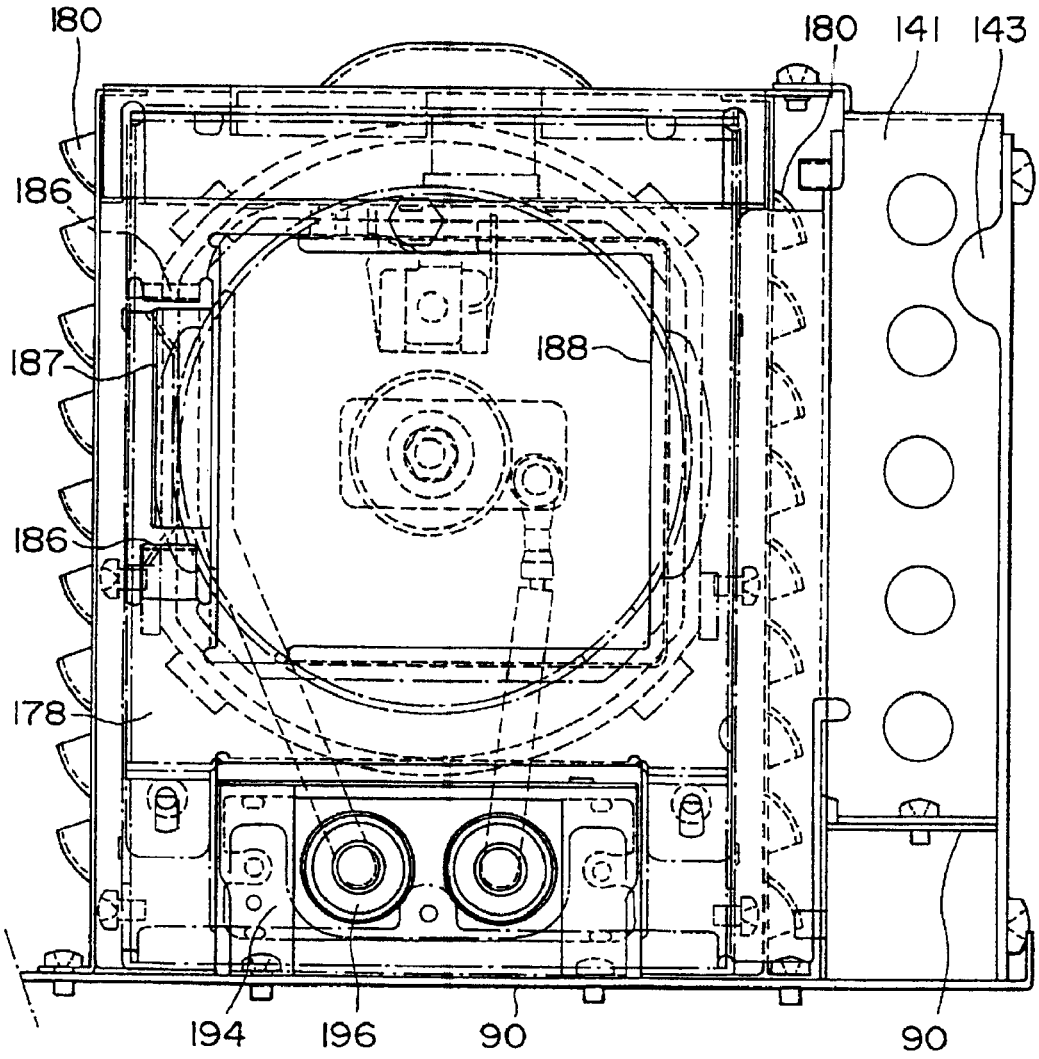
FIG. 35 is an assembly rear view showing the lamp housing unit and the portions adjacent thereto.
Figure 36:
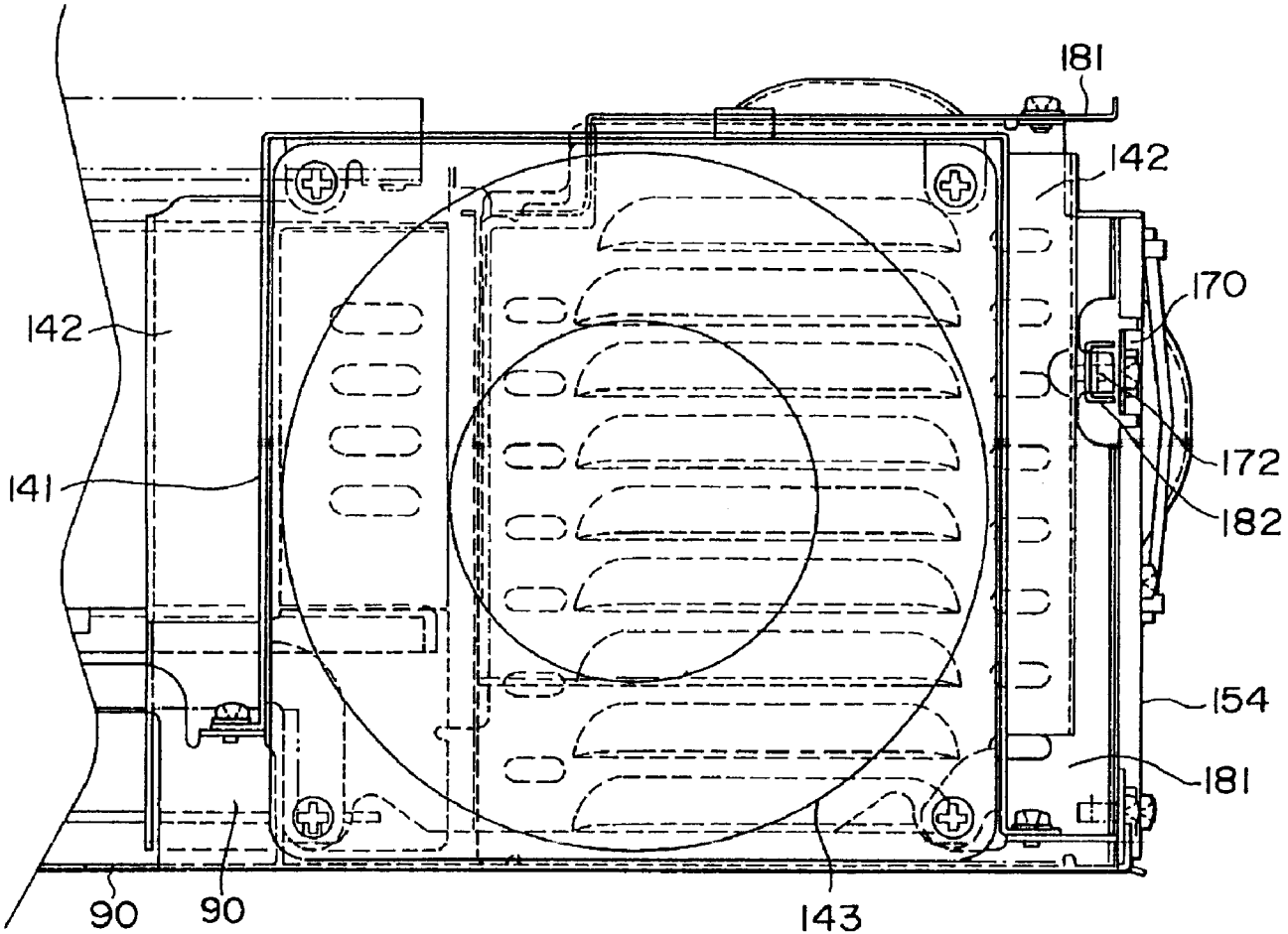
FIG. 36 is an assembly side view showing the lamp housing unit and the portions adjacent thereto.
Figure 37:
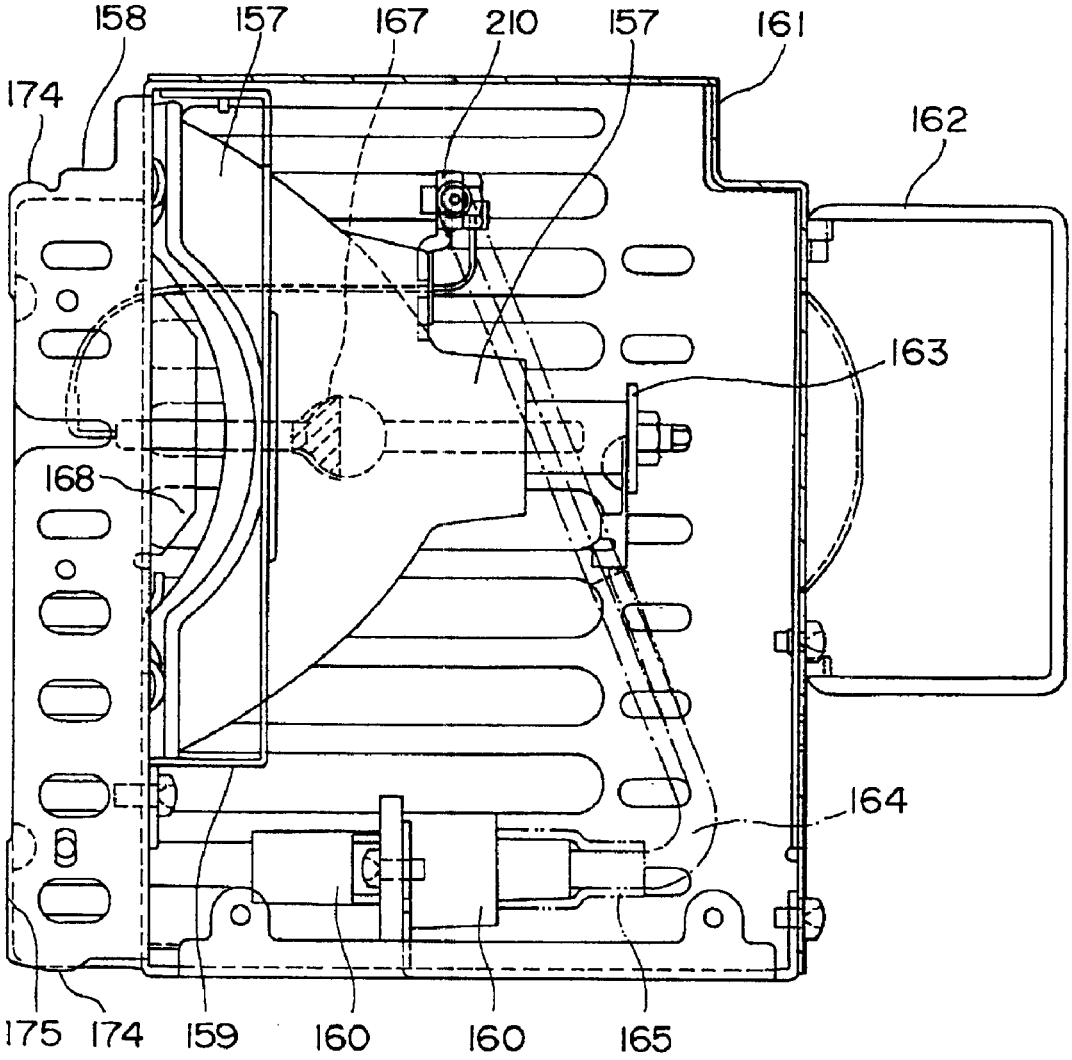
FIG. 37 is an assembly sectional side view showing an inner housing.
Figure 38:
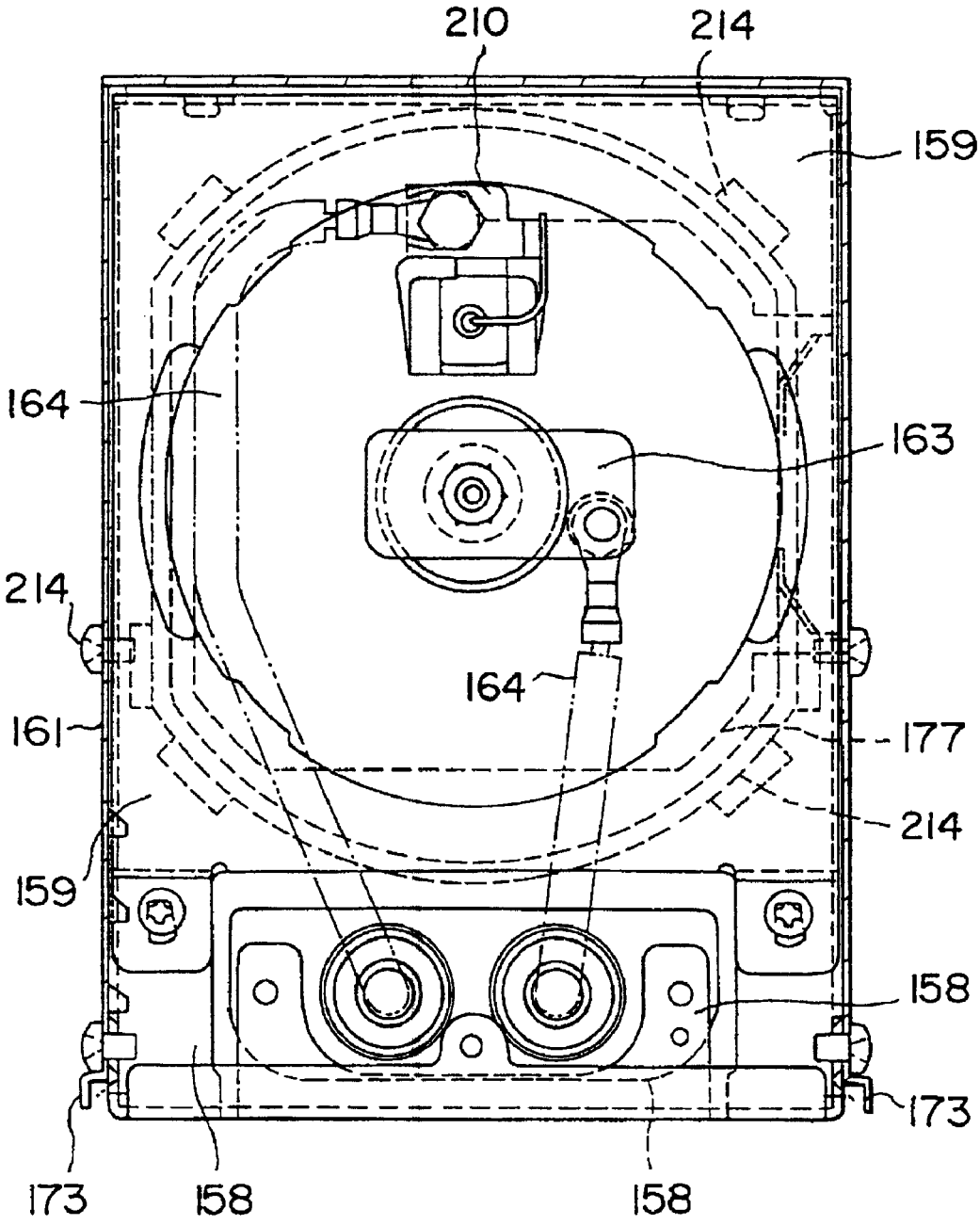
FIG. 38 is an assembly sectional front view showing the inner housing.
Figure 39:
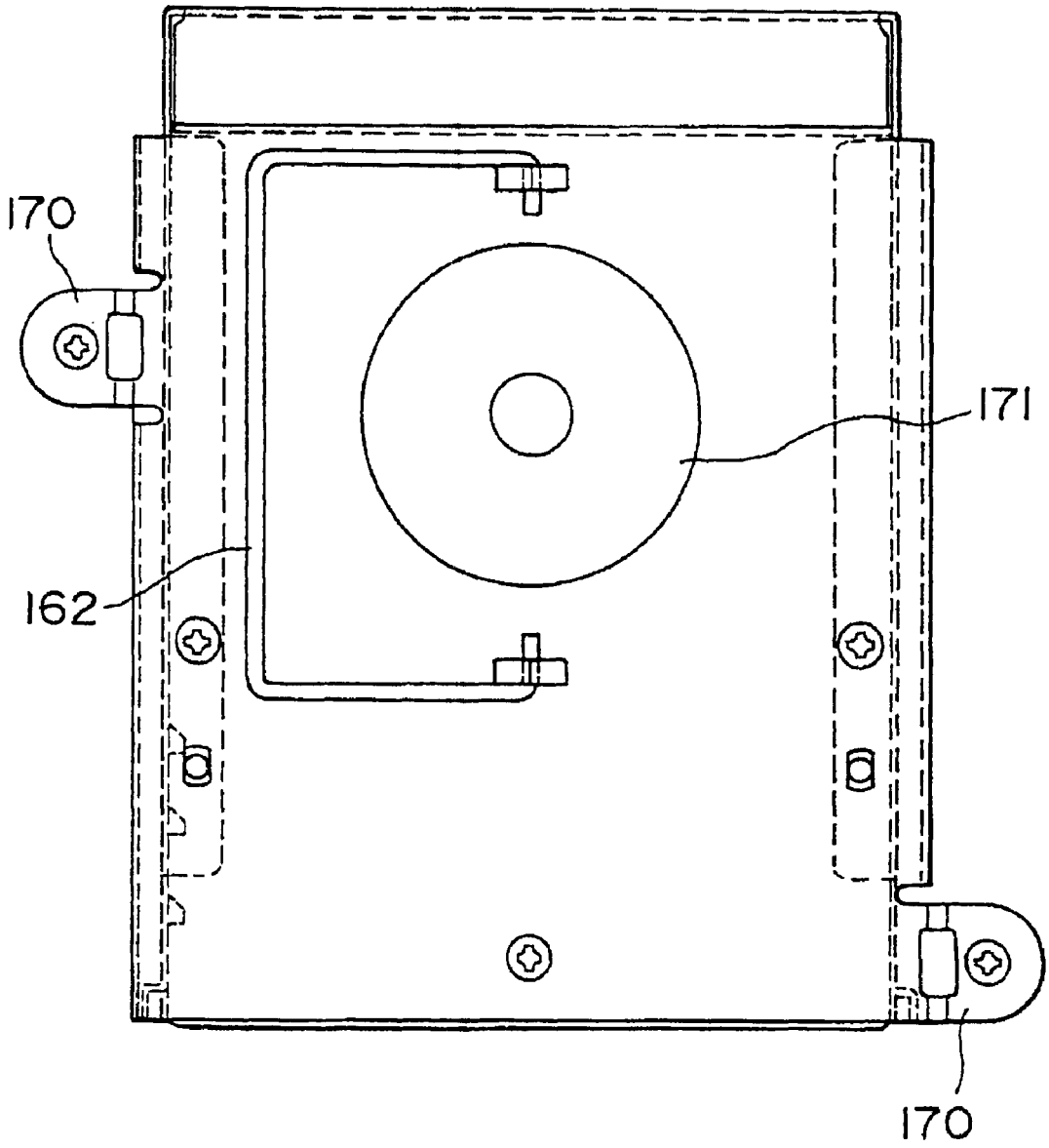
FIG. 39 is an assembly front view showing the inner housing.
Figure 40:
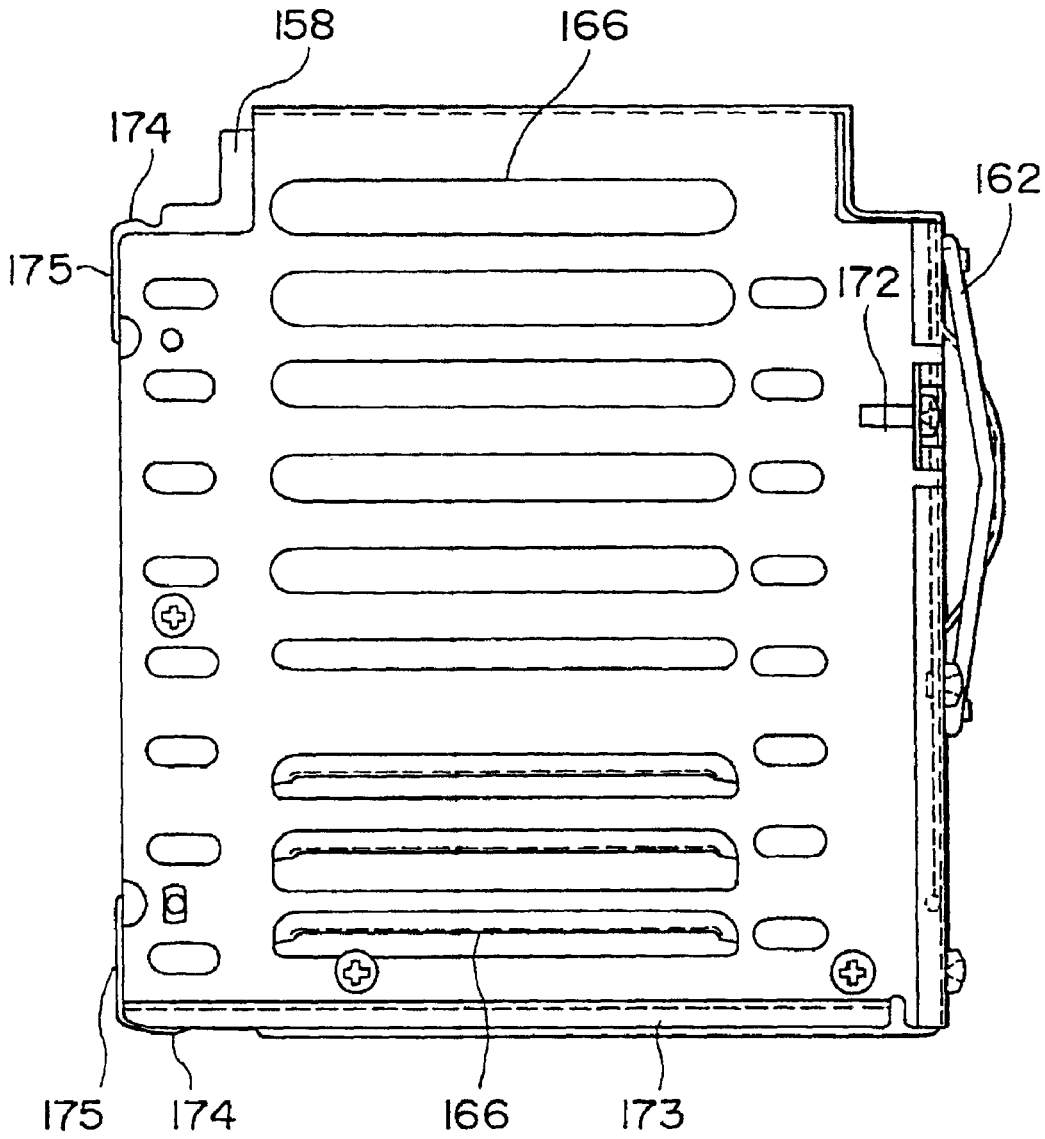
FIG. 40 is an assembly left side view showing the inner housing.
Figure 41:
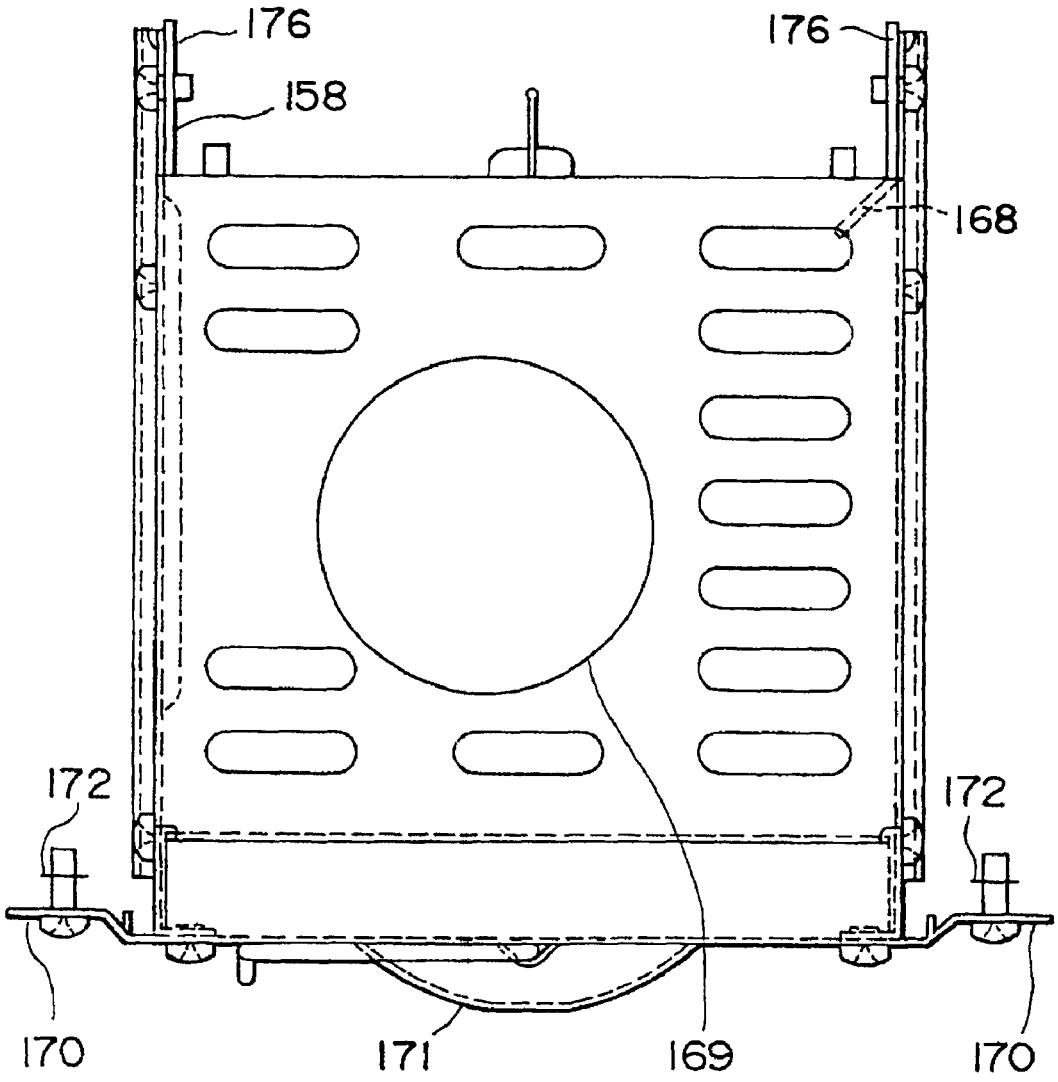
FIG. 41 is an assembly front view showing the inner housing.
Figure 42:
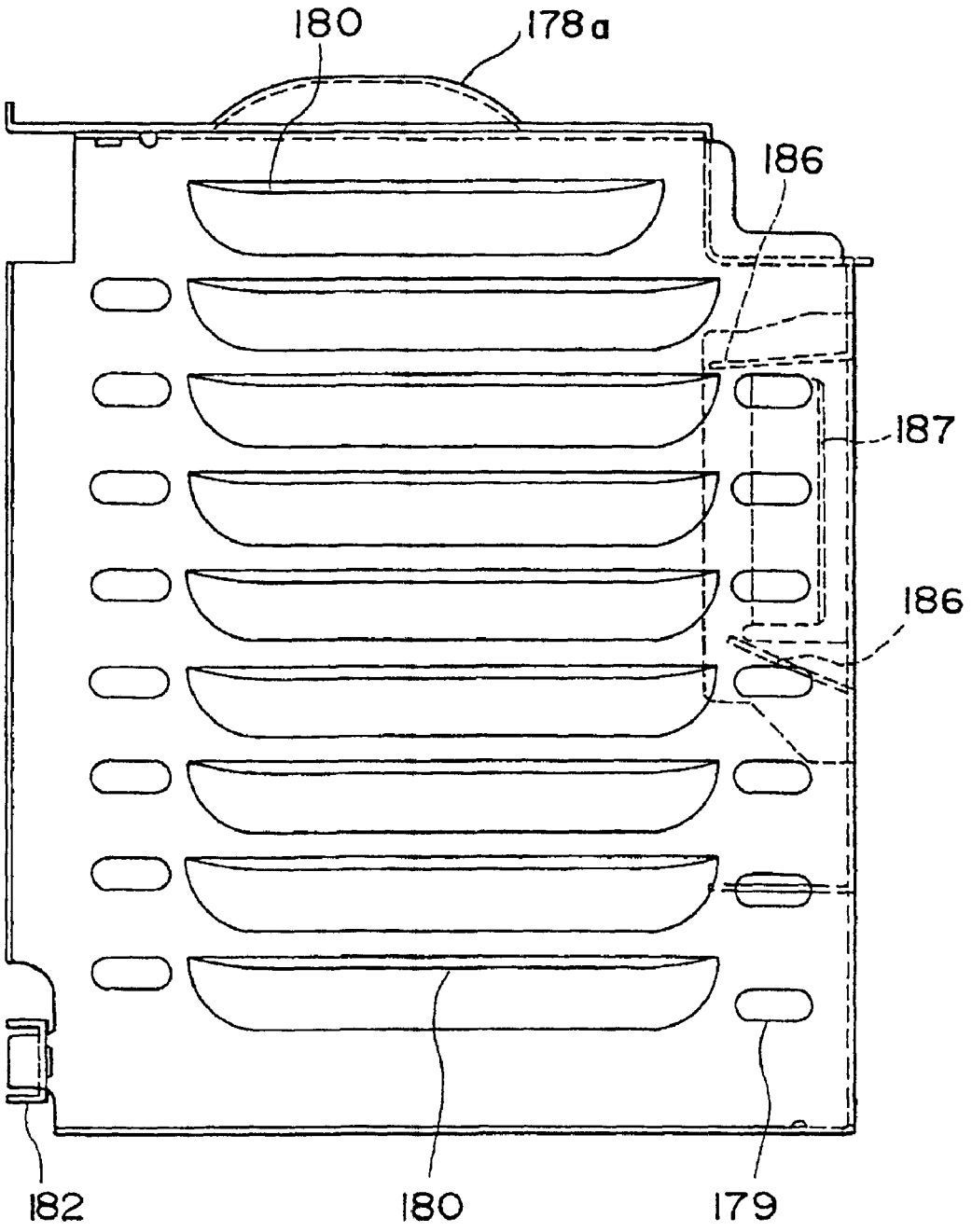
FIG. 42 is a left side view showing outer housing parts.
Figure 43:
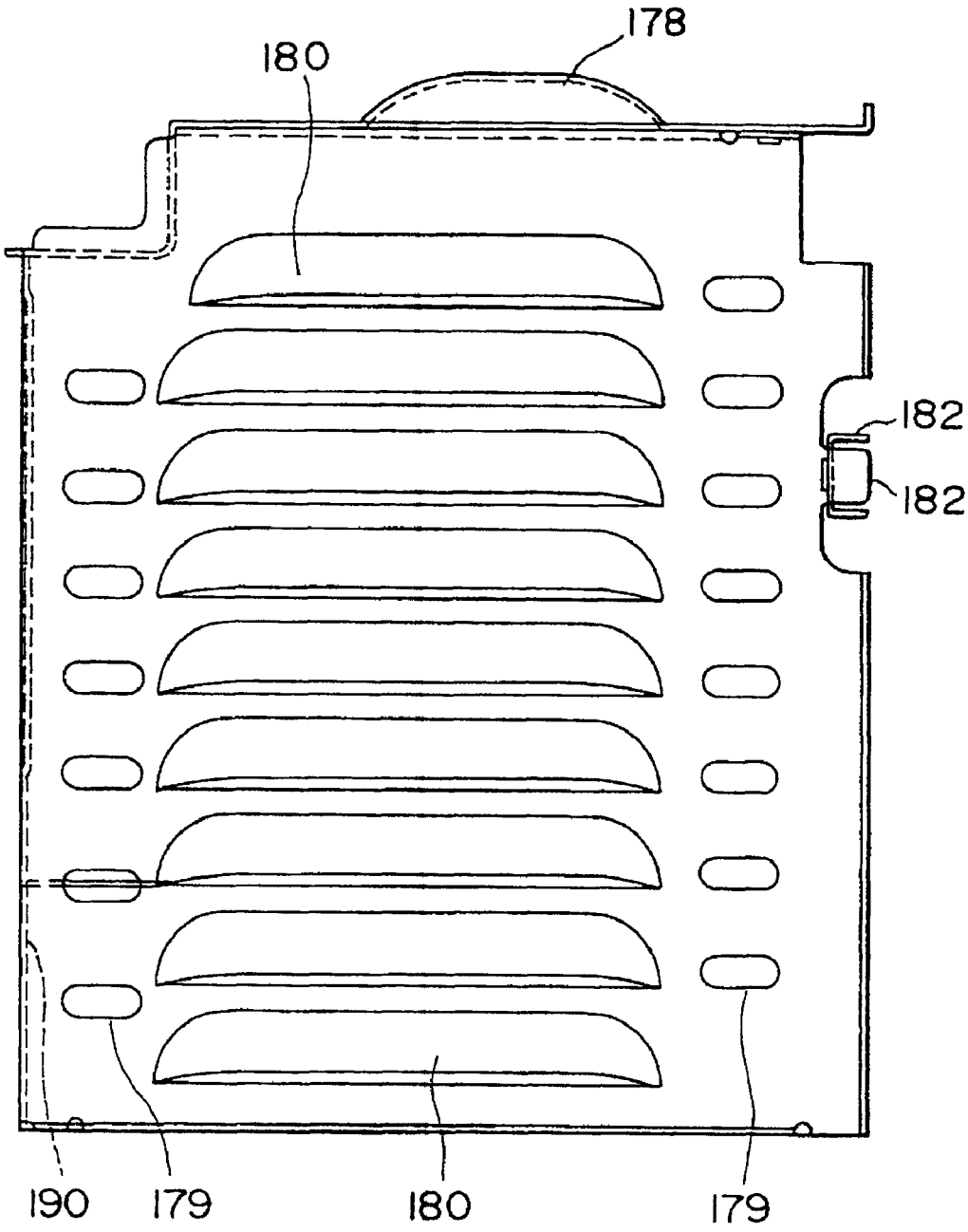
FIG. 43 is an assembly right side view showing the outer housing parts.
Figure 44:
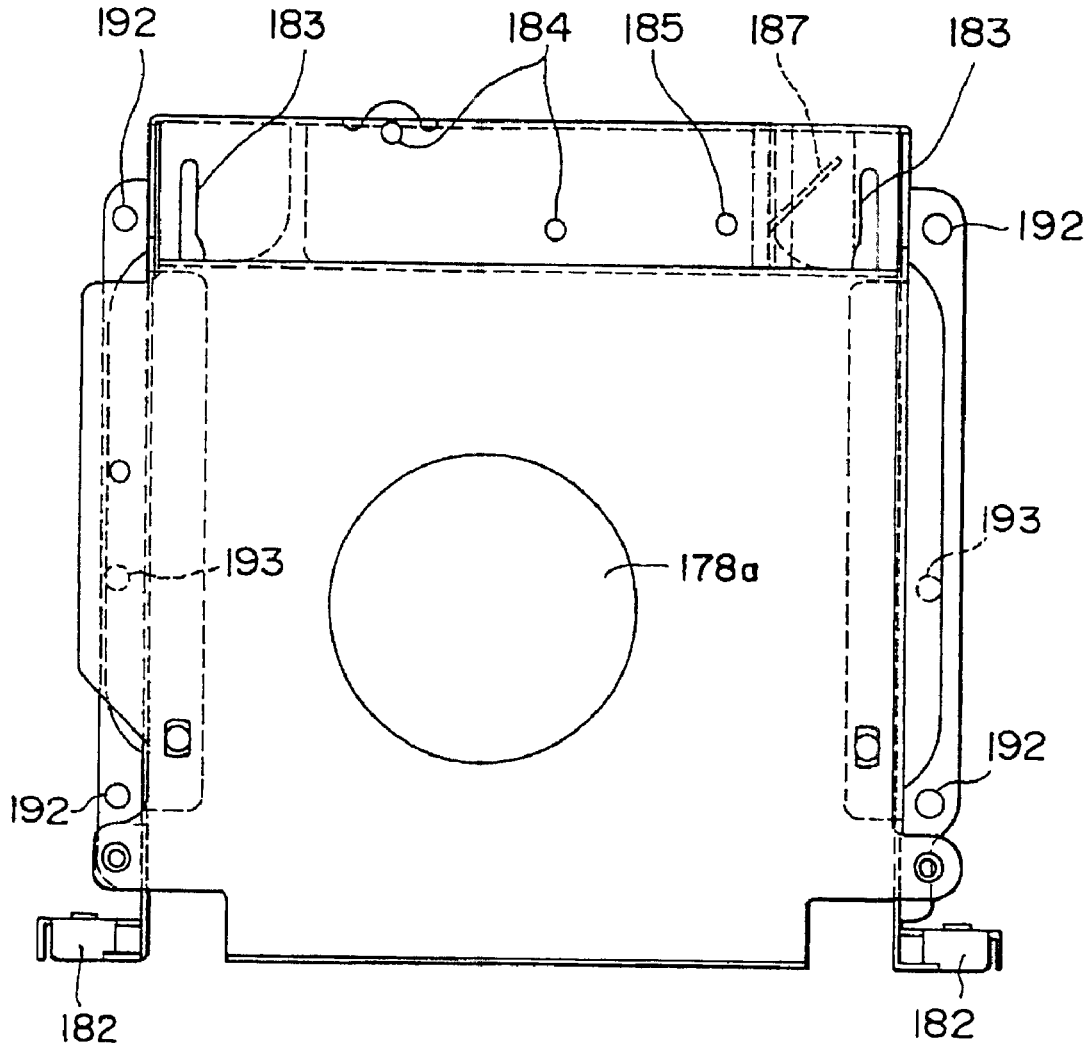
FIG. 44 is a plan view showing the outer housing parts.
Figure 45:
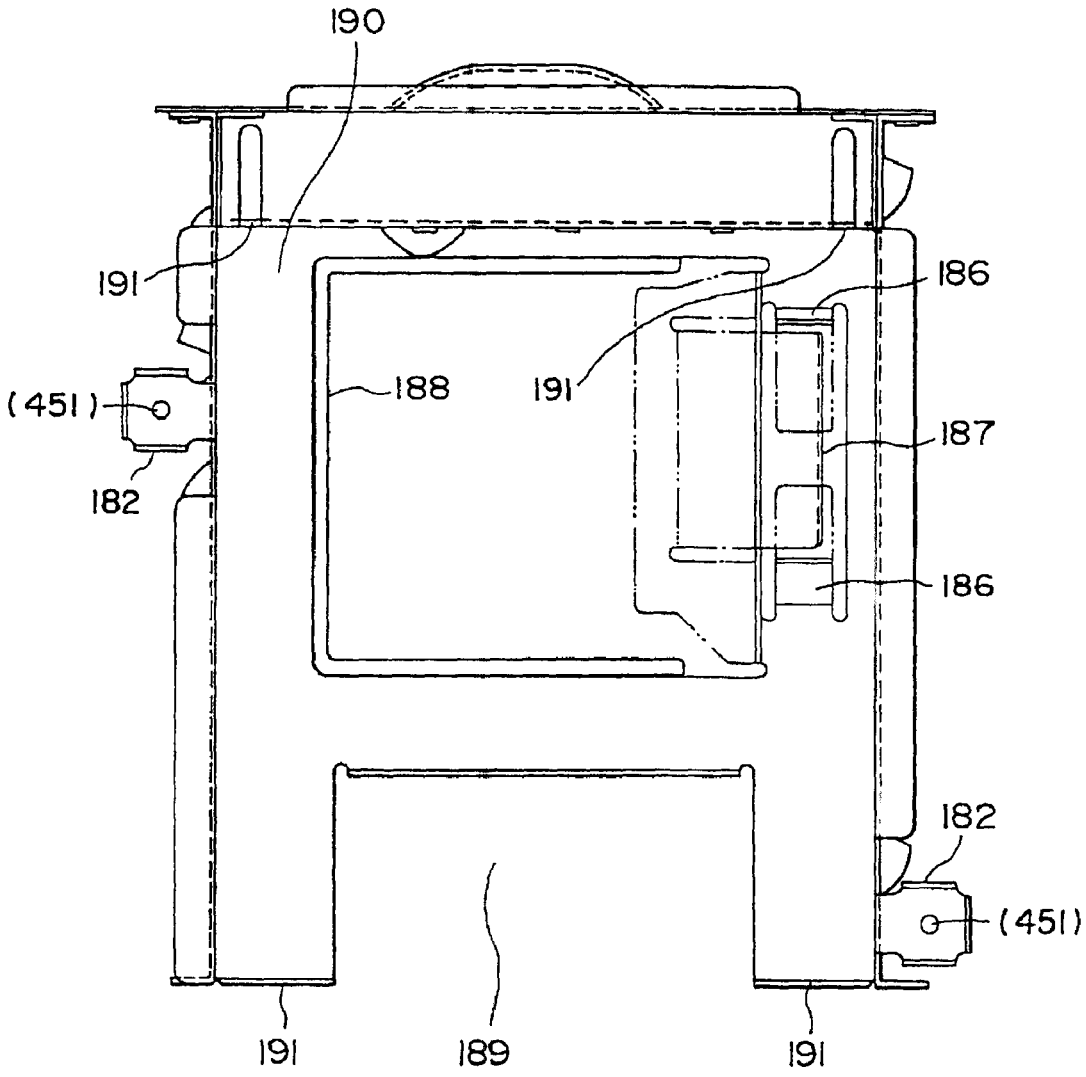
FIG. 45 is a front view showing inner housing parts.
Figure 46:
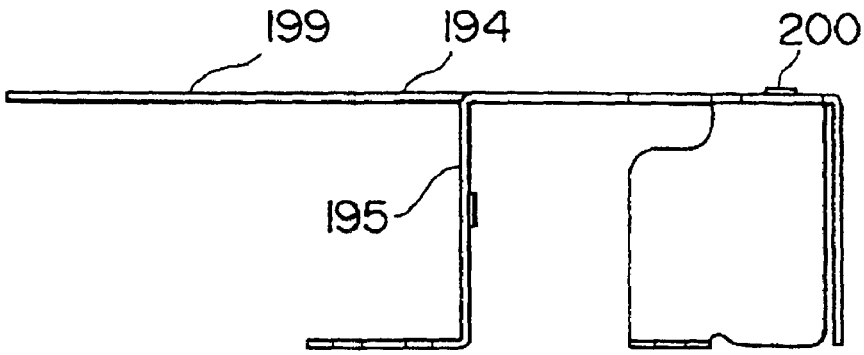
FIG. 46 is a side view showing lamp connector plate parts.
Figure 47:
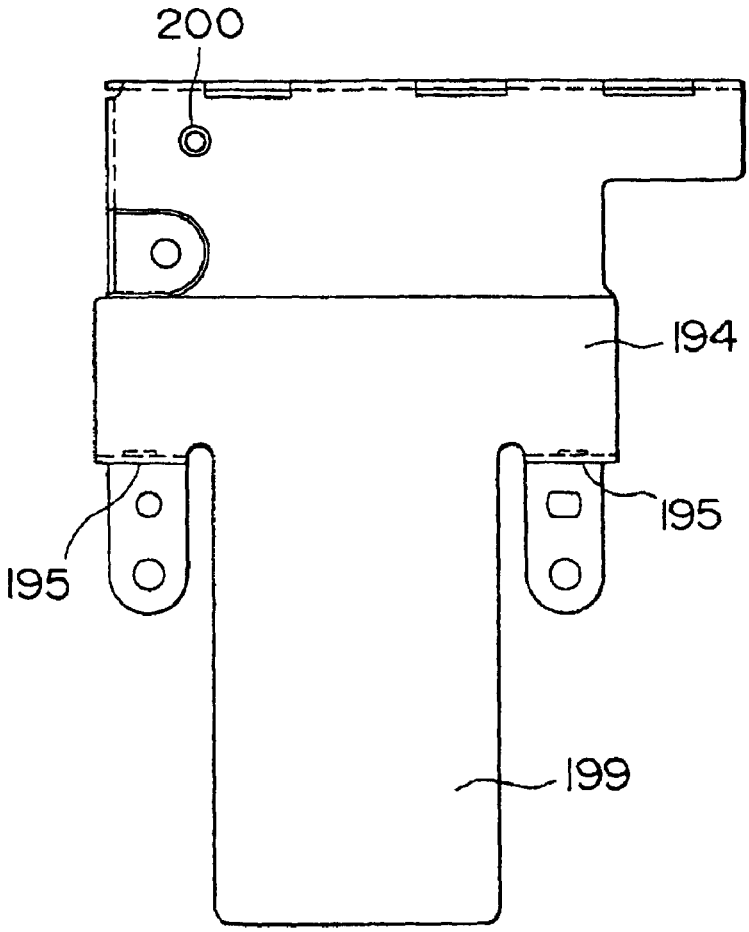
FIG. 47 is a plan view showing the lamp connector plate parts.
Figure 48:
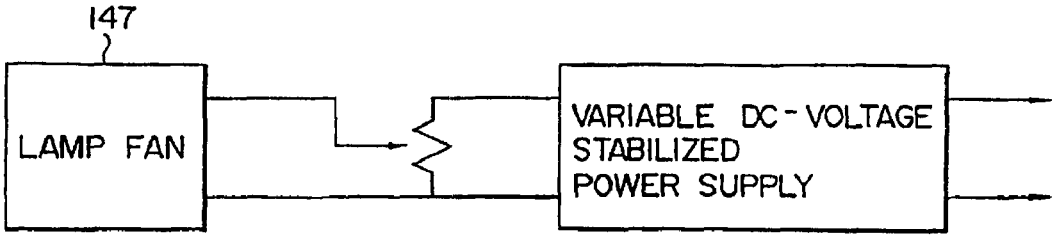
FIG. 48 is a circuit block diagram of a lamp fan.
Figure 49:
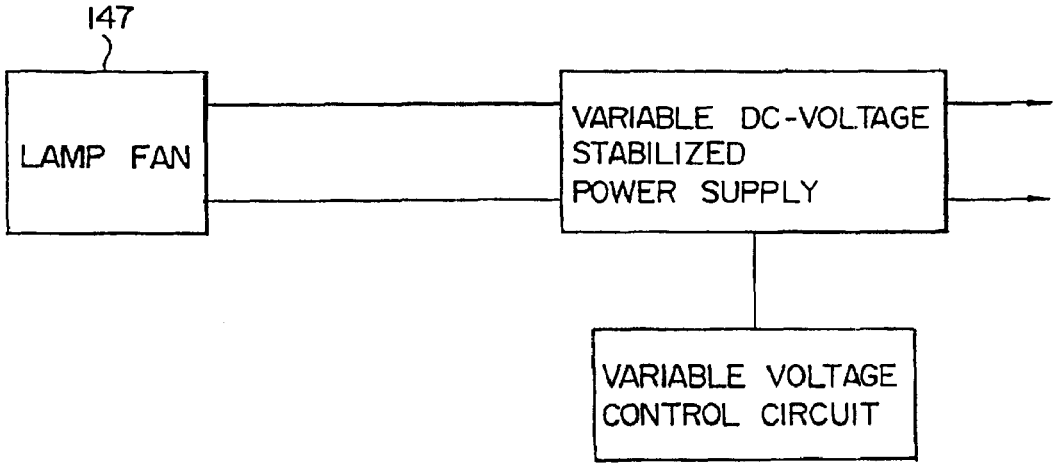
FIG. 49 is a circuit block diagram of a lamp fan.

As shown in FIGS. 28 and 34, a space 144 is formed in the vicinity of the lamp. By disposing the lamp in the vicinity of the air intake opening of the exhaust fan 143f the lamp and the highly heated portion in the vicinity thereof can be directly and effectively cooled.

In the conventional liquid crystal projectors, there is a problem where dust and rubbish are attracted from the opening in the front of the projection lens 9. To solve this problem, a side air blow opening of the air intake regulating plate 105 is rotated clockwise. The air from the rotating air blow opening strikes against the upper wall on the right of the lower light guide 126 and thereby the wind is directed toward the window of the projection lens. In addition, a branching plate 145 shown in FIG. 14 is disposed so as to prevent influence of the attracting force of the exhaust fan 14S. Thus, the amount of blow air the front air exhaust opening becomes low. As a result, dust and rubbish are not attracted. The branching plate 145 is made of a thin plastic plate. The branching plate 145 is substantially of a rectangular shape. Part of the plate 145 is bent at 90° and adhered to flat surfaces of the base plate 90 and the lamp stabilizer 96 with a double-sided adhesive tape.

Figure 33:
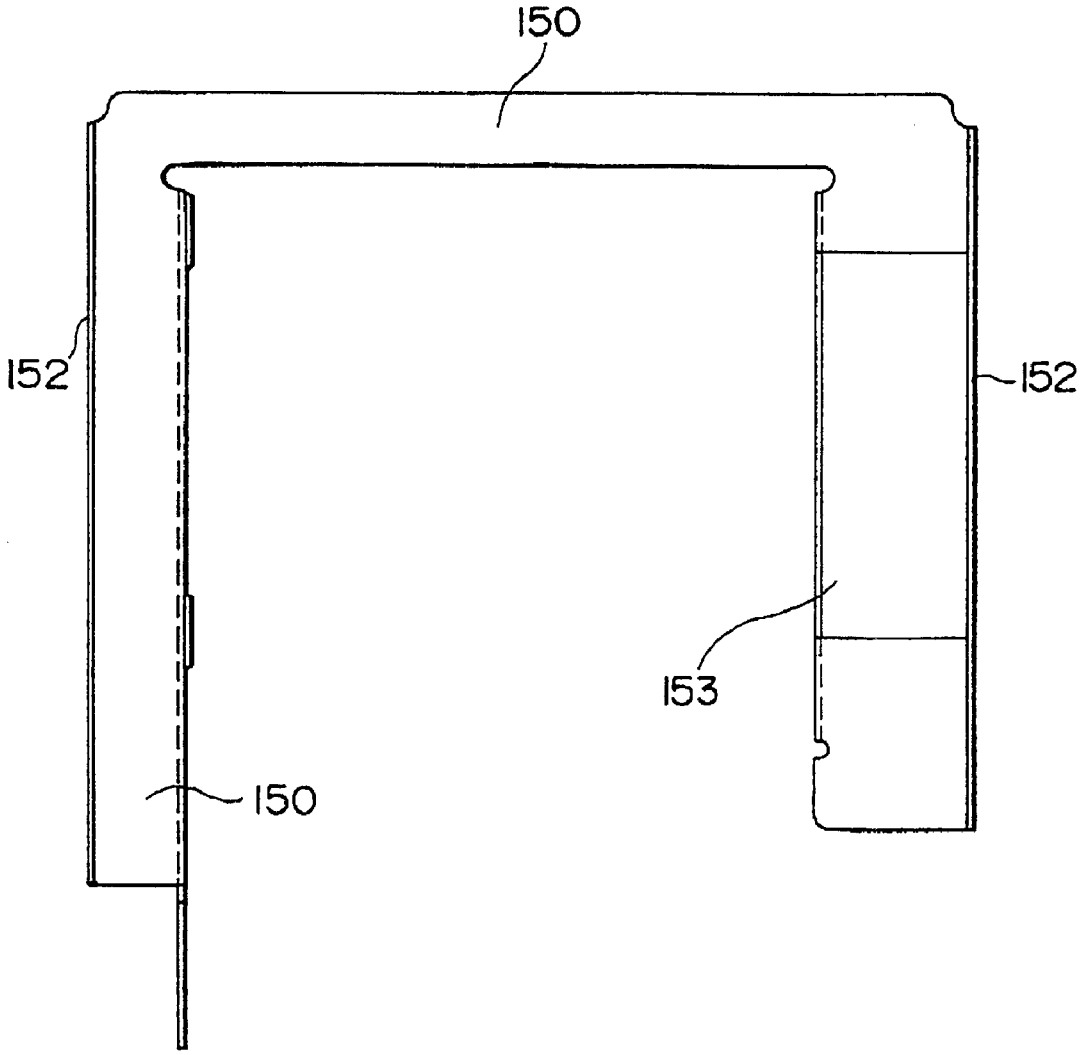
FIG. 33 is a front view showing window frame parts.

Reference numeral 146 is a lamp fan block. The lamp fan block 146 is formed by winding a metal plate around the circumference of a lamp fan 147. One side of the lamp fan block 146 is screwed to a lamp fan fixing plate 149 which forms an air blow opening rotated at 90° from an air blow opening of the lamp fan 147. On a side of a window frame 150 in the front of the air blow opening of the lamp fan 147, the lamp fan fixing plate 149 is fixed so as to form the lamp fan block 146. The lamp fan block 146 is fixed on a side of the light entrance opening 122 of the upper light guide. The window frame 150 prevents light from the lamp from leaking out by using a surface of a front portion 151 and a 90° bend portion 152 as shown in FIG. 33. In addition, the window frame 150 allows air of the lamp fan 147 to pass through from a window frame hole 153.

Next, an inner housing block 154 of the lamp housing unit 91 will be described. As shown in FIGS. 34 to 47, reference numeral 1 is a lamp as a light source. In the lamp 1, a lighting tube 156 is fixed to a reflector 157. The lamp 1 is positioned and fixed to an L-shaped lamp fixing plate 158 with a lamp spring 159. A lamp male connector 160 is positioned and screwed to an L-shaped lower cut portion of the lamp fixing plate 158. The lamp fixing plate 158 is surrounded by a lamp inner housing member 161 and screwed to the lamp fixing plate 158. The inner housing member 161 has a handle 162. In the rear of the lamp 1, a rear electrode plate 163 and a side electrode plate are disposed. Both the electrodes and the lamp male connector 160 are connected to electric wires 164. These electric wires 164 have a high heat resistance. In addition to the electric wires, respective electric wire connecting portions of the lamp male connector 160 are coated with highly insulated shrinkable tubes 165. On a side of the inner housing member 161, a vent hole portion 166 for cooling is disposed. In the front of the lamp lighting tube 156, a heat insulating film 167 is coated. In the figure, reference numeral 168 is a control portion. Reference numeral 169 is a hole for providing an insulating space. Reference numeral 170 is a fixing portion of the lamp inner housing block 154. Reference numeral 171 is a grille portion for providing an insulation space. Reference numeral 172 is an E ring by which the lamp can be replaced without removing screws from the inner housing. Reference numeral 173 is a slide guide portion. Reference numeral 174 is an upper-lower positioning portion. Reference numeral 175 is a vertical positioning portion. Reference numeral 176 is a left-right positioning portion. Reference 177 is an opening portion.

The holes of vent hole portion 166 are formed at a pitch different from those of the vent holes of the outer housing member 178 and grille windows 180 so that light does not leak out to the outside.

Next, a lamp outer housing block 181 of the lamp housing unit 91 will be described.

The front of the outer housing member 178 is an entrance opening of the inner housing block 154. In the front, there are screw holes for fixing the inner housing and two fixing tables 182 where three portions of the lamp outer housing block 181 are cut and raised. On the left side of the lamp outer housing block 181, there are grille windows 180 for downward ventilation and vent holes 179. On the right side of the lamp outer housing block 181, there are grille windows 180 for upward ventilation and vent holes 179. At the top of the lamp outer housing block 181, there is a grille portion 178a for providing an insulation distance, left and right positioning holes 183 of the lamp fixing plate 158, screw holes 184 for fixing an overheat protection safety switch, and a screw hole 185 for fixing a thermistor. In the rear of the lamp outer housing block 181, there is a vertical air flow control portion 186 and a horizontal air flow control portion 187 for allowing wind to blow against the surface of the lamp lighting tube 156 and the hottest portion of the heat insulation film. These portions 186 and 187 are formed by cutting and raising the lamp outer housing block 181. In addition, at a center position of the rear of the lamp outer housing block 181, a light emitting opening 188 is formed. At a lower position of the rear of the lamp outer housing block 181, a connector window 189 is formed. In the rear of the lamp outer housing block 181, a rear member 190 with high vertical accuracy and upper-lower positioning portions 191 are formed. Moreover, in the rear of the lamp outer housing block 181, there are fixing holes 192 for fixing the lamp outer housing block 181 to the base plate 90 and positioning holes 193 thereof.

Reference numeral 194 is a lamp connector plate for connecting a lamp female connector 196 to a connector fixing portion 195 through a connector bush 197.

There is a space between the connector bush 197 and the connector fixing hole 198. This space accommodates axial deviation of the connector. A lamp connector plate upper member 199 insulates the connector from light. In addition, the upper member 199 shields the connector from EMI. Reference numeral 200 is a ground terminal fixing portion. The lamp female connector 196 has a guide slope for smooth connection.

When the inner housing block 154 is inserted into the outer housing 181, the vertical positioning portions 175 of the inner housing 154 are contacted with the rear member 190 which is the reference surface of the outer housing 154. In addition, the upper-lower and left-right positioning portions 174 and 176 are contacted in positions. As a result, the inner housing block 154 is correctly positioned.

Figure 52:
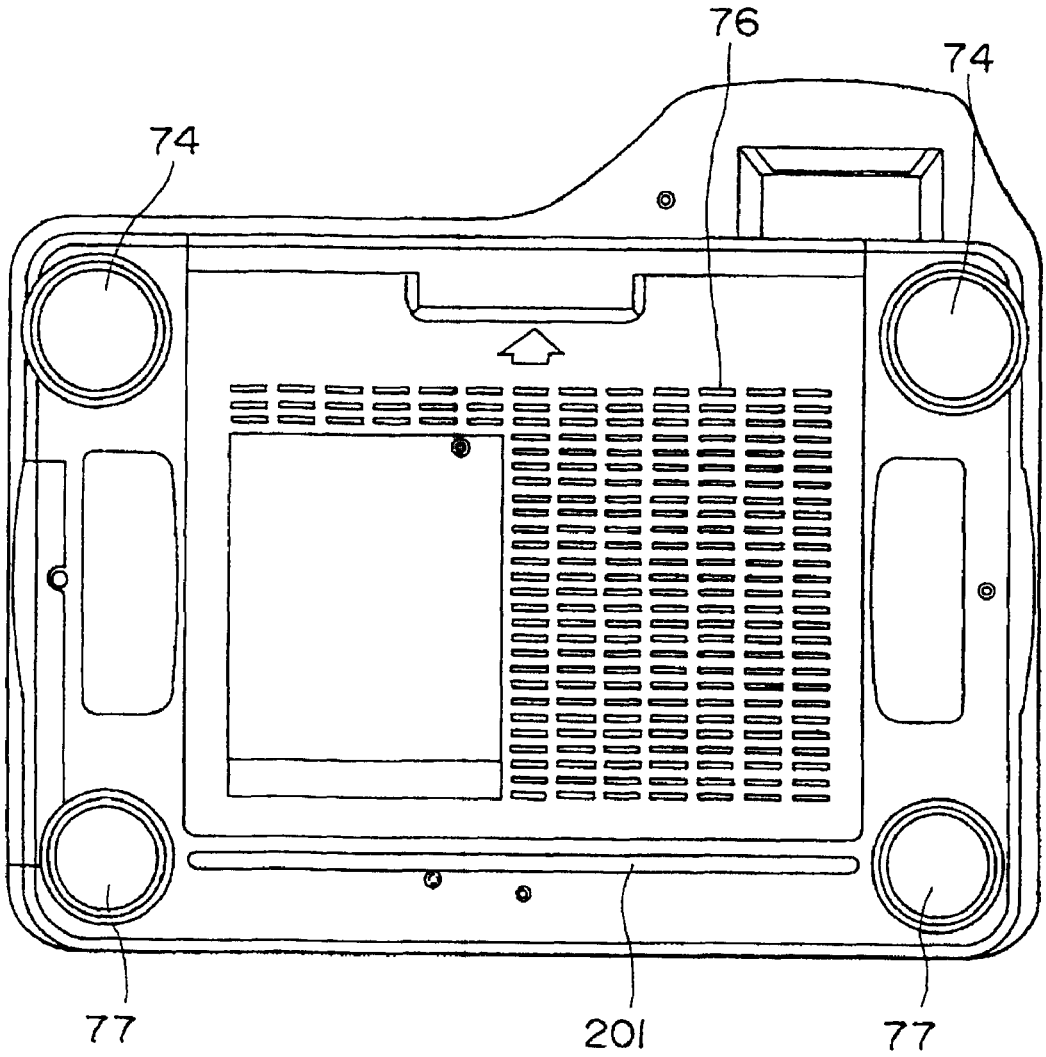
FIG. 52 is a bottom view showing a case.
Figure 53:
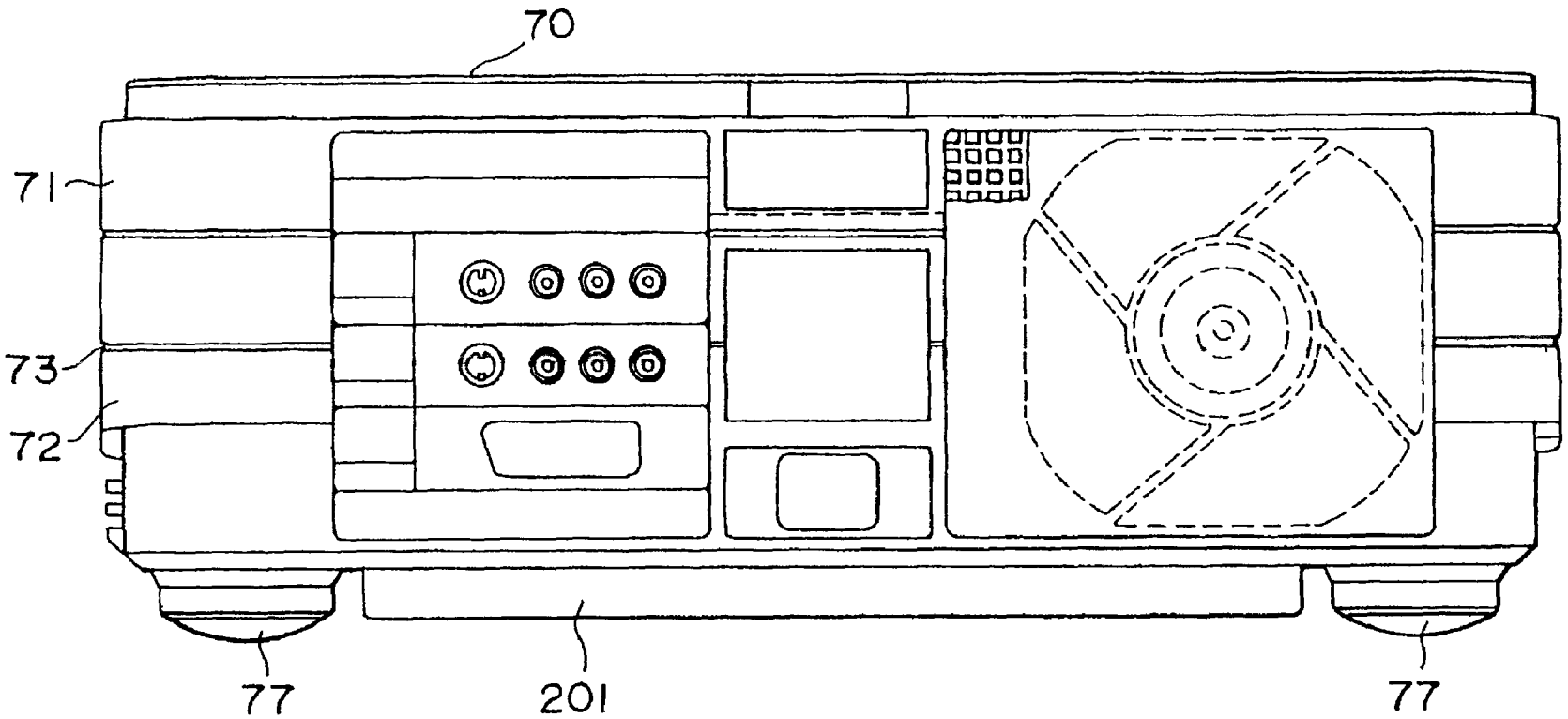
FIG. 53 is a rear view showing the case.

A second embodiment of the case 70 will be described with reference to FIGS. 52 and 53.

Reference numeral 201 is an exhaust air drawing protection wall. When the liquid crystal projector is installed in such a way that the rear of the case of the projector contacts a wall, this protection wall 201 prevents the air intake opening from drawing exhausted warm air through the space between a case bottom 202 and the floor.

Figure 54:
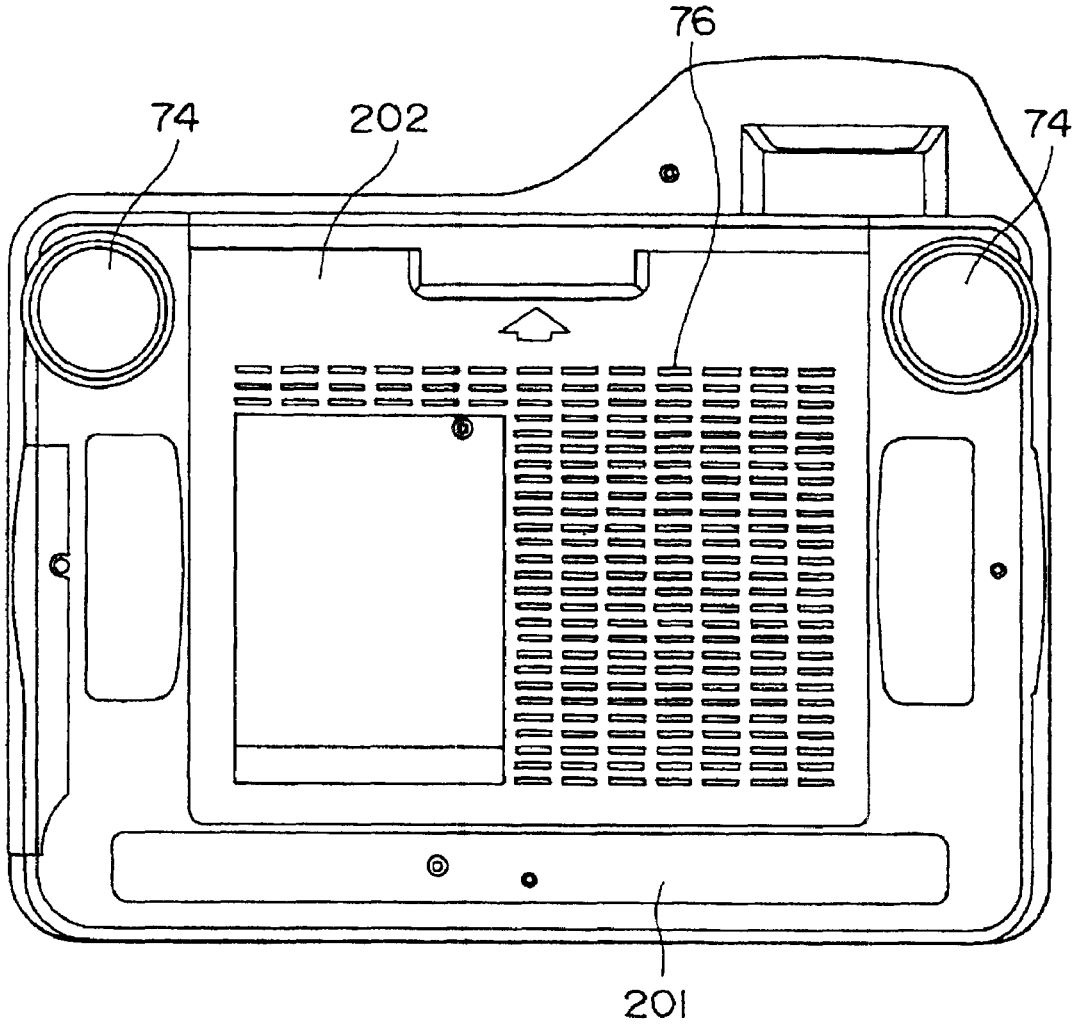
FIG. 54 is a bottom view showing the case.
Figure 55:
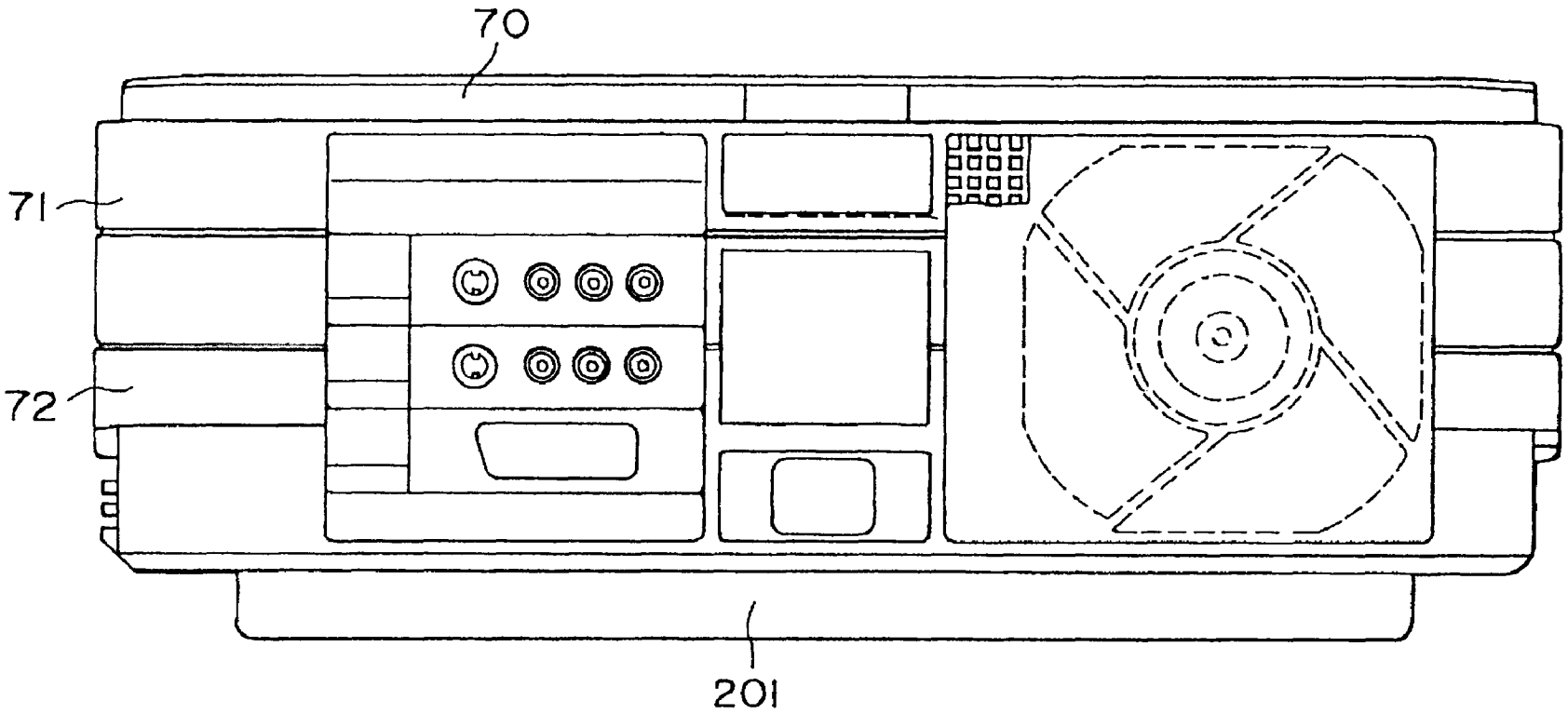
FIG. 55 is a rear view showing the case.

Next, a third embodiment of the case 70 will be described with reference to FIGS. 54 and 55.

In this embodiment, the strength of the exhaust air drawing protection wall 201 of the second embodiment is improved so that it can have the function of a foot.

As described above, fresh air drawn by the air intake fan 105 cools the liquid crystal light valves 7a, 7b, and 7c. Thereafter, the air flows from the opening portion 101 of the drive board unit 100 upwardly. Next, the air merges with air coming from the side openings 120 of the air intake regulating plate 105 in the vertical direction and then cools the lamp stabilizer unit 96 and the power unit 95. Thereafter, the air cook the lamp 1. Finally, the air is exhausted to the outside by the lamp fan 147 and the air exhaust fan 143.

In the above-mentioned construction, the optical unit, which comprises the lamp housing unit, the liquid crystal light valves, the mirrors, the dichroic mirrors, and the projection lens, the air intake fan, the lamp fan, the exhaust fan, and so forth are compactly accommodated in a rectangular parallelepiped case so that an image mixed by at least three liquid crystal light valves for forming color images is projected as a picture onto a screen by the projection lens. In addition, with the air intake regulating plate and the air branching plates, the air flow paths can be branched and enlarged. Thus, the operability, durability, maintainability, and environmental properties are improved.

Figure 57:
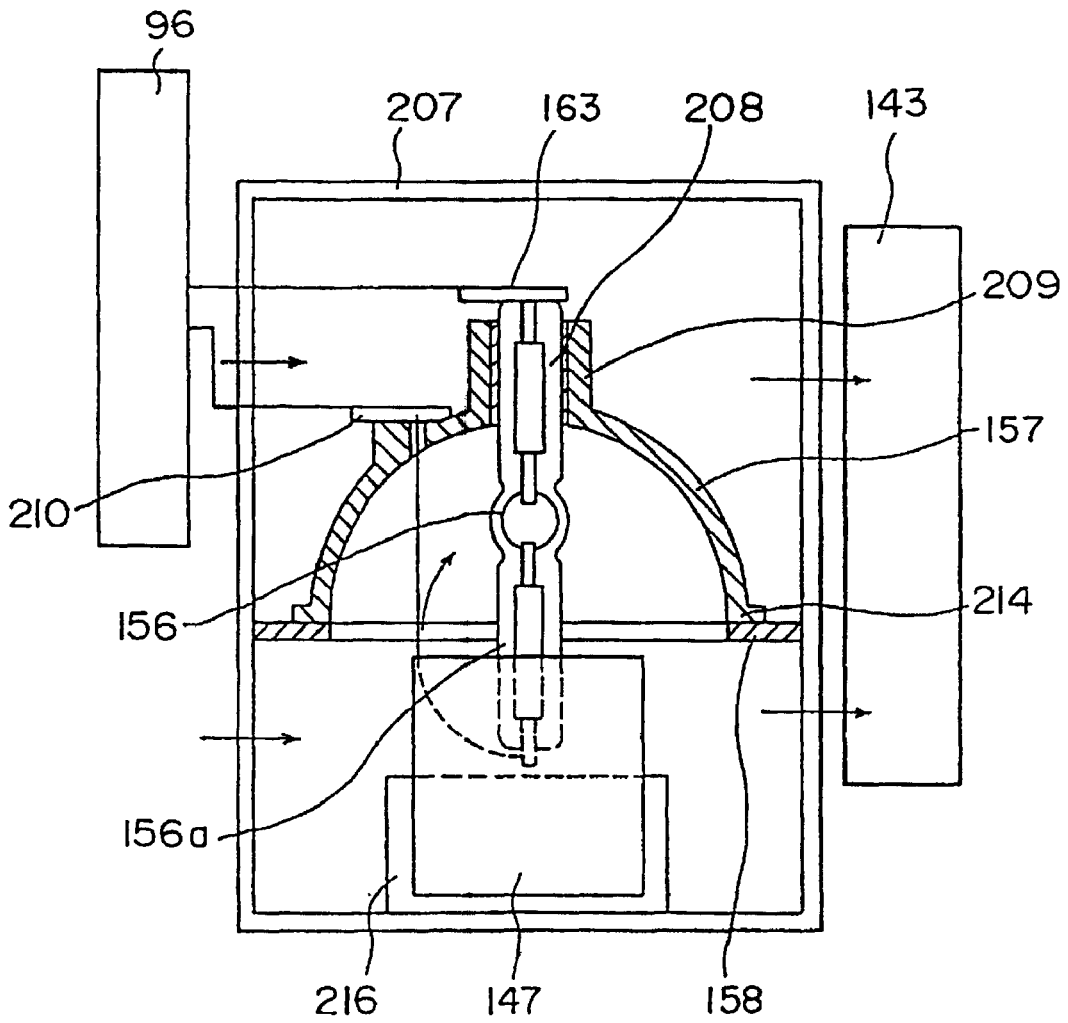
FIG. 57 is a perspective front view showing the construction of a lighting unit including a cooling means of a lamp.
Figure 58:
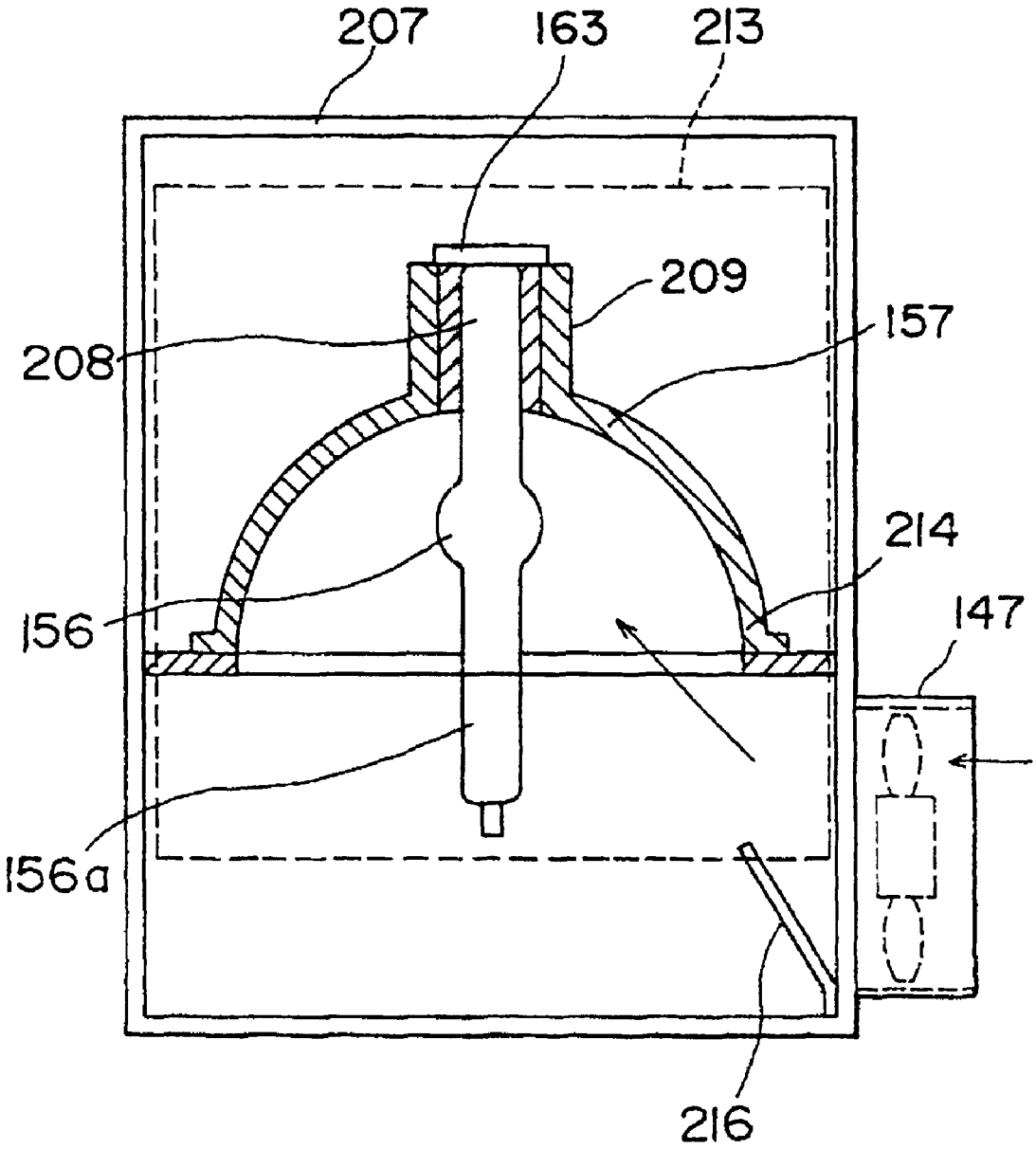
FIG. 58 is a perspective side view showing the lighting unit.

FIGS. 57 and 58 show a cooling means of the lighting unit of the liquid crystal projector. FIG. 57 is a view showing the construction of the cooling means. The lamp 1 comprising a metal halide lamp 156 and a lamp reflector 157 is fixed to a lamp fixing plate 158 and accommodated in a lamp housing 207. A rear sealed portion 208 of the metal halide lamp 156 is inserted into a lamp fixing portion 209 of the lamp reflector 157 and then fixed with cement or the like. By connecting a front electrode plate 210 and a rear electrode plate 163 of the metal halide lamp to the lamp stabilizer 96 disposed outside the lamp unit, the metal halide lamp 156 can be lit. As the cooling means, the air exhaust fan 143 which is an axial flow fan having blades with an outer diameter equal to or larger than the diameter of the opening portion of the lamp reflector 157 is disposed near the lamp house 207. Thus, the air exhaust fan 143 draws air through the inside of the lamp housing 207. On the sides of the lamp housing 207, there are air intake and exhaust holes for cooling the lamp 1. Thus, air flows in the directions of the arrow in the lamp housing 207. In addition, at a position close to the lamp reflector opening portion 214, the lamp fan 147 which is smaller than the diameter of the lamp reflector opening portion 214 is disposed.

When an axial flow fan is used for the lamp fan 147, the wind is widened in the air blow direction. In addition, since the wind is twisted in the rotating direction of the fan, the wind also flows to the region surrounded by the lamp reflector 157.

FIG. 58 is a side view of the cooling means. In the front of the air blow side of the lamp fan 147, an air regulating plate 216 is disposed. The air regulating plate 216 can accurately guide cold air directly to the surfaces of the lighting robe 156 and the front sealed portion 156a in the direction of the arrows.

It should be noted that the lamp fan 147 can be a scirocco fan or a cross flow fan. In addition, the lamp fan 147 can be installed at an angle. Moreover, the blowing direction of the lamp fan 147 can be changed in the range of the conventional blowing direction ±90°.

Further, the regulating plate 216 can be disposed in the lamp housing 147 or midway between the lamp house 207 and the lamp fan 147.

In the above mentioned construction, after the metal halide lamp 156 is discharged and lit, the air exhaust fan 213 cools the entire lamp 1. In addition, the lamp fan 147 and the regulating plate 216 produce air flows on the surfaces and peripheries of the lighting tube 156 and the front sealed portion 156a, thereby improving the cooling effect. In other words, the lamp fan 147 draws fresh air and causes wind to blow against the lamp reflector opening portion 214. Thus, an air flow can be positively produced in the region surrounded by the reflection surface of the lamp reflector 157.

Thus, by decreasing the surface temperature of the quartz glass of the lighting tube 156° to 900° C. or below, the phenomenon where only the upper portion becomes opaque can be prevented. As a result, the differences of brightness and temperatures at upper and lower portions of the lighting tube 156 can be reduced. In addition, when the temperature of the front sealed portion 156a is decreased to 300° C. or below, the air insulation can be maintained for a long time. Thus, the life of the lighting unit can be prolonged.

Thus, as the above-mentioned cooling means, by disposing another lamp fan at a position adjacent to the reflector opening portion, air flows effectively take place on the surface of the lighting tube and in the front sealed portion in the region surrounded by the reflection surface of the lamp reflector. Therefore, the surface temperature of the quartz glass can be cooled to a required temperature or below. As a result, the phenomenon where part of the quartz glass becomes opaque does not take place. Consequently, the optical properties such as brightness and color temperatures can be stabilized. In addition, when the temperature of the front sealed portion is decreased to the required temperature or below, the air insulation of the metal halide lamp can be maintained for a long time and thereby the life thereof can be prolonged. When this lighting unit is used in the liquid crystal color projector, projected pictures which are free of uneven intensity of illumination and uneven colors can be accomplished. Moreover, in comparison with the related art, a metal halide lamp with a long life can be obtained.

INDUSTRIAL UTILIZATION

The present invention is suitable for a projection type liquid crystal video projector which is small in size and light in weight, free of uneven colors and deviation of pixels, and has high brightness and high magnification.

What is claimed is:

[1. A projector-type liquid crystal projector comprising a light source; a plurality of color separating means for separating light emitted by said light source into beams of blue, green and red colors; optical means including image forming liquid crystal light valves and image synthesizing means for synthesizing images for the respective blue, green and red beams which are arranged in an optical path; and a projection lens, said color separating means, said image forming liquid crystal light valves, and said image synthesizing means being secured to a top surface of a box-shaped lower chassis by fixing members, an outer case being secured to side surfaces of said lower chassis separate from said top surface.]

[2. A projector-type liquid crystal projector comprising a light source, a plurality of color separating means for separating light emitted by said light source into beams of blue, green and red colors; optical means including image forming liquid crystal light valves and image synthesizing means for synthesizing images for the respective blue, green and red beams which are arranged in an optical path; and a projection lens, cooling fans being positioned in a plane over a surface on which said image forming liquid crystal light valves are secured, said image forming liquid crystal light valves being operatively associated with said cooling fans by being positioned directly in the path of cooling air produced by said cooling fans.]

[3. A projector-type liquid crystal projector comprising a light source; a plurality of color separating means for separating light emitted by said light source into beams of blue, green and red colors; optical means including image forming liquid crystal light valves and image synthesizing means for synthesizing images for the respective blue, green and red beams which are arranged in an optical path; and a projection lens, said light source including a light tube and a lamp reflector housed in a lamp housing;

an exhaust fan being arranged near one side surface of the lamp housing to cover one side surface of the lamp housing and exhaust air at said one side surface, a hole for air suction and exhaust being formed in a second side surface of said housing opposed to said one side surface of said housing, a lamp fan being positioned further forward than an opening of the lamp reflector and laterally of the lamp housing.]

[4. A projector as claimed in claim 3, further comprising an air regulating plate for controlling air flow to the light tube, said air regulating plate being disposed in the path of flowing air of said lamp fan.]

*5. A liquid crystal projector, comprising:*

*a light source including a light tube and a lamp reflector housed in a lamp housing;*

*a plurality of color separators that separate light emitted by the light source into beams of blue, green and red colors;*

*image forming liquid crystal light valves;*

*an image synthesizer that synthesizes images for the blue, green and red beams respectively;*

*a projection lens;*

*an exhaust fan arranged near a first side surface of the lamp housing;*

*a lamp fan positioned further forward than an opening of the lamp reflector and laterally of the lamp housing; and*

*an opening through which air is blown into the lamp housing by the lamp fan, the opening being formed in a second side surface of the lamp housing.*

*6. A projector, comprising:*

*a light source;*

*separation optical elements that separate light emitted by the light source into beams of blue, green and red colors;*

*liquid crystal light panels that modulate respective ones of the separated blue, green and red beams;*

*a synthesizing optical system that synthesizes the modulated blue, green and red beams;*

*a projection lens that receives the synthesized light from the synthesizing optical system;*

*a chassis having a bottom member, wherein the separation optical elements, the liquid crystal light panels and the synthesizing optical system are secured so as to be constrained against movement relative to the bottom member; and*

*an outer case to which the chassis is secured.*

*7. A projector as claimed in claim 6, wherein the chassis further comprises a plurality of walls, each of which is positioned substantially perpendicular to the bottom member.*

*8. A projector as claimed in claim 7, wherein the outer case is secured to the bottom member or any of the plurality of walls.*

*9. A projector as claimed in claim 7, wherein the bottom member and the plurality of walls form an enclosure.*

*10. A projector as claimed in claim 7, wherein at least one wall includes a projection that extends substantially parallel to the bottom member.*

*11. A projector as claimed in claim 6, wherein the separation optical elements include two dichroic mirrors.*

*12. A projector as claimed in claim 6, wherein the synthesizing optical system includes two dichroic surfaces.*

*13. A projector comprising:*

*a light source including a light tube and a lamp reflector housed in a lamp housing;*

*separation optical elements that separate light emitted by the light source into beams of blue, green and red colors;*

*liquid crystal light panels that modulate respective ones of the separated blue, green and red beams;*

*a synthesizing optical system that synthesizes the modulated blue, green and red beams;*

*a projection lens that receives the synthesized modulated light from the synthesizing optical system;*

*an exhaust fan arranged near a first side surface of the lamp housing;*

*a lamp fan positioned further forward than an opening of the lamp reflector and laterally of the lamp housing; and*

*an opening through which air is blown into the lamp housing by the lamp fan, the opening being formed in a second side surface of the lamp housing.*

*14. A projector as claimed in claim 13, further comprising an air regulating plate that controls air flow to the light tube, the air regulating plate being disposed in a path of flowing air generated by the lamp fan.*

*15. A projector as claimed in claim 13, wherein the separation optical elements include two dichroic mirrors.*

*16. A projector as claimed in claim 13, wherein the synthesizing optical system includes two dichroic surfaces.*

*17. A projector as claimed in claim 13, wherein the synthesizing optical system includes two dichroic layers.*

*18. A projector, comprising:*

*a lamp housing having first and second side surfaces;*

*a light source including a light tube and a lamp reflector housed in the housing;*

*a light valve that modulates light emitted by the light source;*

*a projection lens that receives the modulated light from the light valve;*

*an exhaust fan arranged near the first side surface of the lamp housing;*

*a lamp fan positioned further forward than an opening of the lamp reflector and laterally of the lamp housing; and*

*an opening through which air is blown into the lamp housing by the lamp fan, the opening being formed in the second side surface of the lamp housing.*

*19. A projector as claimed in claim 18, the exhaust fan being an axial flow fan.*

*20. A projector as claimed in claim 18, the lamp fan being a scirocco fan.*

*21. A projector as claimed in claim 18, further comprising:*

*an air regulating section that guides air to a region surrounded by a reflection surface of the lamp reflector.*

*22. A projector as claimed in claim 21, the air regulating section being disposed in the lamp housing.*

*23. A projector as claimed in claim 21, the air regulating section being disposed between the lamp housing and the lamp fan.*

*24. A projector as claimed in claim 18, further comprising:*

*an air regulating section that controls air flow to the light tube.*

*25. A projector as claimed in claim 24, the air regulating section being disposed in a path of flowing air generated by the lamp fan.*

*26. A projector as claimed in claim 18, the exhaust fan having blades with an outer diameter that is equal to or larger than a diameter of the opening of the lamp reflector.*

*27. A projector as claimed in claim 18, the lamp fan being smaller than a diameter of the opening of the lamp reflector.*

*28. A projector as claimed in claim 18, the lamp fan being smaller than an outer diameter of blades of the exhaust fan.*

*29. A projector as claimed in claim 26, the exhaust fan being an axial flow fan.*

*30. A projector as claimed in claim 27, the lamp fan being a scirocco fan.*

*31. A projector as claimed in claim 28, the exhaust fan being an axial flow fan.*

*32. A projector as claimed in claim 28, the lamp fan being a scirocco fan.*

*33. A projector as claimed in claim 18, further comprising:*

*an air regulating section that guides air to a region surrounded by a reflection surface of the lamp reflector,*

*the exhaust fan having blades with an outer diameter that is equal to or larger than a diameter of the opening of the lamp reflector.*

*34. A projector as claimed in claim 18, further comprising:*

*an air regulating section that guides air to a region surrounded by a reflection surface of the lamp reflector,*

*the lamp fan being smaller than an outer diameter of blades of the exhaust fan.*

*35. A projector as claimed in claim 18, further comprising:*

*an air regulating section that controls air flow to the light tube, the air regulating section being disposed in a path of flowing air generated by the lamp fan,*

*the exhaust fan having blades with an outer diameter that is equal to or larger than a diameter of the opening of the lamp reflector.*

*36. A projector as claimed in claim 18, further comprising:*

*an air regulating section that controls air flow to the light tube, the air regulating section being disposed in a path of flowing air generated by the lamp fan,*

*the lamp fan being smaller than an outer diameter of blades of the exhaust fan.*

*37. A projector as claimed in claim 18, the exhaust fan being an axial flow fan, and the lamp fan being positioned further forward than an axis of the exhaust fan.*

*38. A projector as claimed in claim 26, the exhaust fan being an axial flow fan, and the lamp fan being positioned further forward than an axis of the exhaust fan.*

*39. A projector as claimed in claim 28, the exhaust fan being an axial flow fan, and the lamp fan being positioned further forward than an axis of the exhaust fan.*

*40. A projector as claimed in claim 18, further comprising:*

*a power unit,*

*the lamp fan being disposed in a path of air flowing from the power unit to the light source.*

*41. A projector as claimed in claim 18, further comprising:*

*a power unit being located on the air intake side of the lamp fan.*

*42. A projector as claimed in claim 18, further comprising:*

*a power unit, and*

*an optical unit including an optical part,*

*the lamp fan being disposed between the power unit and the optical unit.*

*43. A projector as claimed in claim 18, further comprising:*

*a lamp stabilizing unit that stabilizes the light emitted by the light source,*

*the lamp fan being disposed in a path of air flowing from the lamp stabilizing unit to the light source.*

*44. A projector as claimed in claim 18, further comprising:*

*a lamp stabilizing unit that stabilizes the light emitted by the light source, and*

*an optical unit including an optical part,*

*the lamp fan being disposed between the lamp stabilizing unit and the optical unit.*

* * * * *